US012085324B2

(12) United States Patent
Thatte et al.

(10) Patent No.: US 12,085,324 B2
(45) Date of Patent: Sep. 10, 2024

(54) REFRIGERATION AND HEAT PUMP SYSTEMS WITH PRESSURE EXCHANGERS

(71) Applicant: Energy Recovery, Inc., San Leandro, CA (US)

(72) Inventors: Azam Mihir Thatte, Kensington, CA (US); Behzad Zamanian Yazdi, San Francisco, CA (US); David Deloyd Anderson, Castro Valley, CA (US); James Elliott McLean, Jr., Houston, TX (US); Joseph Michael Marchetti, Spring, TX (US); Omprakash Samudrala, San Ramon, CA (US); Neelesh Sarawate, Pleasanton, CA (US); Kuo-Chiang Chen, Dublin, CA (US); Farshad Ghasripoor, Berkeley, CA (US)

(73) Assignee: Energy Recovery, Inc., San Leandro, CA (US)

( * ) Notice: Subject to any disclaimer, the term of this patent is extended or adjusted under 35 U.S.C. 154(b) by 0 days.

(21) Appl. No.: 18/120,839

(22) Filed: Mar. 13, 2023

(65) Prior Publication Data

US 2023/0213245 A1    Jul. 6, 2023

Related U.S. Application Data

(62) Division of application No. 17/834,831, filed on Jun. 7, 2022, now Pat. No. 11,781,789.

(Continued)

(51) Int. Cl.
*F25B 13/00* (2006.01)
*F03G 7/00* (2006.01)
(Continued)

(52) U.S. Cl.
CPC ............... *F25B 7/00* (2013.01); *F03G 7/00* (2013.01); *F25B 9/008* (2013.01); *F25B 13/00* (2013.01);
(Continued)

(58) Field of Classification Search
CPC .......... F25B 41/20; F25B 13/00; F25B 39/04; F25B 49/02; F25B 9/008
See application file for complete search history.

(56) References Cited

U.S. PATENT DOCUMENTS 2,952,138 A    9/1960  Russell et al.
2,971,343 A    2/1961  Spalding
(Continued)

FOREIGN PATENT DOCUMENTS

CN    1671573 A    9/2005
CN    1806151 A    7/2006
(Continued)

OTHER PUBLICATIONS

International Search Report and Written Opinion of International patent application No. PCT/US2022/032709 dated Sep. 8, 2022, 7 pages.

(Continued)

*Primary Examiner* — Nael N Babaa
(74) *Attorney, Agent, or Firm* — LOWENSTEIN SANDLER LLP

(57) ABSTRACT

A system includes a pressure exchanger (PX) configured to receive a first fluid at a first pressure and a second fluid at a second pressure and exchange pressure between the first fluid and the second fluid. The system further includes a condenser configured to provide corresponding thermal energy from the first fluid to a corresponding environment. The system further includes a first ejector to receive a first gas and increase pressure of the first gas to form the second (Continued)

fluid at the second pressure. The first ejector is further to provide the second fluid at the second pressure to the PX.

20 Claims, 27 Drawing Sheets

Related U.S. Application Data

(60) Provisional application No. 63/287,831, filed on Dec. 9, 2021, provisional application No. 63/285,811, filed on Dec. 3, 2021, provisional application No. 63/278,804, filed on Nov. 12, 2021, provisional application No. 63/208,925, filed on Jun. 9, 2021.

(51) Int. Cl.
*F25B 7/00* (2006.01)
*F25B 9/00* (2006.01)
*F25B 30/02* (2006.01)
*F25B 39/00* (2006.01)
*F25B 39/04* (2006.01)
*F25B 41/20* (2021.01)
*F25B 49/02* (2006.01)

(52) U.S. Cl.
CPC .............. *F25B 30/02* (2013.01); *F25B 39/00* (2013.01); *F25B 39/04* (2013.01); *F25B 41/20* (2021.01); *F25B 49/02* (2013.01); *F25B 49/022* (2013.01); *F25B 2600/025* (2013.01); *F25B 2600/13* (2013.01); *F25B 2700/13* (2013.01); *F25B 2700/151* (2013.01); *F25B 2700/1933* (2013.01); *F25B 2700/195* (2013.01); *F25B 2700/21152* (2013.01); *F25B 2700/21173* (2013.01)

(56) References Cited

U.S. PATENT DOCUMENTS

| | | |
|---|---|---|
| 3,158,007 A | 11/1964 | Kentfield |
| 3,347,059 A | 10/1967 | Laing |
| 3,503,207 A | 3/1970 | Strub |
| 3,696,634 A | 10/1972 | Ludin et al. |
| 3,740,966 A | 6/1973 | Pravda |
| 3,823,573 A | 7/1974 | Cassady |
| 3,854,301 A | 12/1974 | Cytryn |
| 3,986,852 A | 10/1976 | Doerner et al. |
| 3,988,901 A | 11/1976 | Shelton et al. |
| 4,000,778 A | 1/1977 | Laing |
| 4,006,602 A | 2/1977 | Fanberg |
| 4,015,888 A | 4/1977 | Draper et al. |
| 4,051,888 A | 10/1977 | Yamada |
| 4,442,677 A | 4/1984 | Kauffman |
| 4,512,394 A | 4/1985 | Kauffman |
| 4,524,587 A | 6/1985 | Kantor |
| 4,823,560 A | 4/1989 | Rowley |
| 4,887,942 A | 12/1989 | Hauge |
| 5,284,013 A | 2/1994 | Keller |
| 5,336,059 A | 8/1994 | Rowley |
| 5,503,222 A | 4/1996 | Dunne |
| 5,647,221 A | 7/1997 | Garris, Jr. |
| 5,802,870 A | 9/1998 | Arnold |
| 5,894,719 A | 4/1999 | Nalim et al. |
| 6,158,237 A | 12/2000 | Riffat |
| 6,178,767 B1 | 1/2001 | Pravda |
| 6,250,086 B1 | 6/2001 | Cho |
| 6,389,818 B2 | 5/2002 | Cho |
| 6,484,519 B1 | 11/2002 | Hesse et al. |
| 6,773,226 B2 | 8/2004 | Al-Hawaj |
| 7,207,186 B2 | 4/2007 | Hirota |
| 7,661,932 B2 | 2/2010 | El-Sayed et al. |
| 7,799,221 B1 | 9/2010 | MacHarg |
| 8,075,281 B2 | 12/2011 | Martin |
| 9,243,850 B1 | 1/2016 | Bastian |
| 9,388,817 B1 | 7/2016 | Wright et al. |
| 9,659,795 B2 | 5/2017 | Okada et al. |
| 9,695,795 B2 | 7/2017 | Martin |
| 9,897,336 B2 | 2/2018 | Staffend |
| 9,920,774 B2 | 3/2018 | Ghasripoor |
| 10,041,701 B1 | 8/2018 | Koplow |
| 10,119,379 B2 | 11/2018 | Richter |
| 10,167,710 B2 | 1/2019 | Ghasripoor et al. |
| 10,359,075 B2 | 7/2019 | Anderson |
| 10,557,482 B2 | 2/2020 | Anderson |
| 10,766,009 B2 | 9/2020 | Oklejas, Jr. |
| 10,933,375 B1 | 3/2021 | Oklejas, Jr. |
| 10,989,021 B1 | 4/2021 | Stephenson |
| 11,073,169 B2 | 7/2021 | Thatte |
| 11,421,918 B2 | 8/2022 | Thatte |
| 2001/0020366 A1 | 9/2001 | Cho |
| 2002/0025264 A1 | 2/2002 | Polizos et al. |
| 2004/0052639 A1 | 3/2004 | Al Hawaj |
| 2004/0250556 A1 | 12/2004 | Sienel |
| 2005/0006317 A1 | 1/2005 | Lee et al. |
| 2005/0044865 A1 | 3/2005 | Manole |
| 2005/0132729 A1 | 6/2005 | Manole |
| 2005/0274132 A1 | 12/2005 | Ohta |
| 2006/0032808 A1 | 2/2006 | Hauge |
| 2006/0130495 A1 | 6/2006 | Dieckmann |
| 2006/0254308 A1 | 11/2006 | Yokoyama |
| 2007/0137170 A1 | 6/2007 | Bross et al. |
| 2008/0078192 A1 | 4/2008 | Ignatiev |
| 2009/0301109 A1 | 12/2009 | Manole |
| 2010/0024421 A1 | 2/2010 | Litwin et al. |
| 2011/0051880 A1 | 3/2011 | Al-Mayahi et al. |
| 2012/0167601 A1 | 7/2012 | Cogswell et al. |
| 2013/0145759 A1 | 6/2013 | Sonwane et al. |
| 2013/0280038 A1 | 10/2013 | Martin et al. |
| 2014/0048143 A1 | 2/2014 | Lehner et al. |
| 2014/0260415 A1 | 9/2014 | Ducote, Jr. et al. |
| 2015/0184492 A1 | 7/2015 | Ghasripoor et al. |
| 2015/0184502 A1 | 7/2015 | Krish |
| 2015/0217622 A1 | 8/2015 | Enomoto |
| 2015/0226466 A1 | 8/2015 | Cupps et al. |
| 2015/0285101 A1 | 10/2015 | Hikichi |
| 2015/0292310 A1 | 10/2015 | Ghasripoor et al. |
| 2016/0047361 A1 | 2/2016 | Al-Sulaiman |
| 2016/0076821 A1 | 3/2016 | Kopko |
| 2016/0090995 A1 | 3/2016 | Yamada et al. |
| 2016/0138649 A1 | 5/2016 | Anderson et al. |
| 2016/0138815 A1 | 5/2016 | Swett |
| 2016/0160849 A1 | 6/2016 | Gains-Germain et al. |
| 2016/0252289 A1 | 9/2016 | Feng |
| 2016/0298500 A1 | 10/2016 | Peter et al. |
| 2016/0377303 A1 | 12/2016 | Staffend |
| 2017/0248347 A1 | 8/2017 | Miller |
| 2017/0356470 A1 | 12/2017 | Jaffrey |
| 2018/0094648 A1 | 4/2018 | Hoffman et al. |
| 2018/0097246 A1* | 4/2018 | Meder ................ H01M 8/0432 |
| 2018/0347601 A1 | 12/2018 | Hoffman et al. |
| 2019/0145237 A1 | 5/2019 | Shampine |
| 2019/0153903 A1 | 5/2019 | Miller |
| 2019/0390576 A1 | 12/2019 | Thatte |
| 2020/0191445 A1 | 6/2020 | Liu et al. |
| 2021/0123551 A1 | 4/2021 | Kuhn De Chizelle et al. |
| 2022/0011022 A1 | 1/2022 | Thatte |
| 2022/0011023 A1 | 1/2022 | Thatte et al. |
| 2022/0307733 A1 | 9/2022 | Thatte et al. |
| 2022/0381496 A1 | 12/2022 | Thatte et al. |
| 2022/0397310 A1 | 12/2022 | Thatte et al. |
| 2022/0397317 A1 | 12/2022 | Thatte et al. |
| 2022/0397324 A1 | 12/2022 | Thatte et al. |

FOREIGN PATENT DOCUMENTS

| | | |
|---|---|---|
| CN | 101290174 A | 10/2008 |
| CN | 101458000 A | 6/2009 |
| CN | 101506596 A | 8/2009 |
| CN | 102232167 A | 11/2011 |
| CN | 104797897 A | 7/2015 |
| CN | 105180513 A | 12/2015 |
| CN | 205858491 U | 1/2017 |

(56) References Cited

FOREIGN PATENT DOCUMENTS

| | | |
|---|---|---|
| CN | 108626902 A | 10/2018 |
| CN | 107076055 B | 11/2018 |
| CN | 107923416 B | 6/2019 |
| CN | 110094907 A | 8/2019 |
| EP | 2035758 B1 | 7/2010 |
| EP | 2995885 A1 | 3/2016 |
| EP | 3489595 A1 | 5/2019 |
| EP | 3865786 A1 | 8/2021 |
| EP | 3872418 A1 | 9/2021 |
| GB | 823689 A | 11/1959 |
| JP | 2010525293 A | 7/2010 |
| KR | 20190133595 A | 12/2019 |
| WO | 8805133 A1 | 7/1988 |
| WO | 9617176 A1 | 6/1996 |
| WO | 9917028 A1 | 4/1999 |
| WO | 2007102978 A1 | 9/2007 |
| WO | 2008000793 A1 | 1/2008 |
| WO | 2008019689 A2 | 2/2008 |
| WO | 2008019689 A3 | 4/2008 |
| WO | 2008042693 A1 | 4/2008 |
| WO | 2008050654 A1 | 5/2008 |
| WO | 2008150434 A1 | 12/2008 |
| WO | 2010039682 A2 | 4/2010 |
| WO | 2011092705 A2 | 8/2011 |
| WO | 2016186572 A1 | 11/2016 |
| WO | 2017125251 A1 | 7/2017 |
| WO | 2018092464 A1 | 5/2018 |
| WO | 2022010750 A1 | 1/2022 |

OTHER PUBLICATIONS

International Search Report and Written Opinion of International patent application No. PCT/US2022/032722 dated Nov. 4, 2022, 28 pages.

International Search Report and Written Opinion of International patent application No. PCT/US2022/032714 dated Nov. 15, 2022, 28 pages.

Fricke, et al. "Increasing the Efficiency of a Carbon Dioxide Refrigeration System Using a Pressure Exchanger". Retrieved from <https://www.osli.gov/biblio.1560413>, Aug. 1, 2021, 7 pages.

Website entitled Ammonia (R-717) vs. CO2 (R-7 44) Refrigeration Systems, retrieved from 2, 3/(2), 4/3/(2) <https://web.archive.org/web/20200207080147/http://www.ddref.com/RefrigerantSystems/ProsV sCons> (Discovery Designs Refrigeration LLC) Feb. 7, 2020 (Jul. 2, 2020), entire document, especially p. 1.

International Preliminary Report on Patentability for International Application No. PCT/US2021/040199, mailed Jan. 19, 2023, 14 Pages.

International Preliminary Report on Patentability for International Application No. PCT/US2021/040201, mailed Jan. 19, 2023, 16 Pages.

International Search Report and Written Opinion for International Application No. PCT/US2019/039334, mailed Jan. 7, 2020, 15 Pages.

International Search Report and Written Opinion for International Application No. PCT/US2021/040199, mailed Nov. 3, 2021, 16 Pages.

International Search Report and Written Opinion for International Application No. PCT/US2021/040201, mailed Oct. 6, 2021, 30 Pages.

Kerpicci, "A Cooling Device," Full Document, 2007, pp. 1-5.

Search Report received for Danish Patent Office for Application No. 202170359, dated May 4, 2022, 11 Pages.

Search Report received for the Danish Patent Office for Application No. 202170360, dated May 4, 2022, 9 Pages.

Office Action for Chinese Patent Application No. 202280006194.9, mailed Sep. 20, 2023, 13 Pages.

1 Office Action for Chinese Patent Application No. 202280006217.6, mailed Aug. 25, 2023, 3 Pages.

Extended European Search Report for European Application No. EP21837510.3, mailed Feb. 19, 2024, 10 Pages.

International Search Report and Written Opinion for International Application No. PCT/US2023/082581, mailed Mar. 19, 2024, 15 Pages.

Thatte A., "A New Type of Rotary Liquid Piston Pump for Multi-Phase CO2 Compression," Proceeding of ASME Turbo Expo 2018, Turbomachinery Technical Conference and Exposition, Jun. 11-15, 2018, Oslo Norway, 13 Pages.

Extended European Search Report for European Application No. 24154723.1, mailed May 28, 2024, 08 Pages.

\* cited by examiner

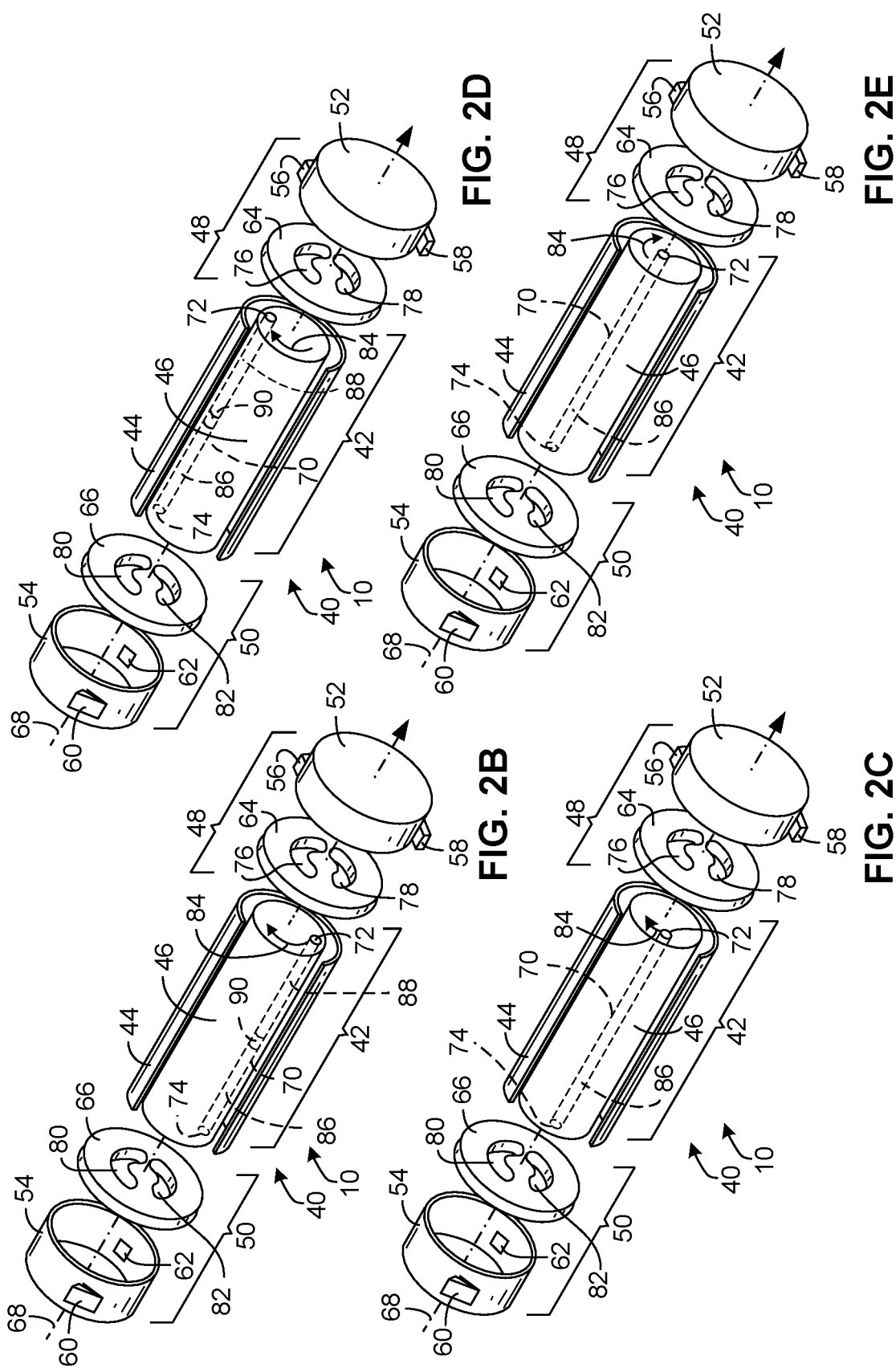

REFRIGERATION AND HEAT PUMP SYSTEMS WITH PRESSURE EXCHANGERS

RELATED APPLICATION

This application is a divisional application of U.S. application Ser. No. 17/834,831 filed Jun. 7, 2022, which claims the benefit of Provisional Application No. 63/208,925, filed Jun. 9, 2021, Provisional Application No. 63/278,804, filed Nov. 12, 2021, Provisional Application No. 63/285,811, filed Dec. 3, 2021, and Provisional Application No. 63/287,831, filed Dec. 9, 2021, the contents of which are hereby incorporated by reference in their entirety.

TECHNICAL FIELD

The present disclosure relates to systems, and, more particularly, refrigeration and heat pump systems with pressure exchangers.

BACKGROUND

Systems use fluids at different pressures. Systems use pumps or compressors to increase pressure of fluid.

BRIEF DESCRIPTION OF THE DRAWINGS

The present disclosure is illustrated by way of example, and not by way of limitation in the figures of the accompanying drawings.

FIGS. 2A-E are exploded perspective views of pressure exchangers (PXs), according to certain embodiments.

DETAILED DESCRIPTION OF EMBODIMENTS

Figure 1A:
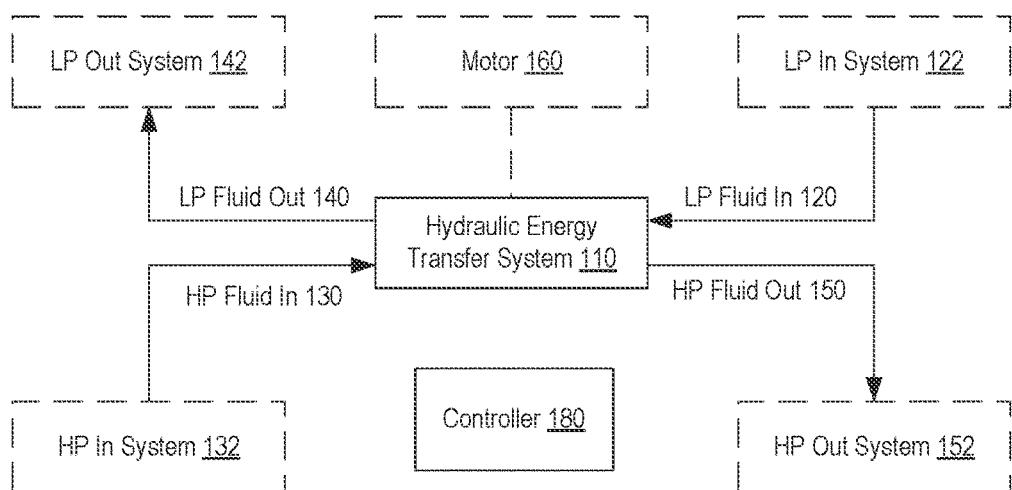
FIGS. 1A-B illustrate schematic diagrams of fluid handling systems including hydraulic energy transfer systems, according to certain embodiments.

Embodiments described herein are related to refrigeration systems and heat pump systems that include a pressure exchanger (e.g., fluid handling systems, heat transfer systems, pressure exchanger systems, carbon dioxide ($CO_2$) refrigeration systems, etc.).

Systems may use fluids at different pressures. These systems may include hydraulic fracturing (e.g., fracking or fracing) systems, desalinization systems, refrigeration systems, heat pump systems, energy generation systems, mud pumping systems, slurry pumping systems, industrial fluid systems, waste fluid systems, fluid transportation systems, etc. Pumps or compressors may be used to increase pressure of fluid to be used by systems.

Conventionally, refrigeration systems use pumps or compressors to increase the pressure of a fluid (e.g., a refrigeration fluid such as $CO_2$, R-744, R-134a, hydrocarbons, hydrofluorocarbons (HFCs), hydrochlorofluorocarbons (HCFCs), ammonia ($NH_3$), refrigerant blends, R-407A, R-404A, etc.). Conventionally, separate pumps or compressors mechanically coupled to motors are used to increase pressure of the fluid. Pumps and compressors that operate over a large pressure differential (e.g., cause a large pressure increase in the fluid) use large quantities of energy. Conventional systems thus expend large amounts of energy increasing the pressure of the fluid (via the pumps or compressors driven by the motors). Additionally, conventional refrigeration systems decrease the pressure of the fluid through expansion valves and/or heat exchangers (e.g., condensers and/or evaporators, etc.). Conventional systems inefficiently increase pressure of fluid and decrease pressure of the fluid. This is wasteful in terms of energy used to run the conventional systems (e.g., energy used to repeatedly increase the pressure of the refrigeration fluid to cause increase or decrease of temperature of the surrounding environment).

The systems, devices, and methods of the present disclosure provide fluid handling systems (e.g., for refrigeration, for cooling, for heating, etc.). In some embodiments, a system (e.g., fluid handling system, refrigeration system, heat pump system, heat transfer system, $CO_2$ refrigeration system, etc.) includes a pressure exchanger (PX) that is configured to exchange pressure between a first fluid (e.g., a high pressure portion of the refrigeration fluid in a refrigeration cycle) and a second fluid (e.g., a low pressure portion of the refrigeration fluid in the refrigeration cycle). In some embodiments, the PX may receive a first fluid (e.g., a portion of the refrigeration fluid at high pressure) via a first inlet (e.g., a high pressure inlet) and a second fluid (e.g., a portion of the refrigeration fluid at a low pressure.) via a second inlet (e.g., a low pressure inlet). When entering the PX, the first fluid may have a higher pressure than the second fluid. The PX may exchange pressure between the first fluid and the second fluid. The first fluid may exit the PX via a first outlet (e.g., a low pressure outlet) and the second fluid may exit the PX via a second outlet (e.g., a high pressure outlet). When exiting the PX, the second fluid may have a higher pressure than the first fluid (e.g., due to the pressure exchange between the first fluid and the second fluid).

In some embodiments, the system further includes a heat exchanger (e.g., a condenser, condensing unit (CU), gas cooler, air conditioning condenser, etc.) configured to provide the first fluid to the PX (e.g., via the first inlet of the PX) and transfer corresponding thermal energy (e.g., heat) between the first fluid and a corresponding environment (e.g., a heat sink, a hot reservoir, heat source, cold reservoir, ambient air, ground, etc.). In some embodiments, the first fluid (e.g., high pressure fluid) loses heat to the environment and condenses in the heat exchanger. Output of the heat exchanger (e.g., a portion of the output of the heat exchanger, first fluid, etc.) may be provided to the high pressure inlet of the PX. The heat exchanger may be upstream of the PX on a flow path of the first fluid.

In some embodiments, the system further includes a receiver (e.g., a flash tank) to receive the first fluid output from the low pressure outlet of the PX. The receiver may form a chamber where gas and liquid of the low pressure first fluid may separate. The booster may receive a gas (e.g., gas of the high pressure first fluid) from the receiver and increase pressure of the gas to form the second fluid.

In some embodiments, the system further includes a booster that is configured to receive a gas (e.g., gas of the low pressure first fluid) from the receiver and to increase the pressure of the gas (e.g., the first portion of the first gas) to form the second fluid at a second pressure (e.g., a portion of the refrigeration fluid at a low pressure), and provide the second fluid at the second pressure to the PX via the second inlet. The booster may be a pump or a compressor and may increase pressure of the second fluid over a comparatively low pressure differential. More details regarding the pressure differential of boosters are described herein. The booster may provide the second fluid to the low pressure inlet (e.g., the second inlet) of the PX at the second pressure.

The system may further include one or more of an expansion valve, another heat exchanger (e.g., an evaporator), and a compressor to perform a refrigeration cycle. Refrigeration fluid may expand through the expansion valve, decreasing in pressure and temperature. The refrigeration fluid may receive thermal energy (e.g., heat) from another environment (e.g., a heat source, a cold reservoir, etc.) via another heat exchanger (e.g., an evaporator). The refrigeration fluid may be compressed in a compressor to increase pressure of the refrigeration fluid. Thermal energy may be rejected from the refrigeration fluid in the condenser, and the first fluid (e.g., at least a portion of the refrigeration fluid) may flow into the PX and exchange pressure with the second fluid as part of a refrigeration cycle.

In some embodiments, the system includes a PX and a condenser. The system may further include an ejector. The ejector may receive a first gas output from the PX and increase pressure of the first gas to form the second fluid at the second pressure. The ejector may provide the second fluid at the second pressure to the PX via the second inlet. The ejector may receive a high pressure gas output from a compressor (e.g., a compressor as described herein) and combine the high pressure gas with the first gas in a converging nozzle of the ejector to increase pressure of the first gas. In some embodiments, the ejector substantially performs the function of the booster as described above.

In some embodiments, the system includes a PX and a condenser. The system may further include a first evaporator and a second evaporator. The first evaporator may provide corresponding thermal energy (e.g., heat) from a second environment to a portion of the first fluid output from the PX. The second evaporator may provide corresponding thermal energy (e.g., heat) from a third environment to another portion of the first fluid output from the PX. The system may further include a first compressor and a second compressor. The first compressor may receive fluid output from the first evaporator, increase pressure of the fluid, and provide the fluid to the condenser. The second compressor may receive fluid output from the second evaporator, increase pressure of the fluid to form the second fluid (e.g., at the second pressure) and provide the second fluid to the PX.

The systems, devices, and methods of the present disclosure have advantages over conventional solutions. The systems of the present disclosure may use a reduced amount of energy (e.g., use less energy to run a refrigeration or heat pump cycle) compared to conventional systems. The PX may allow for the recovery of energy (e.g., pressure) that is ordinarily lost in conventional systems. This causes the systems of the present disclosure to have increased efficiency, thus using less energy and costing less over time to the end-user compared to conventional solutions. Additionally, the systems of the present disclosure reduce wear on components (e.g., pumps, compressors) compared to conventional systems because the pumps or compressors of the systems disclosed herein are allowed to run more efficiently compared to conventional systems (e.g., the PX performs a portion of the increasing of pressure of the fluid to decrease the load of the pumps and/or compressors). Additionally, some systems described herein reduce the number of moving components (e.g., some systems use ejectors in lieu of boosters). This also allows systems of the present disclosure to have increased reliability, less maintenance, increased service life of components, decreased downtime of the system, and increased yield (e.g., of refrigeration, cooling, heating, etc.). The systems of the present disclosure may use a pressure exchanger that allows for longer life of components of the system, that increases system efficiency, allows end users to select from a larger range of pumps and/or compressors, reduces maintenance and downtime to service pumps and/or compressors, and allows for new instrumentation and control devices.

Although some embodiments of the present disclosure are described in relation to pressure exchangers, energy recovery devices, and hydraulic energy transfer systems, the current disclosure can be applied to other systems and devices (e.g., pressure exchanger that is not isobaric, rotating components that are not a pressure exchanger, a pressure exchanger that is not rotary, systems that do not include pressure exchangers, etc.).

Although some embodiments of the present disclosure are described in relation to exchanging pressure between fluid used in fracing systems, desalinization systems, heat pump systems, and/or refrigeration systems, the present disclosure can be applied to other types of systems. Fluids can refer to liquid, gas, transcritical fluid, supercritical fluid, subcritical fluid, and/or combinations thereof.

FIG. 1A illustrates a schematic diagram of a fluid handling system 100A that includes a hydraulic energy transfer system 110, according to certain embodiments.

In some embodiments, a hydraulic energy transfer system 110 includes a pressure exchanger (e.g., PX). The hydraulic energy transfer system 110 (e.g., PX) receives low pressure (LP) fluid in 120 (e.g., via a low-pressure inlet) from an LP in system 122. The hydraulic energy transfer system 110 also receives high pressure (HP) fluid in 130 (e.g., via a high-pressure inlet) from HP in system 132. The hydraulic energy transfer system 110 (e.g., PX) exchanges pressure between the HP fluid in 130 and the LP fluid in 120 to provide LP fluid out 140 (e.g., via low-pressure outlet) to LP fluid out system 142 and to provide HP fluid out 150 (e.g., via high-pressure outlet) to HP fluid out system 152. A controller 180 may cause an adjustment of flowrates of HP fluid in 130 and LP fluid out 140 by one or more flow valves, pumps, and/or compressors (not illustrated). The controller 180 may cause flow valves to actuate.

In some embodiments, the hydraulic energy transfer system 110 includes a PX to exchange pressure between the HP fluid in 130 and the LP fluid in 120. In some embodiments, the PX is substantially or partially isobaric (e.g., an isobaric pressure exchanger (IPX)). The PX may be a device that transfers fluid pressure between HP fluid in 130 and LP fluid in 120 at efficiencies (e.g., pressure transfer efficiencies, substantially isobaric) in excess of approximately 50%, 60%, 70%, 80%, 90%, or greater (e.g., without utilizing centrifugal technology). High pressure (e.g., HP fluid in 130, HP fluid out 150) refers to pressures greater than the low pressure (e.g., LP fluid in 120, LP fluid out 140). LP fluid in 120 of the PX may be pressurized and exit the PX at high pressure (e.g., HP fluid out 150, at a pressure greater than that of LP fluid in 120), and HP fluid in 130 may be at least partially depressurized and exit the PX at low pressure (e.g., LP fluid out 140, at a pressure less than that of the HP fluid in 130). The PX may operate with the HP fluid in 130 directly applying a force to pressurize the LP fluid in 120, with or without a fluid separator between the fluids.

Examples of fluid separators that may be used with the PX include, but are not limited to, pistons, bladders, diaphragms, and/or the like. In some embodiments, PXs may be rotary devices. Rotary PXs, such as those manufactured by Energy Recovery, Inc. of San Leandro, Calif., may not have any separate valves, since the effective valving action is accomplished internal to the device via the relative motion of a rotor with respect to end covers. In some embodiments, rotary PXs operate with internal pistons to isolate fluids and transfer pressure with relatively little mixing of the inlet fluid streams. In some embodiments, rotary PXs operate without internal pistons between the fluids. Reciprocating PXs may include a piston moving back and forth in a cylinder for transferring pressure between the fluid streams. Any PX or multiple PXs may be used in the present disclosure, such as, but not limited to, rotary PXs, reciprocating PXs, or any combination thereof. In addition, the PX may be disposed on a skid separate from the other components of a fluid handling system 100A (e.g., in situations in which the PX is added to an existing fluid handling system). In some examples, the PX may be fastened to a structure that can be moved from one site to another. The PX may be coupled to a system (e.g., pipes of a system, etc.) that has been built on-site. The structure to which the PX is fastened may be referred to as a 'skid.'

In some embodiments, a motor 160 is coupled to hydraulic energy transfer system 110 (e.g., to a PX). In some embodiments, the motor 160 controls the speed of a rotor of the hydraulic energy transfer system 110 (e.g., to increase pressure of HP fluid out 150, to decrease pressure of HP fluid out 150, etc.). In some embodiments, motor 160 generates energy (e.g., acts as a generator) based on pressure exchanging in hydraulic energy transfer system 110.

The hydraulic energy transfer system 110 may include a hydraulic turbocharger or hydraulic pressure exchanger, such as a rotating PX. The PX may include one or more chambers and/or channels (e.g., 1 to 100) to facilitate pressure transfer between first and second fluids (e.g., gas, liquid, multi-phase fluid). In some embodiments, the PX may transfer pressure between a first fluid (e.g., pressure exchange fluid, such as a proppant free fluid, substantially proppant free fluid, lower viscosity fluid, fluid that has lower than a threshold amount of certain chemicals, etc.) and a second fluid that may have a higher viscosity (e.g., be highly viscous), include more than a threshold amount of certain chemicals, and/or contain solid particles (e.g., frac fluid and/or fluid containing sand, proppant, powders, debris, ceramics, contaminants, particles from welded or soldered joints, etc.).

In some embodiments, LP in system 122 includes a booster (e.g., a pump and/or a compressor) to increase pressure of fluid to form LP fluid in 120. In some embodiments, LP in system 122 includes an ejector to increase pressure of fluid to form LP fluid in 120. In some embodiments, LP in system 122 receives a gas from LP out system 142. In some embodiments, LP in system 122 receives fluid from a receiver (e.g., a flash tank, etc.). The receiver may receive LP fluid out 140 output from hydraulic energy transfer system 110.

Fluid handling system 100A may additionally include one or more sensors to provide sensor data (e.g., flowrate data, pressure data, velocity data, etc.) associated with the fluids of fluid handling system 100A. Controller 180 may control one or more flow rates of fluid handling system 100A based on the sensor data. In some embodiments, controller 180 causes one or more flow valves to actuate based on sensor data received. In some embodiments, controller 180 can perform the methods of one or more of FIGS. 6A-C.

One or more components of the hydraulic energy transfer system 110 may be used in different types of systems, such as fracing systems, desalination systems, refrigeration and heat pump systems (e.g., FIG. 1B), slurry pumping systems, industrial fluid systems, waste fluid systems, fluid transportation systems, heat transfer systems, etc.

Figure 1B:
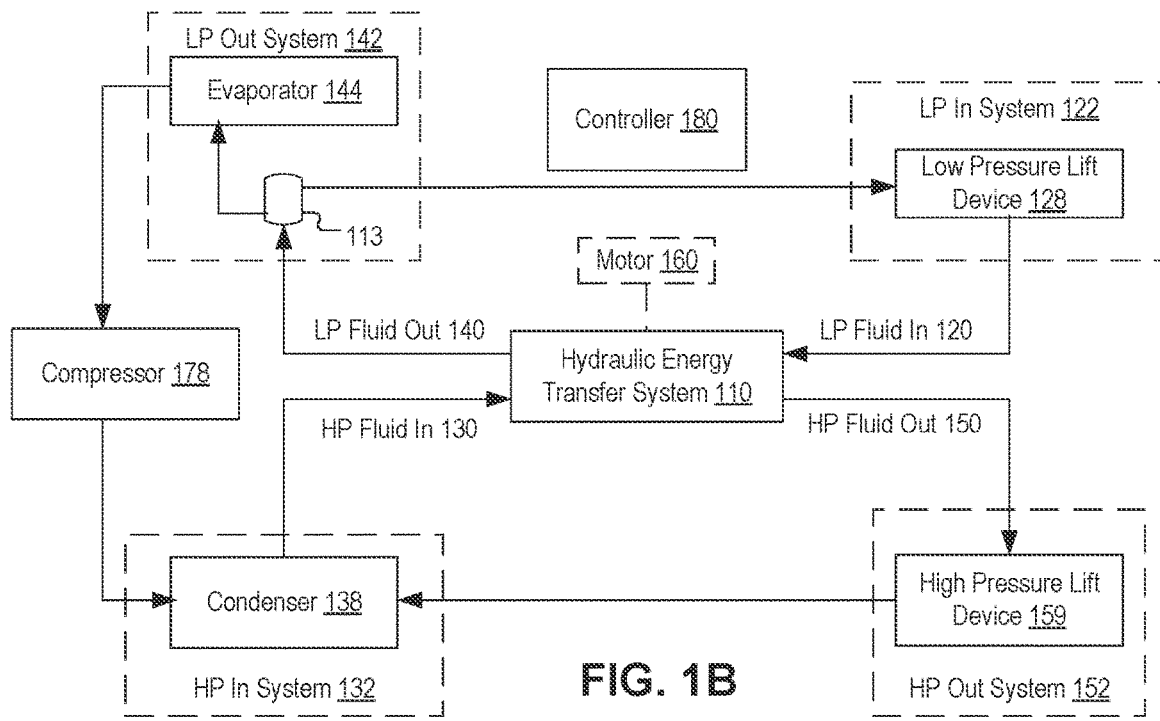
Figure 2A:
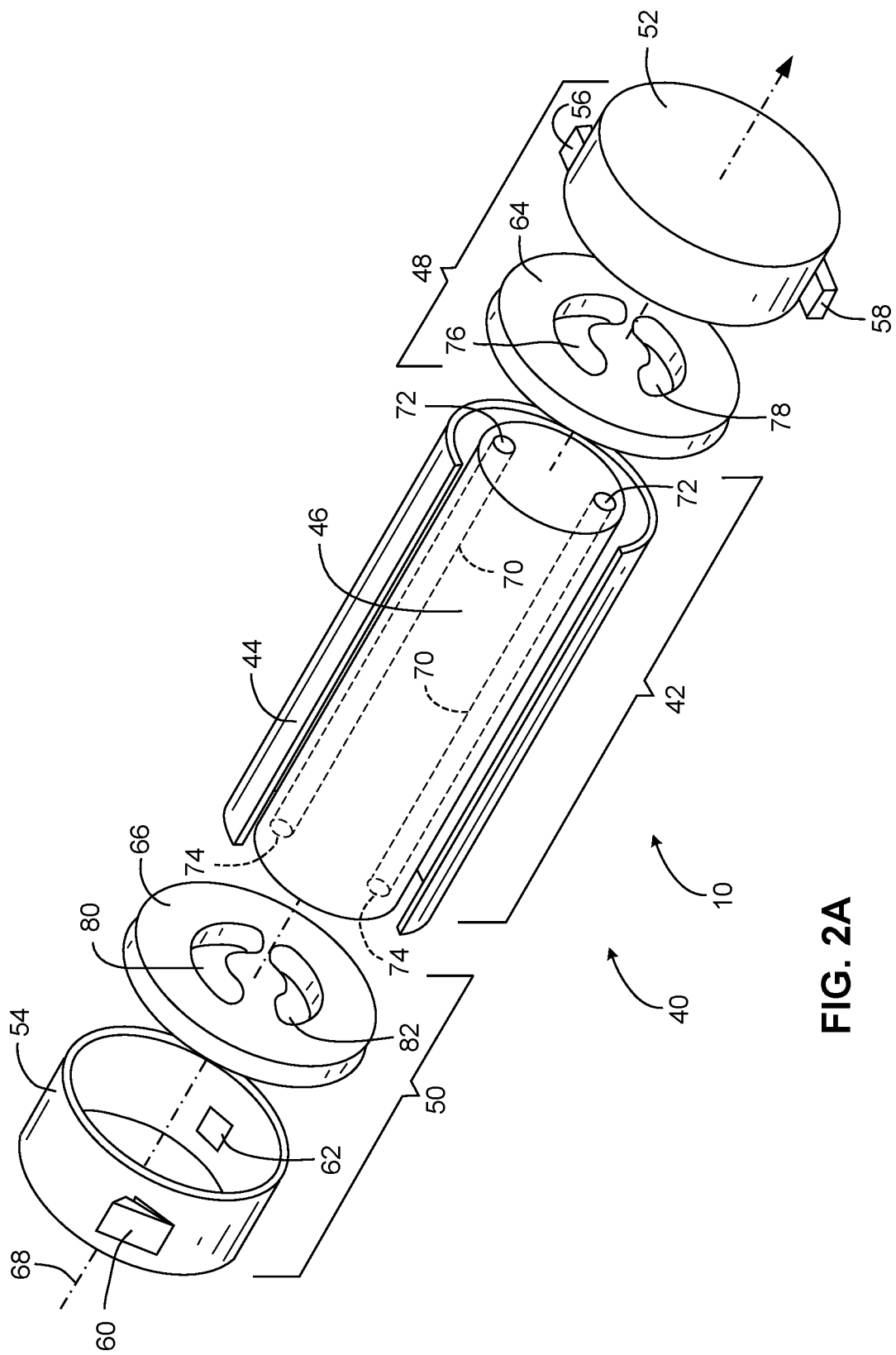

FIG. 1B illustrates a schematic diagram of a fluid handling system 100B including a hydraulic energy transfer system 110, according to certain embodiments. Fluid handling system 100B may be a refrigeration system or a heat pump system. In some embodiments, fluid handling system 100B is a thermal energy (e.g., heat) transport system (e.g., heat transport system, thermal transport system). Fluid handling system 100B may be configured to cool and/or heat an environment (e.g., an indoor space, a refrigerator, a freezer, etc.). In some embodiments, fluid handling system 100B includes more components, less components, same routing, different routing, and/or the like than that shown in FIG. 1B. Some of the features in FIG. 1B that have similar reference numbers as those in FIG. 1A may have similar properties, functions, and/or structures as those in FIG. 1A.

Hydraulic energy transfer system 110 (e.g., PX) may receive LP fluid in 120 from LP in system 122 (e.g., low pressure lift device 128, low pressure fluid pump, low pressure booster, low pressure compressor, low pressure ejector, etc.) and HP fluid in 130 from HP in system 132 (e.g., condenser 138, gas cooler, heat exchanger, etc.). The hydraulic energy transfer system 110 (e.g., PX) may exchange pressure between the LP fluid in 120 and HP fluid in 130 to provide HP fluid out 150 to HP out system 152 (e.g., high pressure lift device 159, high pressure fluid pump, high pressure booster, high pressure compressor, high pressure ejector, etc.) and to provide LP fluid out 140 to LP out system 142 (e.g., evaporator 144, heat exchanger, receiver 113, etc.). The LP out system 142 (e.g., evaporator 144, receiver 113) may provide the fluid to compressor 178 and low pressure lift device 128. The evaporator 144 may provide the fluid to compressor 178 and the receiver 113 (e.g., flash tank) may provide fluid to the low pressure lift device 128. The condenser 138 may receive fluid from compressor 178 and high pressure lift device 159. Controller 180 may control one or more components of fluid handling system 100B. High pressure lift device 159 may be a high pressure booster and low pressure lift device 128 may be a low pressure booster.

The fluid handling system 100B may be a closed system. LP fluid in 120, HP fluid in 130, LP fluid out 140, and HP fluid out 150 may all be a fluid (e.g., refrigerant, the same fluid) that is circulated in the closed system of fluid handling system 100B.

Fluid handling system 100B may additionally include one or more sensors configured to provide sensor data associated with the fluid. One or more flow valves may control flowrates of the fluid based on sensor data received from the one or more sensors. In some embodiments, controller 180 causes one or more flow valves (not illustrated) to actuate based on sensor data received.

FIGS. 2A-E are exploded perspective views a rotary PX 40 (e.g., rotary pressure exchanger, rotary liquid piston compressor (LPC)), according to certain embodiments. Some of the features in one or more of FIGS. 2A-E may have similar properties, functions, and/or structures as those in one or more of FIGS. 1A-B.

PX 40 is configured to transfer pressure and/or work between a first fluid (e.g., refrigerant, particle free fluid, proppant free fluid, supercritical carbon dioxide, HP fluid in 130) and a second fluid (e.g., refrigerant, slurry fluid, frac fluid, superheated gaseous carbon dioxide, LP fluid in 120) with minimal mixing of the fluids. The rotary PX 40 may include a generally cylindrical body portion 42 that includes a sleeve 44 (e.g., rotor sleeve) and a rotor 46. The rotary PX 40 may also include two end caps 48 and 50 that include manifolds 52 and 54, respectively. Manifold 52 includes respective inlet port 56 and outlet port 58, while manifold 54 includes respective inlet port 60 and outlet port 62. In operation, these inlet ports 56, 60 enable the first and second fluids to enter the rotary PX 40 to exchange pressure, while the outlet ports 58, 62 enable the first and second fluids to then exit the rotary PX 40. In operation, the inlet port 56 may receive a high-pressure first fluid (e.g., HP fluid in 130) output from a condenser, and after exchanging pressure, the outlet port 58 may be used to route a low-pressure first fluid (e.g., LP fluid out 140) out of the rotary PX 40 to a receiver (e.g., flash tank) configured to receive the first fluid from the rotary PX 40. The receiver may form a chamber configured to separate the fluid into a gas and a liquid. Similarly, the inlet port 60 may receive a low-pressure second fluid (e.g., low pressure slurry fluid, LP fluid in 120) from a booster configured to receive a portion of the gas from the receiver and increase pressure of the gas, and the outlet port 62 may be used to route a high-pressure second fluid (e.g., high pressure slurry fluid, HP fluid out 150) out of the rotary PX 40. The end caps 48 and 50 include respective end covers 64 and 66 (e.g., end plates) disposed within respective manifolds 52 and 54 that enable fluid sealing contact with the rotor 46.

One or more components of the PX 40, such as the rotor 46, the end cover 64, and/or the end cover 66, may be constructed from a wear-resistant material (e.g., carbide, cemented carbide, silicon carbide, tungsten carbide, etc.) with a hardness greater than a predetermined threshold (e.g., a Vickers hardness number that is at least 1000, 1250, 1500, 1750, 2000, 2250, or more). In some examples, tungsten carbide may be more durable and may provide improved wear resistance to abrasive fluids as compared to other materials, such as alumina ceramics. Additionally, in some embodiments, one or more components of the PX 40, such as the rotor 46, the end cover 64, the end cover 66, and/or other sealing surfaces of the PX 40, may include an insert. In some embodiments, the inserts may be constructed from one or more wear-resistant materials (e.g., carbide, cemented carbide, silicon carbide, tungsten carbide, etc.) with a hardness greater than a predetermined threshold (e.g., a Vickers hardness number that is at least 1000, 1250, 1500, 1750, 2000, 2250, or more) to provide improved wear resistance.

The rotor 46 may be cylindrical and disposed in the sleeve 44, which enables the rotor 46 to rotate about the axis 68. The rotor 46 may have a plurality of channels 70 (e.g., ducts, rotor ducts) extending substantially longitudinally through the rotor 46 with openings 72 and 74 (e.g., rotor ports) at each end arranged symmetrically about the longitudinal axis 68. The openings 72 and 74 of the rotor 46 are arranged for hydraulic communication with inlet and outlet apertures 76 and 78 (e.g., end cover inlet port and end cover outlet port) and 80 and 82 (e.g., end cover inlet port and end cover outlet port) in the end covers 64 and 66, in such a manner that during rotation the channels 70 are exposed to fluid at high-pressure and fluid at low-pressure. As illustrated, the inlet and outlet apertures 76 and 78 and 80 and 82 may be designed in the form of arcs or segments of a circle (e.g., C-shaped).

In some embodiments, a controller (e.g., controller 180 of FIGS. 1A-B) using sensor data (e.g., revolutions per minute measured through a tachometer or optical encoder, volumetric flow rate measured through flowmeter, etc.) may control the extent of mixing between the first and second fluids in the rotary PX 40, which may be used to improve the operability of the fluid handling system (e.g., fluid handling systems 100A-B of FIGS. 1A-B). In some examples, varying the volumetric flow rates of the first and/or second fluids entering the rotary PX 40 allows the operator (e.g., system operator, plant operator) to control the amount of fluid mixing within the PX 40. In addition, varying the rotational speed of the rotor 46 (e.g., via a motor) also allows the operator to control mixing. Three characteristics of the rotary PX 40 that affect mixing are: (1) the aspect ratio of the rotor channels 70; (2) the duration of exposure between the first and second fluids; and (3) the creation of a barrier (e.g., fluid barrier, piston, interface) between the first and second fluids within the rotor channels 70. First, the rotor channels 70 (e.g., ducts) are generally long and narrow, which stabilizes the flow within the rotary PX 40. In addition, the first and second fluids may move through the channels 70 in a plug flow regime with minimal axial mixing. Second, in certain embodiments, the speed of the rotor 46 reduces contact between the first and second fluids. In some examples, the speed of the rotor 46 (e.g., rotor speed of approximately 1200 revolutions per minute (RPM)) may reduce contact times between the first and second fluids to less than approximately 0.15 seconds, 0.10 seconds, or 0.05 seconds. Third, the rotor channel 70 (e.g., a small portion of the rotor channel 70) is used for the exchange of pressure between the first and second fluids. In some embodiments, a volume of fluid remains in the channel 70 as a barrier between the first and second fluids. All these mechanisms may limit mixing within the rotary PX 40. Moreover, in some embodiments, the rotary PX 40 may be designed to operate with internal pistons or other barriers, either complete or partial, that isolate the first and second fluids while enabling pressure transfer.

FIGS. 2B-2E are exploded views of an embodiment of the rotary PX 40 illustrating the sequence of positions of a single rotor channel 70 in the rotor 46 as the channel 70 rotates through a complete cycle. It is noted that FIGS. 2B-2E are simplifications of the rotary PX 40 showing one rotor channel 70, and the channel 70 is shown as having a circular cross-sectional shape. In other embodiments, the rotary PX 40 may include a plurality of channels 70 with the same or different cross-sectional shapes (e.g., circular, oval, square, rectangular, polygonal, etc.). Thus, FIGS. 2B-2E are simplifications for purposes of illustration, and other embodiments of the rotary PX 40 may have configurations different from those shown in FIGS. 2A-2E. As described in detail below, the rotary PX 40 facilitates pressure exchange between first and second fluids (e.g., a particulate-free fluid and a slurry fluid, higher pressure refrigerant and lower pressure refrigerant, etc.) by enabling the first and second fluids to briefly contact each other within the rotor 46. In some embodiments, the PX facilitates pressure exchange between first and second fluids by enabling the first and second fluids to contact opposing sides of a barrier (e.g., a reciprocating barrier, a piston, not shown). In some embodiments, this exchange happens at speeds that result in limited mixing of the first and second fluids. The speed of the pressure wave traveling through the rotor channel 70 (as soon as the channel is exposed to the aperture 76), the diffusion speeds of the fluids, and/or the rotational speed of rotor 46 may dictate whether any mixing occurs and to what extent.

FIG. 2B is an exploded perspective view of an embodiment of a rotary PX 40 (e.g., rotary LPC), according to certain embodiments. In FIG. 2B, the channel opening 72 is in a first position. In the first position, the channel opening 72 is in fluid communication with the aperture 78 in end cover 64 and therefore with the manifold 52, while the opposing channel opening 74 is in hydraulic communication with the aperture 82 in end cover 66 and by extension with the manifold 54. The rotor 46 may rotate in the clockwise direction indicated by arrow 84. In operation, low-pressure second fluid 86 (e.g., low pressure slurry fluid) passes through end cover 66 and enters the channel 70, where it contacts the first fluid 88 at a dynamic fluid interface 90. The second fluid 86 then drives the first fluid 88 out of the channel 70, through end cover 64, and out of the rotary PX 40. However, because of the short duration of contact, there is minimal mixing between the second fluid 86 (e.g., slurry fluid) and the first fluid 88 (e.g., particulate-free fluid). In some embodiments, low pressure second fluid 86 contacts a first side of a barrier (e.g., a piston, not shown) disposed in channel 70 that is in contact (e.g., on an opposing side of the barrier) by first fluid 88. The second fluid 86 drives the barrier which pushes first fluid 88 out of the channel 70. In such embodiments, there is negligible mixing between the second fluid 86 and the first fluid 88.

FIG. 2C is an exploded perspective view of an embodiment of a rotary PX 40 (e.g., rotary LPC), according to certain embodiments. In FIG. 2C, the channel 70 has rotated clockwise through an arc of approximately 90 degrees. In this position, the opening 74 (e.g., outlet) is no longer in fluid communication with the apertures 80 and 82 of end cover 66, and the opening 72 is no longer in fluid communication with the apertures 76 and 78 of end cover 64. Accordingly, the low-pressure second fluid 86 is temporarily contained within the channel 70.

FIG. 2D is an exploded perspective view of an embodiment of a rotary PX 40 (e.g., rotary LPC), according to certain embodiments. In FIG. 2D, the channel 70 has rotated through approximately 60 degrees of arc from the position shown in FIG. 2B. The opening 74 is now in fluid communication with aperture 80 in end cover 66, and the opening 72 of the channel 70 is now in fluid communication with aperture 76 of the end cover 64. In this position, high-pressure first fluid 88 enters and pressurizes the low-pressure second fluid 86, driving the second fluid 86 out of the rotor channel 70 and through the aperture 80.

FIG. 2E is an exploded perspective view of an embodiment of a rotary PX 40 (e.g., rotary LPC), according to certain embodiments. In FIG. 2E, the channel 70 has rotated through approximately 270 degrees of arc from the position shown in FIG. 2B. In this position, the opening 74 is no longer in fluid communication with the apertures 80 and 82 of end cover 66, and the opening 72 is no longer in fluid communication with the apertures 76 and 78 of end cover 64. Accordingly, the first fluid 88 is no longer pressurized and is temporarily contained within the channel 70 until the rotor 46 rotates another 90 degrees, starting the cycle over again.

Figure 3A:
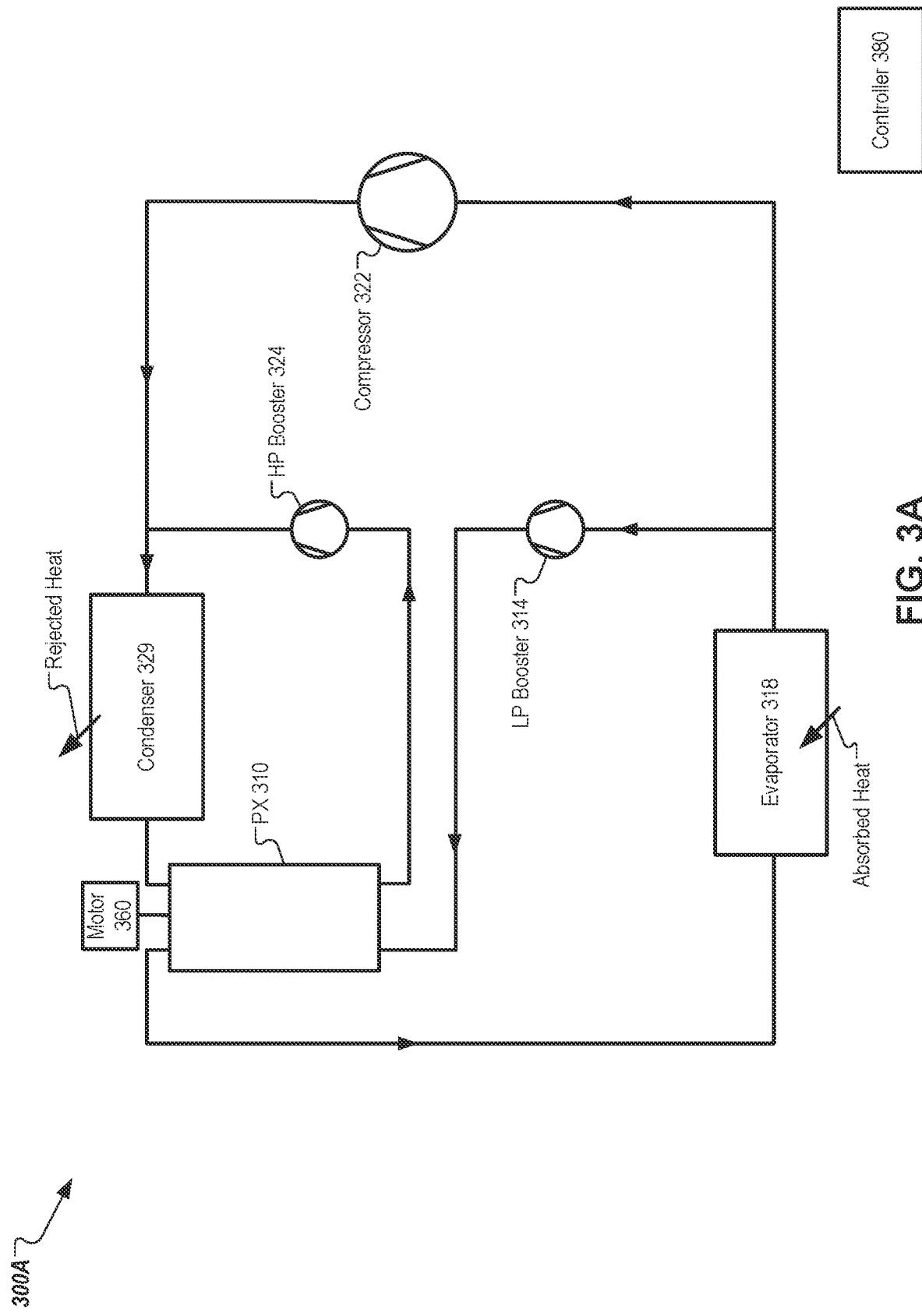
FIGS. 3A-P are schematic diagrams of refrigeration systems including PXs, according to certain embodiments.
Figure 3B:
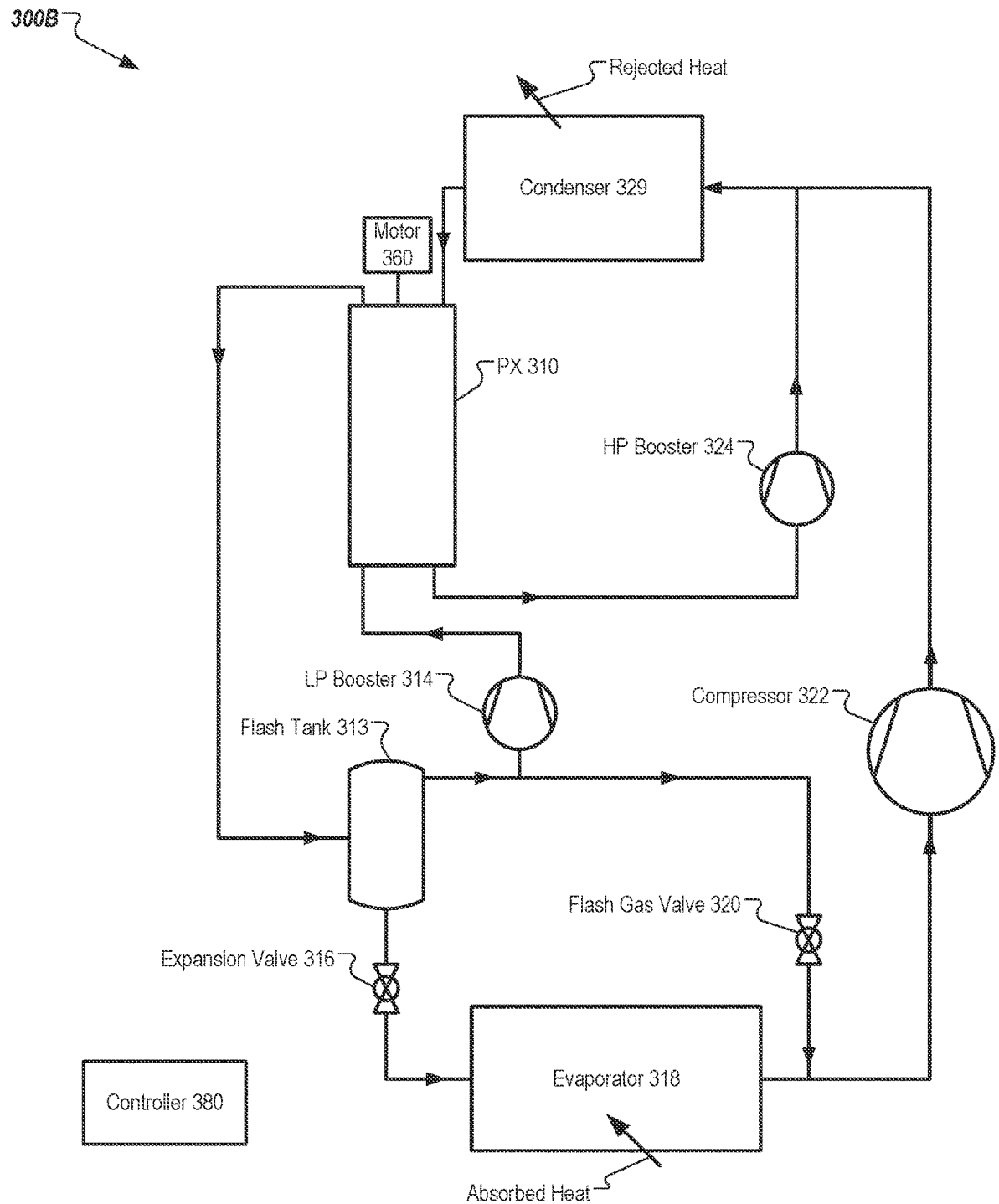
Figure 3C:
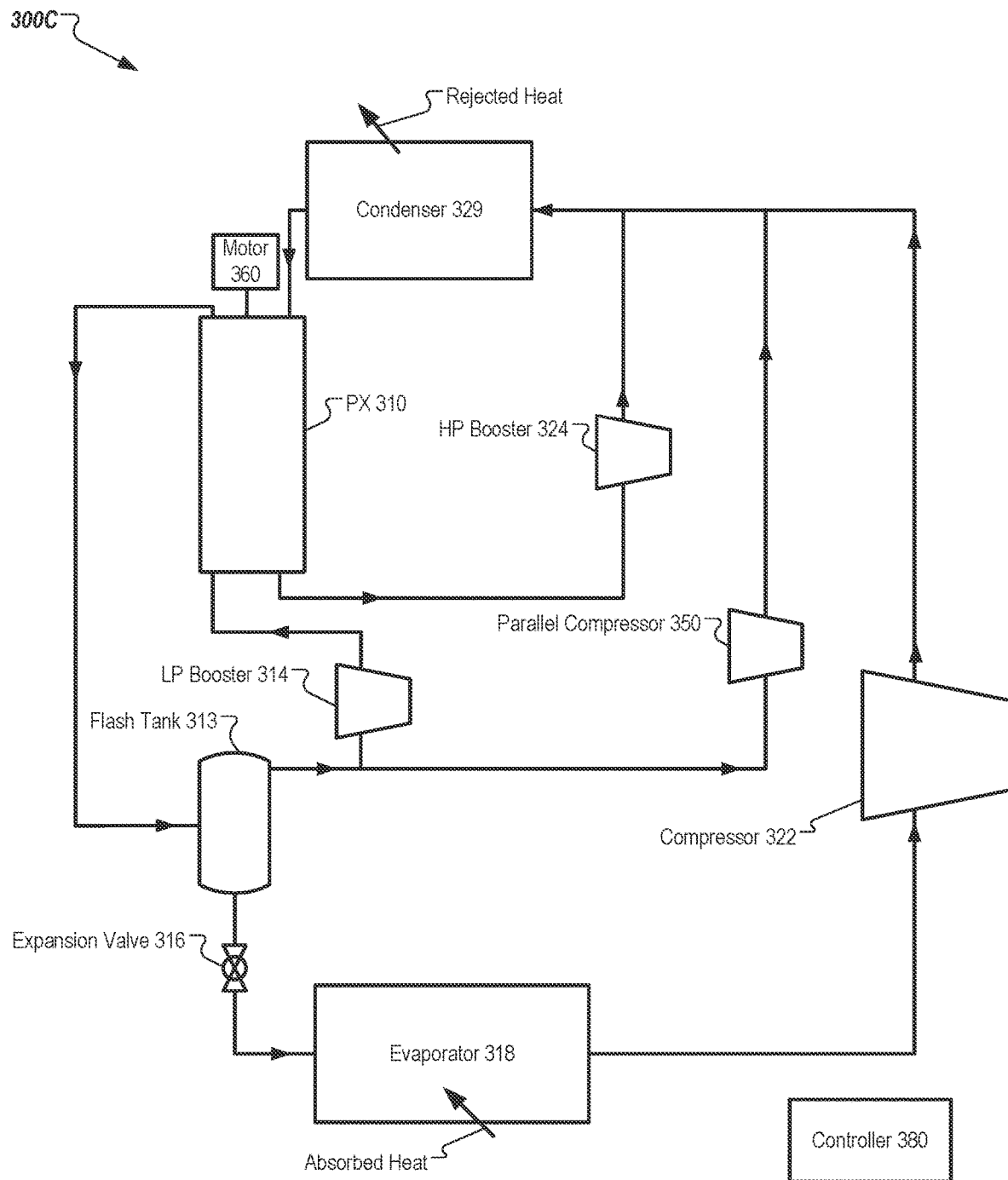
Figure 3D:
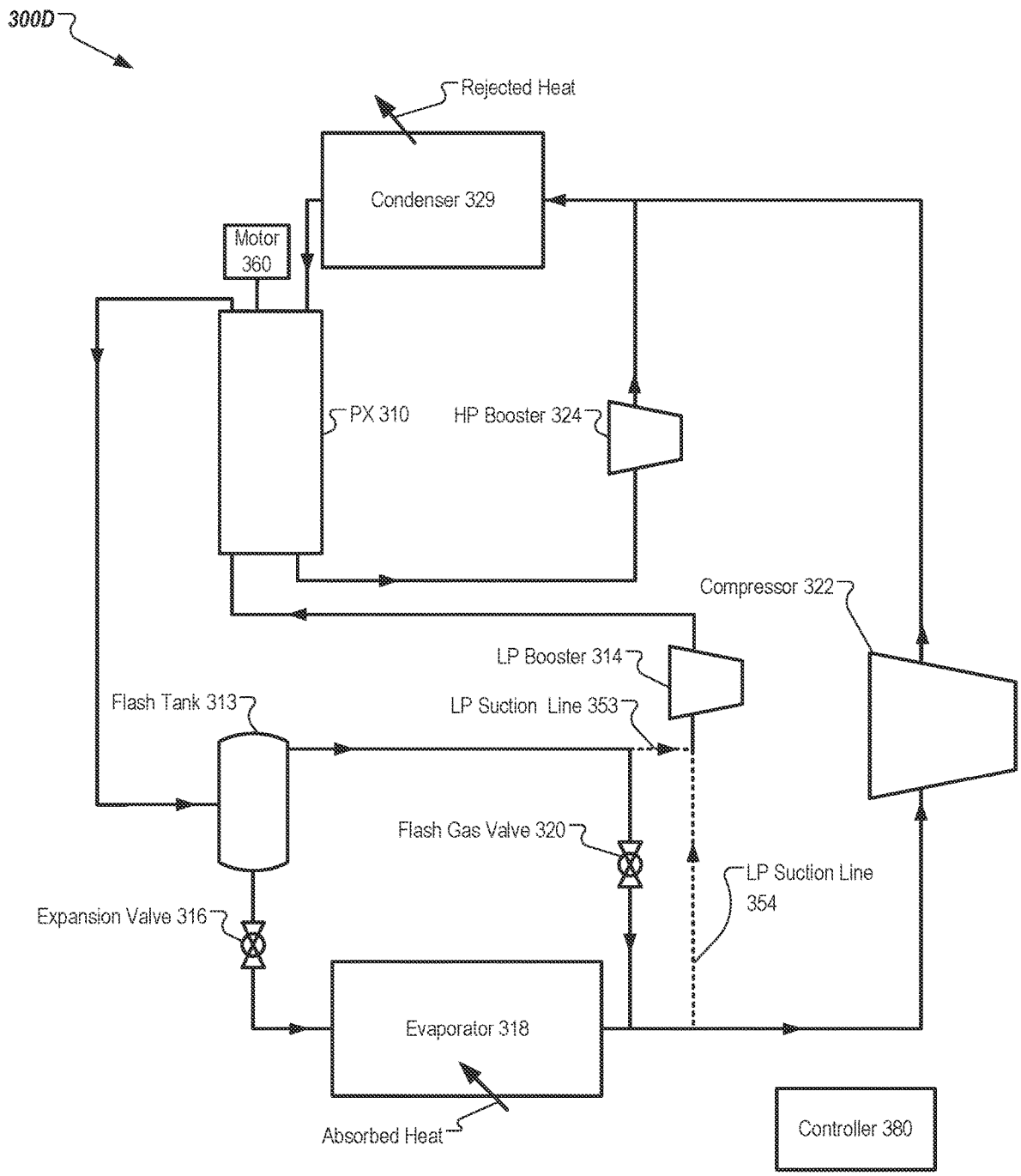
Figure 3E:
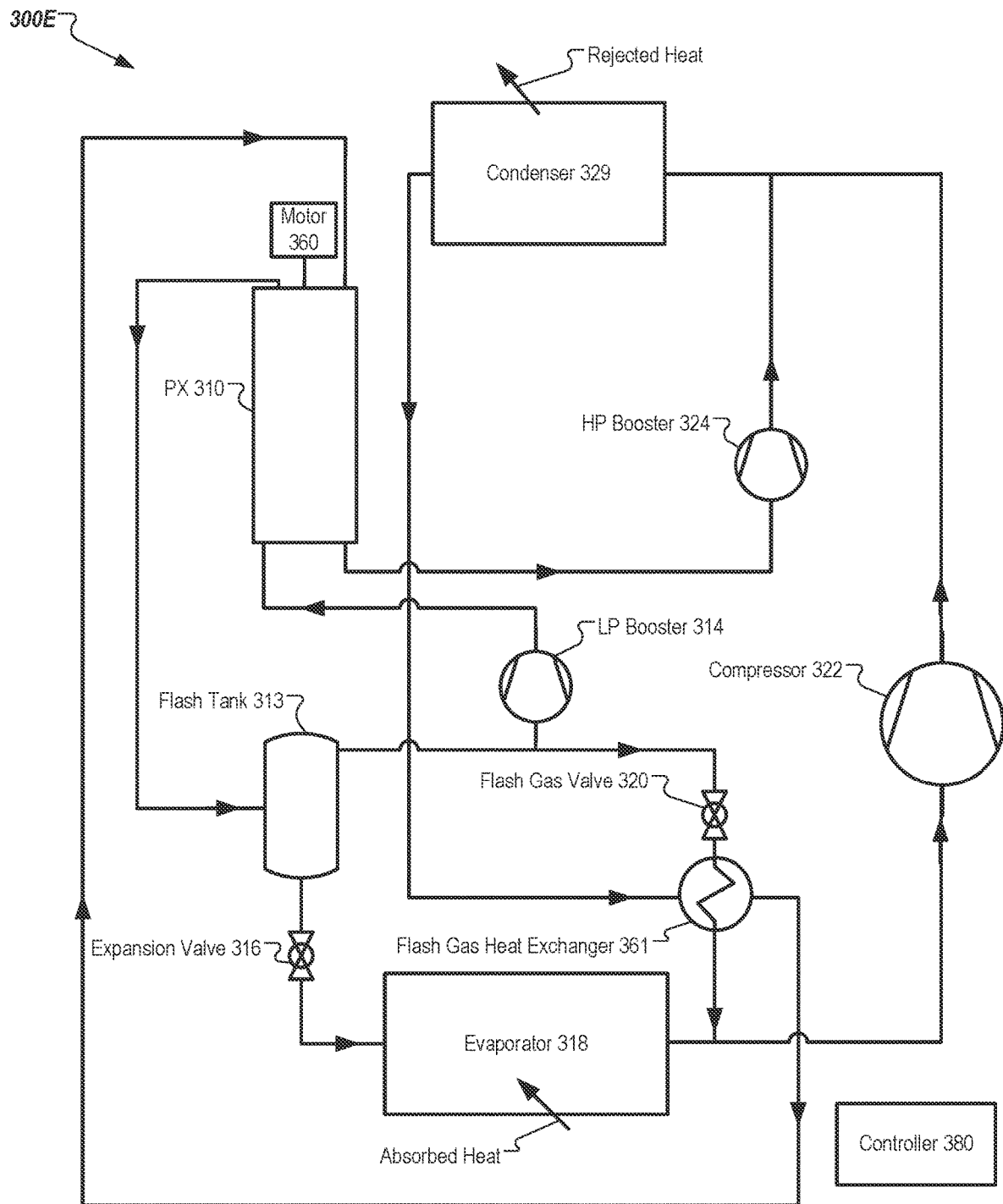
Figure 3F:
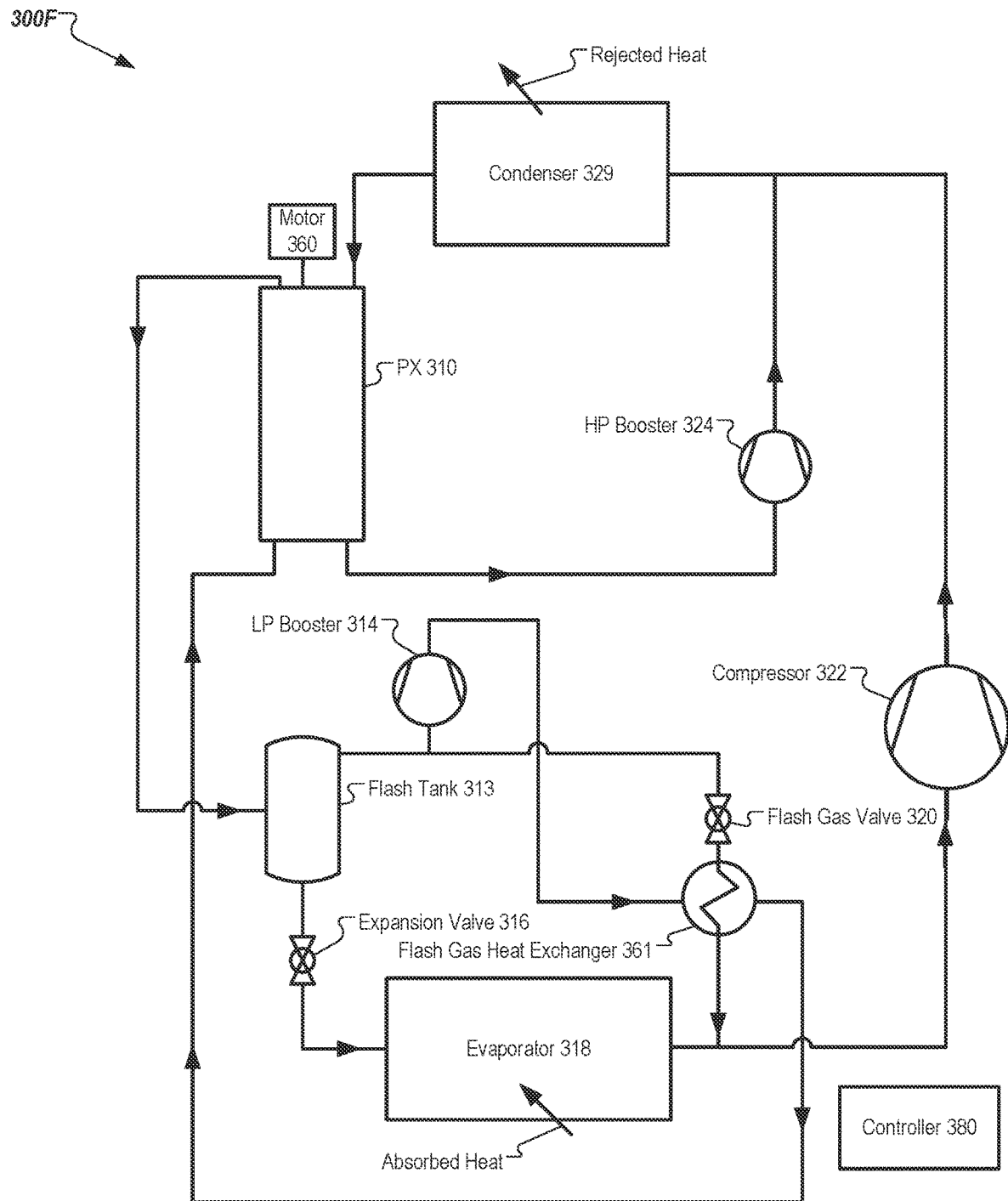
Figure 3G:
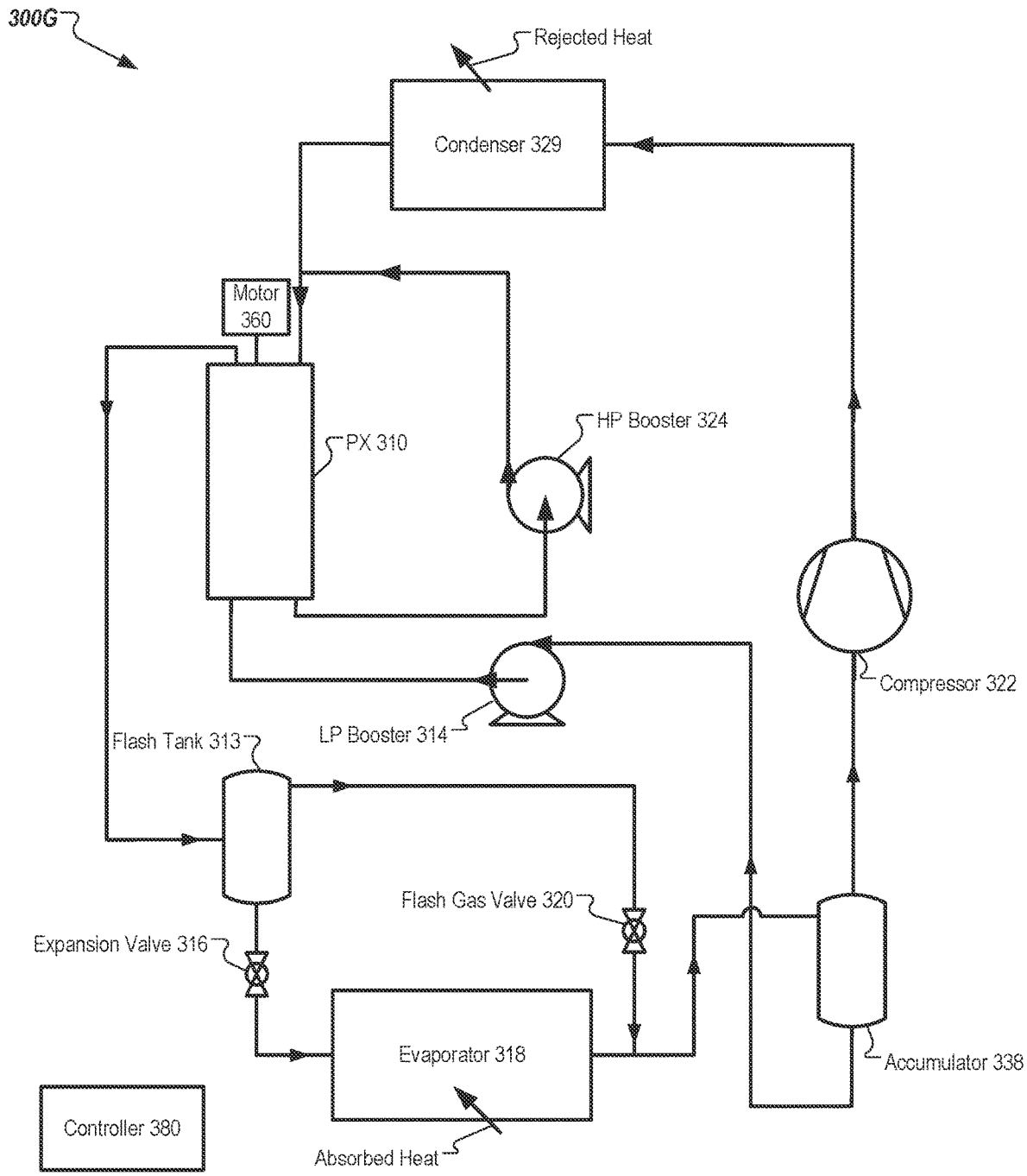
Figure 3H:
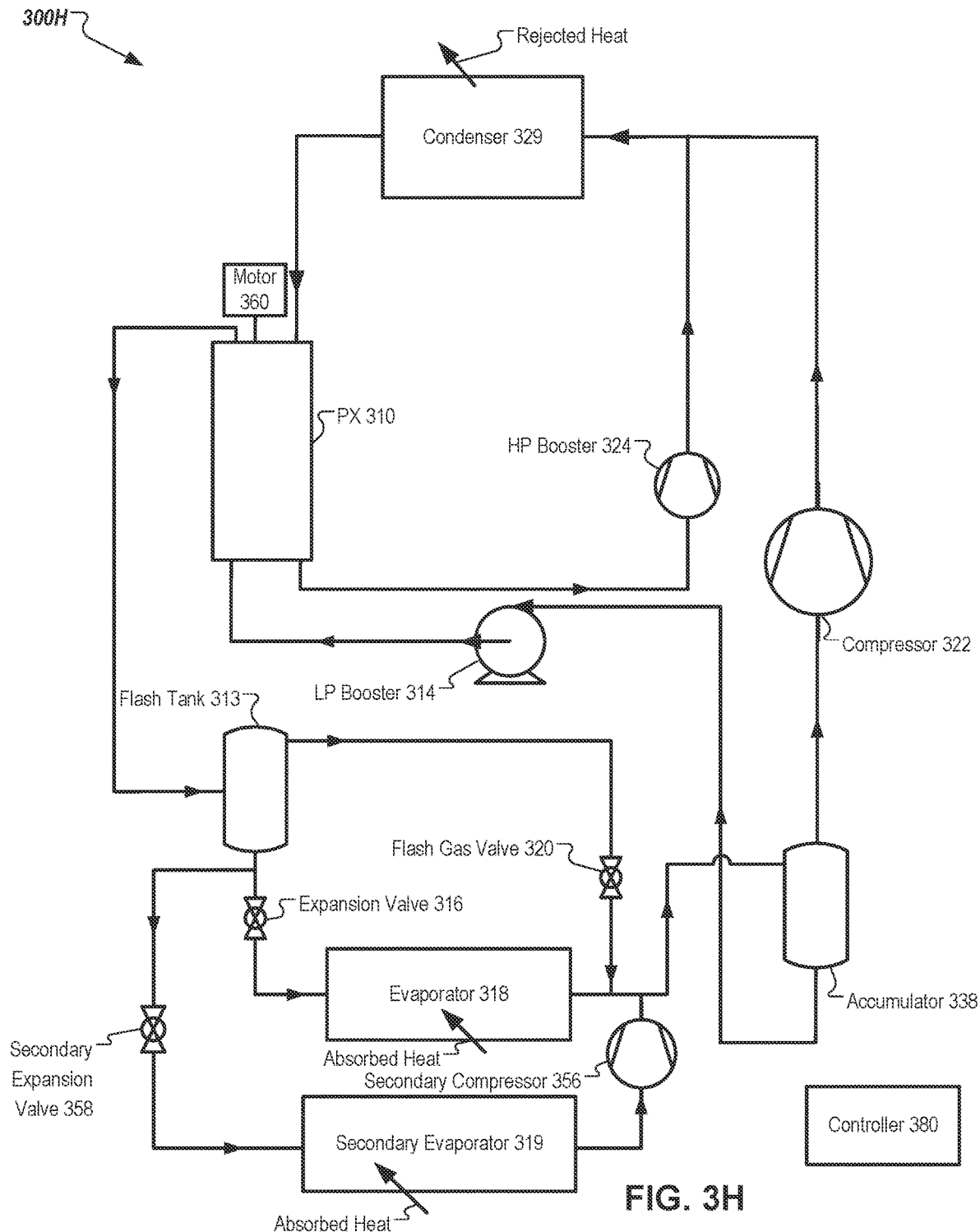
Figure 3I:
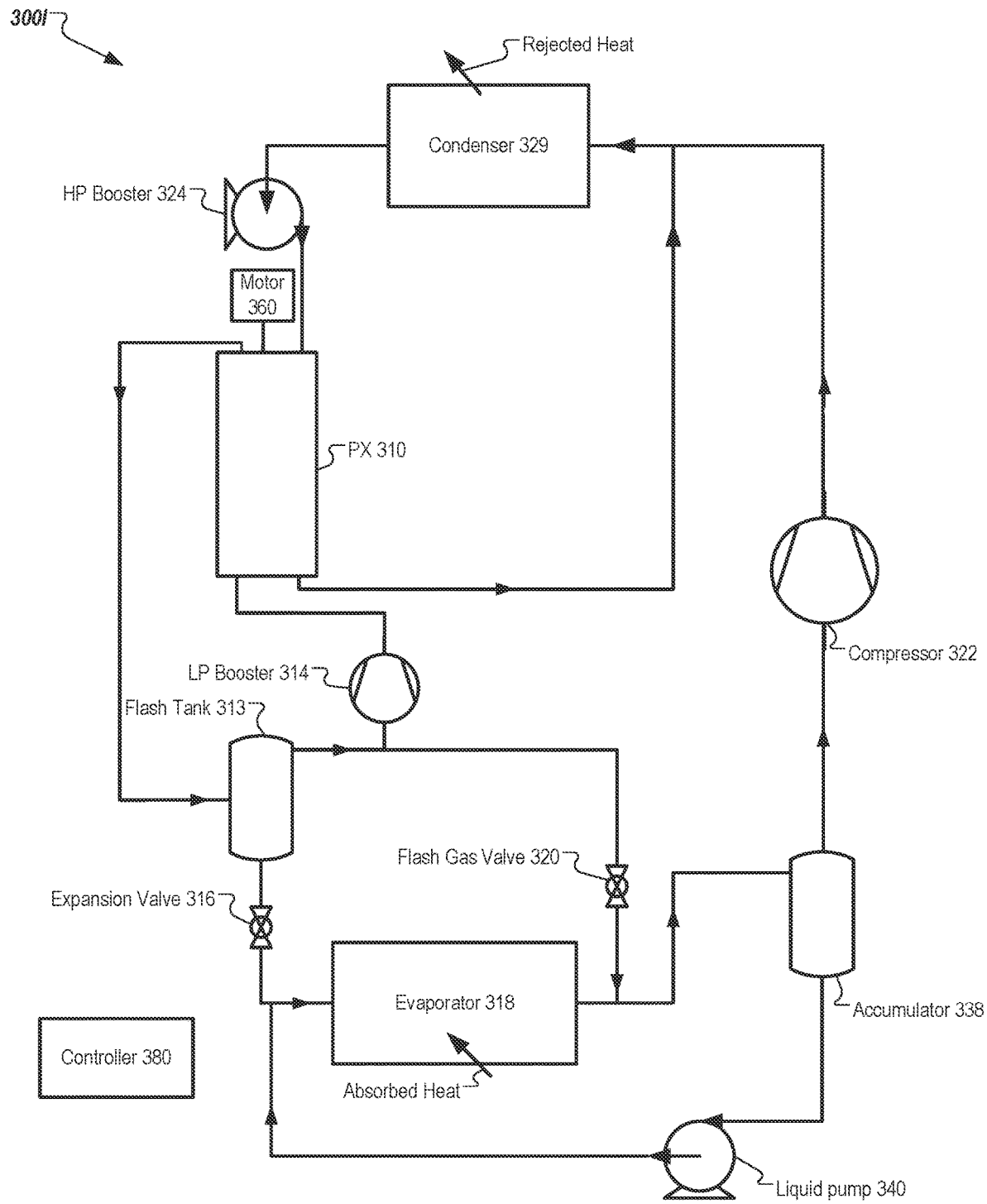
Figure 3J:
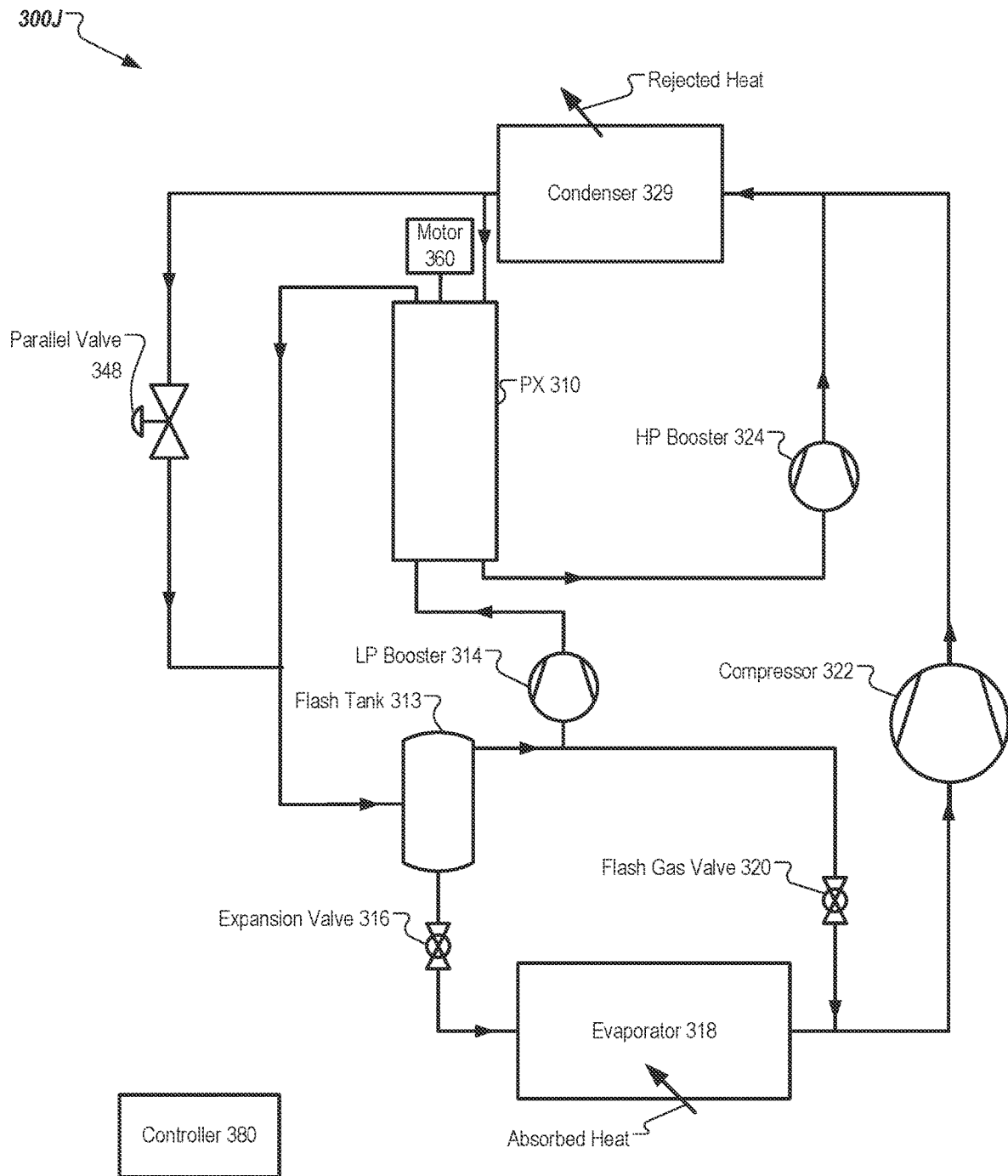
Figure 3K:
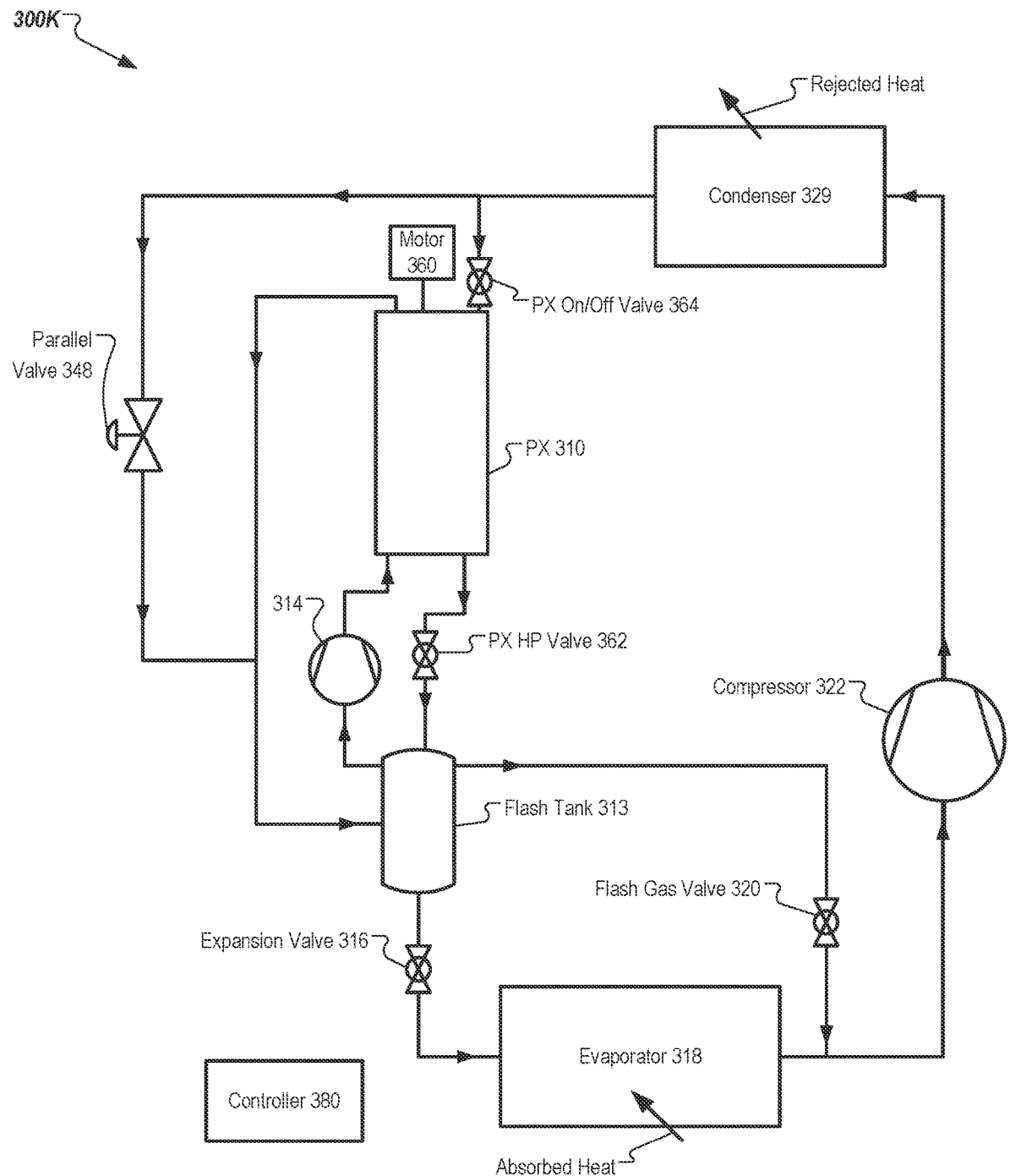
Figure 3L:
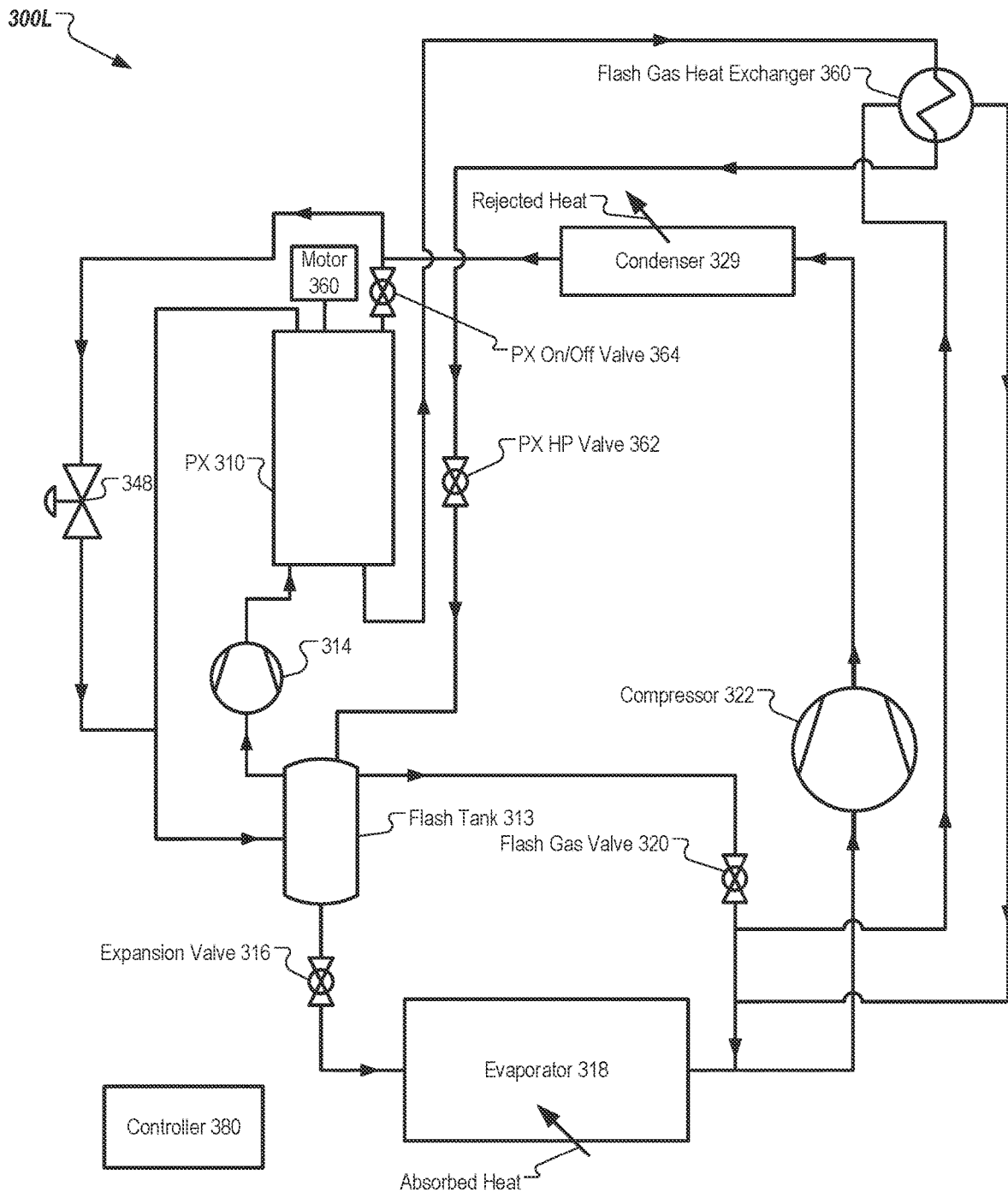
Figure 3M:
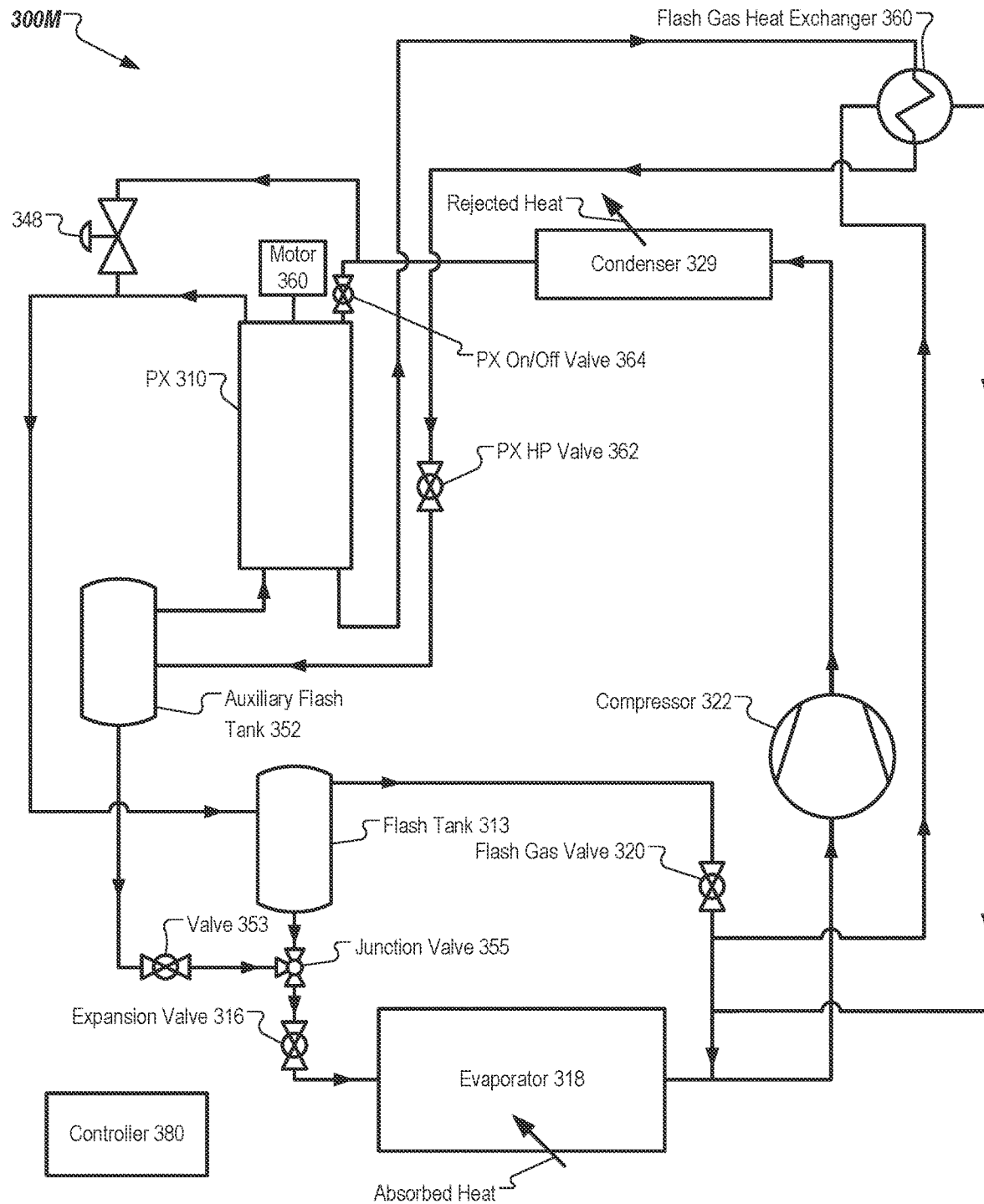
Figure 3N:
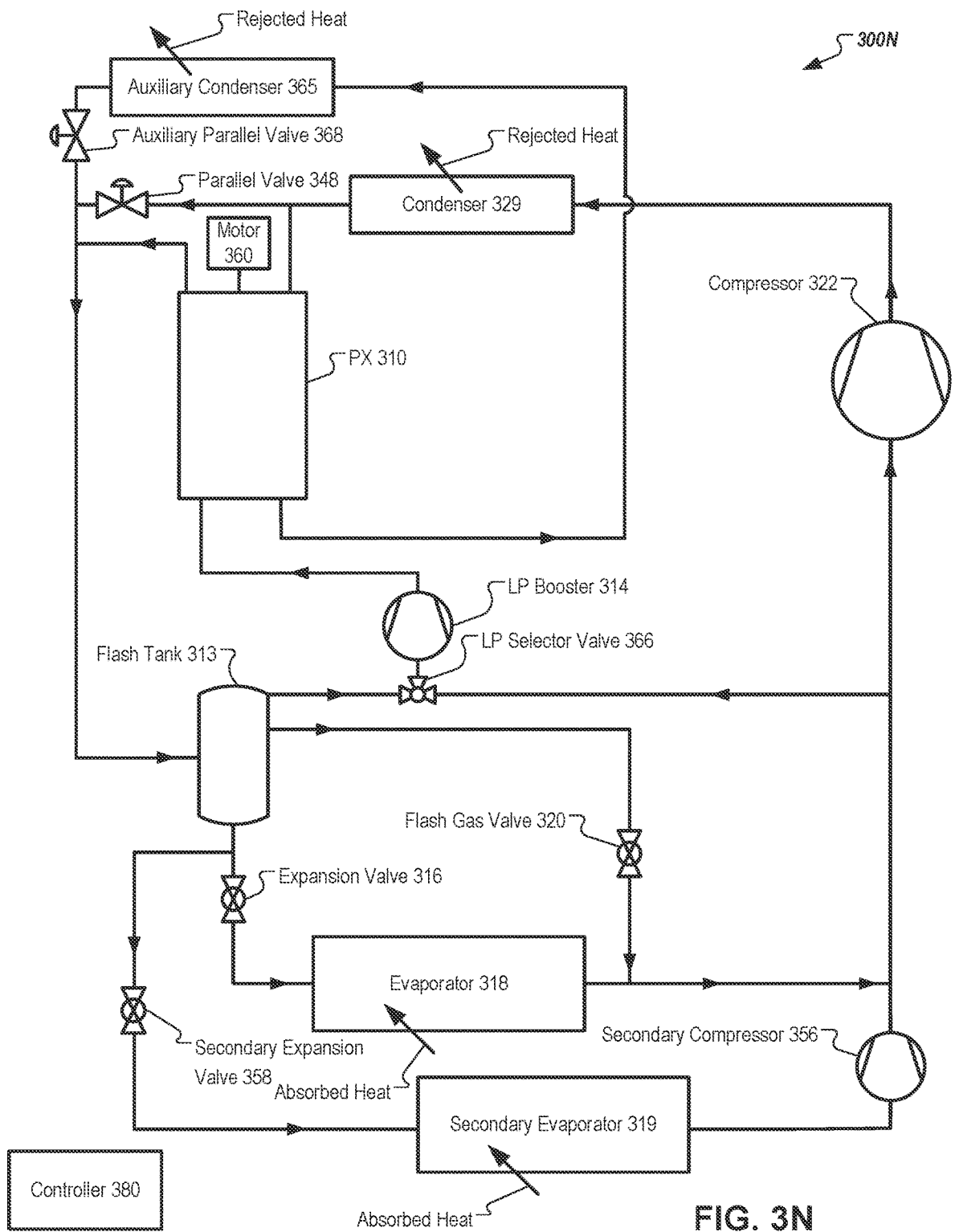
Figure 30:
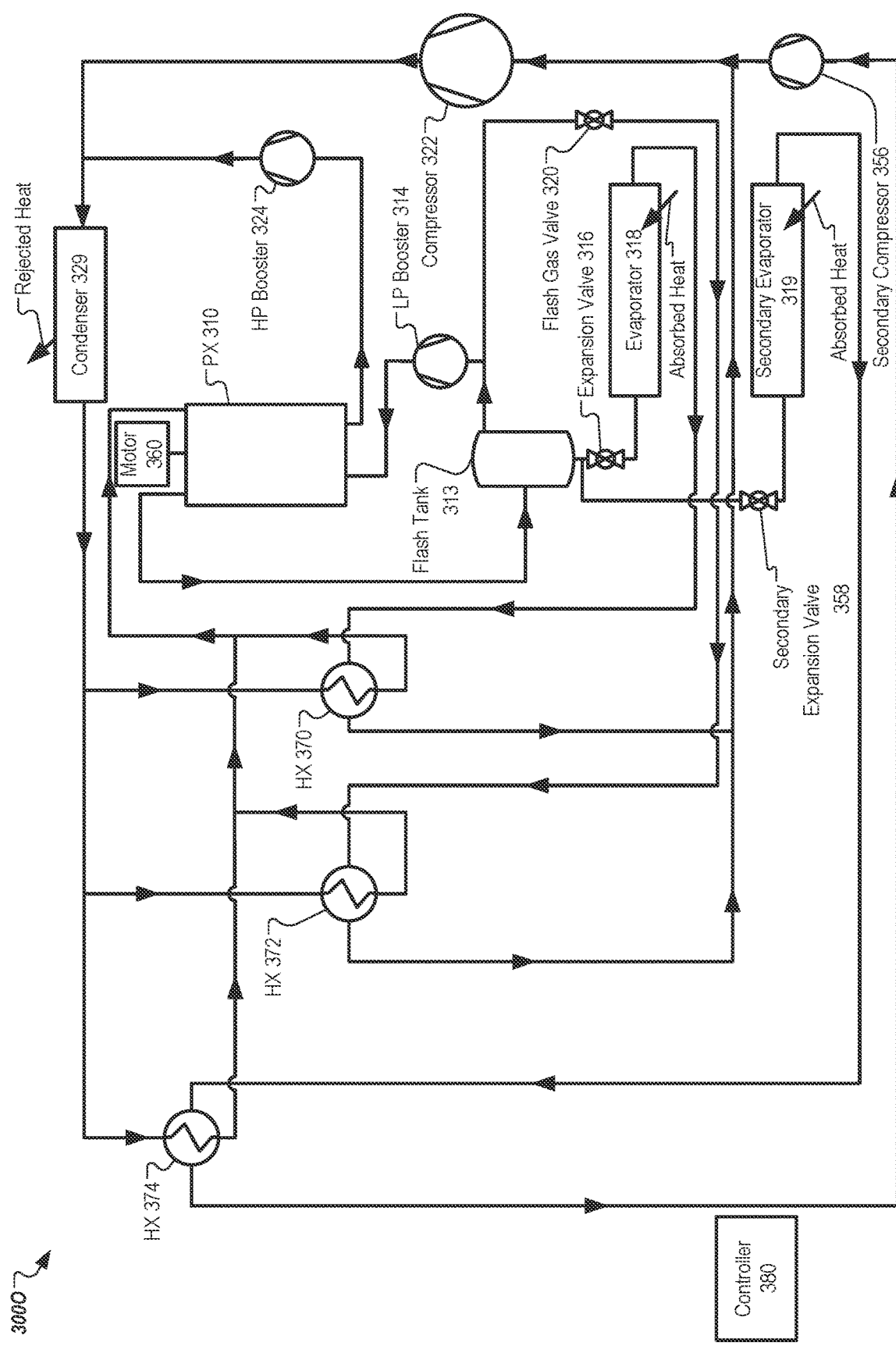
Figure 3P:
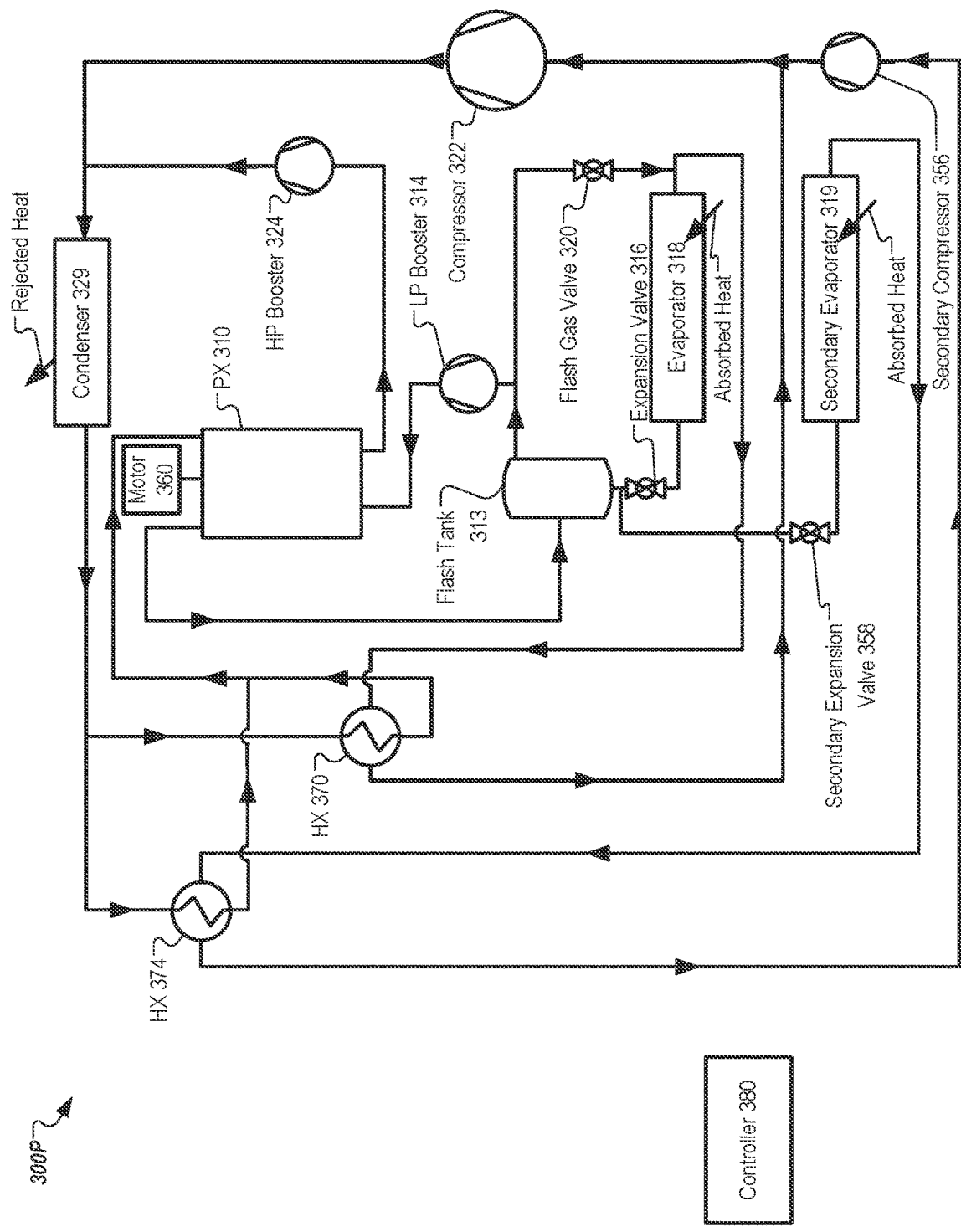

FIGS. 3A-P are schematic diagrams of refrigeration systems 300A-P including PXs, according to certain embodiments. Some of the features in one or more of FIGS. 3A-P may have similar properties, functions, and/or structures as those in one or more of FIGS. 1A-B and/or one or more of FIGS. 2A-E. Systems of one or more of FIGS. 3A-P, FIGS. 4A-B, and/or FIGS. 5A-B may be used to perform the methods of one or more of FIGS. 6A-C.

FIG. 3A is a schematic diagram of a refrigeration system 300A including a PX 310, according to certain embodiments. In some embodiments, refrigeration system 300A is a thermal energy transport system and/or a fluid handling system. PX 310 may be a rotary pressure exchanger. In some embodiments, PX 310 is an isobaric or substantially isobaric pressure exchanger. PX 310 may be configured to exchange pressure between a first fluid and a second fluid. In some embodiments, PX 310 is coupled to a motor 360 (e.g., rotation of a rotor of PX 310 is controlled by the motor 360). In some embodiments, the motor 360 controls the rotational speed of the PX 310. Mass flow (e.g., of the first fluid and/or of the second fluid) through the PX 310 may be related to the rotational speed of the PX 310. In some embodiments, the pressure of the fluid (e.g., the first fluid) in the condenser 329 may be related to the rotational speed of the PX 310. In some embodiments, a controller (e.g., controller 380) receives sensor data from one or more sensors of motor 360.

In some embodiments, PX 310 is to receive the first fluid at a high pressure (e.g., HP fluid in 130 of FIGS. 1A-B) via a high pressure inlet. In some embodiments, PX 310 is to receive the second fluid at a low pressure (e.g., LP fluid in 120 of FIGS. 1A-B) via a low pressure inlet. Although there is a reference to "high pressure" and "low pressure," "high pressure" and "low pressure" may be relative to one another and may not connote certain pressure values (e.g., the pressure of the HP fluid in 130 is higher than the pressure of LP fluid in 120). PX 310 may exchange pressure between the first fluid and the second fluid. PX 310 may provide the first fluid via a low pressure outlet (e.g., LP fluid out 140) and may provide the second fluid via a high pressure outlet (e.g., HP fluid out 150). In some embodiments, the first fluid provided via the low pressure outlet is at a low pressure and the second fluid provided via the high pressure outlet is at a high pressure.

In some embodiments, fluid handling system 300A includes a condenser 329 (e.g., a gas cooler), an evaporator 318, and a compressor 322. In some embodiments, fluid handling system 300A is a refrigeration system. In some embodiments, the condenser 329 is a heat exchanger that provides the heat from the refrigerant (e.g., the first fluid) to an environment.

In some embodiments, condenser 329 is a heat exchanger that condenses fluid flowing through the condenser 329 (e.g., while cooling the fluid). The phase of the refrigerant may change from gas to liquid (e.g., condense) within the condenser 329.

In some embodiments, condenser 329 is a heat exchanger that does not condense fluid flowing through the condenser 329 (e.g., cools the fluid without condensing the fluid). In some embodiments, the pressure of the fluid within the condenser 329 is above the critical pressure of the fluid. In some embodiments, the condenser 329 is a gas cooler and does not condense the fluid (e.g., in a gaseous state). The condenser 329 may provide the heat from the fluid (e.g., gas) to a corresponding environment. In some embodiments, the temperature of the fluid in the condenser 329 may be lowered, but the fluid may not condense (e.g., the fluid does not change phase from gas to liquid). In some embodiments, above the critical pressure of the fluid (e.g., of the refrigerant), the thermodynamic distinction between liquid and gas phases of the fluid within the condenser 329 disappears and there is only a single state of fluid called the supercritical state.

In some examples, evaporator 318 may provide heat absorbed by system 300A from a heat source (e.g., a cold reservoir) to a refrigeration fluid. The heat may be rejected to a heat sink (e.g., a hot reservoir) via the condenser 329. In some embodiments, the refrigeration fluid facilitates heat transfer from an environment associated with the evaporator to an environment associated with the condenser. Compressor 322 of fluid handling system 300A may increase corresponding pressure of the refrigeration fluid along a flow path between the evaporator 318 and the condenser 329. In some embodiments, the refrigeration fluid is $CO_2$ or another refrigeration fluid. The refrigeration fluid may flow substantially in a cycle (e.g., from condenser 329 to PX 310 to evaporator 318 to compressor 322 to condenser 329, etc.).

In some embodiments, fluid handling system 300A includes a low-pressure booster (e.g., LP booster 314) and/or a high-pressure booster (e.g., HP booster 324). Both LP booster 314 and HP booster 324 may be configured to increase (e.g., "boost") pressure of the second fluid. For instance, LP booster 314 may increase pressure of the second fluid output from evaporator 318 (e.g., received from the PX 310). HP booster 324 may increase pressure of the second fluid output by the PX 310. The second fluid may be provided (e.g., by HP booster 324) to combine with fluid output from the compressor 322 (e.g., upstream of an inlet of the condenser 329) to be provided to the condenser 329. LP booster 314 may increase pressure less than a threshold amount (e.g., LP booster 314 may operate over a pressure differential that is less than a threshold amount). In some examples, LP booster 314 may increase pressure of the second fluid approximately 10 to 60 psi. The second fluid may experience pressure loss (e.g., due to fluid friction loss in piping) as the second fluid flows from the LP booster 314 to the second inlet of the PX 310. HP booster 324 may increase pressure of the second fluid between the second outlet of the PX 310 and an inlet of the condenser 329. HP booster 324 may increase pressure less than a threshold amount (e.g., HP booster 324 may operate over a pressure differential that is less than a threshold amount). In some examples, HP booster 324 may increase pressure of the second fluid approximately 10 to 60 psi. HP booster 324 may increase pressure of the second fluid to a pressure that substantially matches the pressure of fluid output from the compressor 322 (e.g., the pressure of condenser 329). In contrast to LP booster 314 and HP booster 324, the compressor 322 increases pressure of fluid more than a threshold amount (e.g., compressor 322 may operate over a pressure differential that is greater than a threshold amount). In some examples, the compressor 322 may increase pressure of the fluid greater than approximately 200 psi. In some embodiments, controller 380 controls a flowrate of fluid through the PX 310 by controlling a flowrate of LP booster 314. In some examples, controller 380 may set a flowrate of LP booster 314 to control a flowrate of first fluid through the PX 310.

In some embodiments, evaporator 318 is a heat exchanger to exchange (e.g., provide) corresponding thermal energy from an environment (e.g., a medium of an environment) to a refrigeration fluid. In some examples, evaporator 318 may receive heat (e.g., thermal energy) from air of the environment and provide the heat to the refrigeration fluid. In some embodiments, the environment is a refrigerated space such as the inside of a refrigerator or freezer, an interior space (e.g., of a building or vehicle), or any other space that is to be kept cool. In some examples, the environment can be the interior of a freezer or refrigeration section at a supermarket or warehouse.

In some embodiments, the condenser 329 is a heat exchanger to transfer corresponding thermal energy (e.g., heat) between refrigeration fluid and an environment. In some embodiments, the condenser 329 is to provide thermal energy from the refrigeration fluid to another environment (e.g., an environment different from the environment associated with the evaporator 318). In some examples, condenser 329 may reject heat (e.g., thermal energy) to air of an outside (e.g., exterior) environment. In some embodiments, the condenser 329 exchanges thermal energy (e.g., rejects heat) to an outside space. In some examples, condenser 329 may be placed outside a supermarket or warehouse building (e.g., on a roof of the building) and reject heat to the outside environment. In another example, condenser 329 may be placed in the ground and facilitate the transfer of thermal energy between the refrigeration fluid and the ground. In some embodiments, condenser 329 rejects heat to an interior space while evaporator 318 absorbs heat from an exterior space (e.g., as in a heat pump configuration that is providing heating). Thermal energy rejected from the condenser 329 may be used to heat an enclosed (e.g., substantially enclosed) space. In another example, the evaporator 318 may be placed in the ground and facilitate the transfer of thermal energy from the ground to the refrigeration fluid.

Fluid handling system 300A may include a controller 380 (e.g., controller 180 of FIGS. 1A-D). Controller 380 may control the boosters and/or compressors of system 300A. Controller 380 may receive sensor data from one or more sensors of system 300A. The sensors may include pressure sensors, flowrate sensors, and/or temperature sensors. In some embodiments, controller 380 controls a motor coupled to PX 310 (e.g., motor 360). In some embodiments, controller 380 receives motor data from one or more motor sensors associated with the motor 360. Motor data received from motor sensors may include current motor speed (e.g., revolutions per minute), total motor run time, motor run time between maintenance operations, and/or total motor revolutions. Motor data may be indicative of a performance state of the motor.

In some embodiments, controller 380 receives sensor data indicative of a temperature of a refrigerated space (e.g., the cold reservoir proximate evaporator 318) and/or a temperature of a heated space (e.g., the hot reservoir proximate condenser 329). Controller 380 may control LP booster 314, HP booster 324, and/or compressor 322 based on sensor data received from one or more sensors of the fluid handling system 300A (e.g., one or more fluid flowrate sensors, temperature sensors, pressure sensors, etc.). In some embodiments, one or more sensors (e.g., pressure sensors, flow sensors, temperature sensors, etc.) are disposed proximate inlets and/or outlets of the various components of the fluid handling system 300A. In some embodiments, one or more sensors are disposed internal to the components of the fluid handling system 300A. In some examples, a pressure sensor may be disposed proximate the inlet of the compressor 322 and an additional pressure sensor may be disposed proximate the outlet of the compressor 322. In some examples, a temperature sensor may be disposed proximate the inlet of the evaporator 318 and another temperature sensor may be disposed proximate the outlet of the evaporator 318. In some examples, a temperature sensor may be disposed internal to the condenser 329. In some examples, a flow sensor may be located at each of the inlets and outlets of the PX 310 to measure a flow of the first fluid and the second fluid into and out of the PX 310.

Described herein are references to "first fluid" and "second fluid." In some embodiments, the first fluid and the second fluid are the same type of fluid (e.g., are a refrigeration fluid flowing in a fluid handling system). "First fluid" may refer to fluid flowing through the PX 310 from the high pressure inlet to the low pressure outlet of the PX 310 and/or fluid flowing to or from the high pressure inlet and/or the low pressure outlet of the PX 310. "Second fluid" may refer to fluid flowing through the PX 310 from the low pressure inlet to the high pressure outlet of the PX 310 and/or fluid flowing to or from the low pressure inlet and/or the high pressure outlet of the PX 310. In some embodiments, the first fluid may be a refrigerant fluid in a supercritical state (e.g., supercritical $CO_2$). In some embodiments, the first fluid may be a refrigerant fluid in a liquid state (e.g., liquid $CO_2$). In some embodiments, the second fluid may be a refrigerant fluid in a gaseous state (e.g., $CO_2$ vapor). In some embodiments, the second fluid may be a refrigerant fluid in a two-phase state (e.g., a liquid-gas mixture of $CO_2$). In some embodiments, the second fluid may be a refrigerant fluid in a liquid state (e.g., liquid $CO_2$).

In some embodiments, system 300A is a heat pump system capable of heating an environment (e.g., an indoor space). In such a heat pump system, the condenser 329 is placed indoors and the evaporator 318 is placed outdoors. In a heat pump system, the evaporator absorbs heat from the ambient and vaporize the two phase refrigerant fluid flowing through the evaporator before sending it to the inlet of the compressor. In some embodiments, to switch from refrigeration or air-cooling system to a heat pump system, a reversing valve may be used to cause the fluid flow exiting the compressor 322 to be switchable between being directed towards the inlet of the outdoor unit or towards the inlet of the indoor unit. In some embodiments, one or more valves and piping may be used to cause fluid flow to be directed in the same direction through all of the components (e.g., one or more the PX 310, LP booster 314, HP booster 324, compressor 322, and/or the like) while switching the fluid flow from indoor unit to outdoor unit.

The direction of transfer of thermal energy (e.g., heat transfer) of the system 300A may be reversible in some embodiments. For example, in refrigeration/air-conditioning/air cooling implementations of system 300A, the condenser 329 placed outdoors rejects heat (e.g., provide corresponding thermal energy from the refrigeration fluid to the corresponding environment) and the evaporator 318 absorbs heat (e.g., provide corresponding thermal energy from the corresponding environment to the refrigeration fluid). While in heat pump implementation of system 300A, the condenser 329 placed indoors rejects heat to its indoor environment and evaporator 318 absorbs heat from its outdoor environment. In some embodiments, system 300A includes one or more valves (e.g., a reversing valve, diversion valve(s), etc.) to reverse the function of system 300A (e.g., reverse the flow of thermal energy facilitated by system 300A). In some embodiments, one or more flows of refrigeration fluid (e.g., to/from the PX 310, to/from the HP booster 324, to/from the LP booster 314, to/from the compressor 322, to/from the condenser 329, and/or to/from the evaporator 318) may be reversed and/or diverted. In some examples, one or more reversing or diversion valves included in system 300A in some embodiments can direct fluid from the compressor 322 toward the outdoor unit. Similar valves may direct fluid from the compressor 322 to the indoor unit.

Reversibility of system 300A may be controlled (e.g., via controller 380, via a programmable thermostat disposed in the indoor space, via user input, etc.). In some examples, the controller 380 may determine (e.g., based on temperature data, based on user input, based on a schedule) whether to use system 300A to heat an indoor space or to cool an indoor space. In some embodiments, the controller 380 may cause one or more valves (e.g., reversing valve, diversion valve(s), etc.) to actuate to cause fluid flow through the system to reverse. In embodiments where the function of system 300A is reversible (e.g., reversible between heating and cooling an indoor space), evaporator 318 may be an interior heat exchanger (e.g., disposed within an interior space, disposed in an air handler system providing airflow to an indoor space) and the condenser 329 may be an exterior heat exchanger (e.g., disposed outside the interior space). In other embodiments the evaporator 318 may be an outdoor heat exchanger and condenser 329 may be an indoor heat exchanger.

In some embodiments, the systems described herein (e.g., systems of one or more of FIGS. 1A-7) can be used to heat an interior space, to cool an interior space, and/or selectively (e.g., reversibly) heat and cool a space.

FIG. 3B is a schematic diagram of a refrigeration system 300B that includes a pressure exchanger (PX), according to certain embodiments. In some embodiments, refrigeration system 300B is a thermal energy transport system and/or a fluid handling system. In some embodiments, features that have reference numbers that are similar to reference numbers in other figures include similar properties, structures, and/or functionality as those described in other figures. In some examples, features of fluid handling system 300B have similar properties, structures, and/or functionality as fluid handling system 300A of FIG. 3A.

Fluid handling system 300B may include a flash tank 313 (e.g., receiver). In some embodiments, flash tank 313 is a receiver configured to receive a flow of fluid (e.g., first fluid) output from the low pressure outlet of the PX 310. Flash tank 313 may form a chamber to collect the first fluid from the first outlet of the PX 310. Flash tank 313 may receive the first fluid in a two-phase state (e.g., liquid and gas). In some embodiments, flash tank 313 is a tank constructed of welded sheet metal. Flash tank 313 may be made of steel (e.g., steel sheet metal, steel plates, etc.). The first fluid (at a low pressure) may separate into gas and liquid inside the flash tank 313. The liquid of the first fluid may settle at the bottom of the flash tank 313 while the gas of the first fluid may rise to the top of the flash tank 313. The liquid may flow from the flash tank 313 towards the evaporator 318 (e.g., via expansion valve 316). The chamber of flash tank 313 may be maintained at a set pressure. The pressure may be set by a user (e.g., an operator, a technician, an engineer, etc.) and/or by a controller (e.g., controller 380). In some embodiments, the pressure of the flash tank 313 is controlled by one or more valves (e.g., flash gas valve 320, a pressure regulator valve, a safety valve, etc.). In some embodiments, the flash tank 313 includes at least one pressure sensor (e.g., pressure transducer).

Fluid handling system 300B may include an expansion valve 316. In some embodiments, expansion valve 316 is disposed along a flow path between flash tank 313 and evaporator 318. Expansion valve 316 may be an adjustable valve (e.g., an electronic expansion valve, a thermostatic expansion valve, a ball valve, a gate valve, a poppet valve, etc.). Expansion valve 316 may be controllable by a user (e.g., a technician, an operator, an engineer, etc.) or by controller 380. In some embodiments, the expansion valve 316 is caused to actuate by controller 380 based on sensor data (e.g., pressure sensor data, flowrate sensor data, temperature sensor data, etc.). In some embodiments, expansion valve 316 is a thermal expansion valve. Expansion valve 316 may actuate (e.g., open and/or close) based on temperature data associated with the evaporator 318 (e.g., temperature data of the refrigeration fluid exiting the evaporator). In some examples, a sensing bulb (e.g., a temperature sensor, a pressure sensor dependent upon temperature, etc.) of the expansion valve 316 may increase or decrease pressure on a diaphragm of the expansion valve 316, causing a poppet valve coupled to the diaphragm to open or close, thus causing more or less flow of fluid to the evaporator 318, thereby causing more or less expansion of the fluid. The sensing bulb of the expansion valve may be positioned proximate to the downstream end of the evaporator 318 (e.g., proximate the fluid outlet of the evaporator 318) and may be fluidly coupled to the diaphragm via a sensing capillary (e.g., a conduit between the sensing bulb and the expansion valve 316). In some embodiments, expansion valve 316 is controlled and actuated entirely based on electronic commands (e.g., from controller 380).

Fluid handling system 300B may include a flash gas valve 320 to regulate a flow of gas on a flash gas bypass flow path. In some embodiments, flash gas valve 320 is a bypass valve that regulates a flow of gas from a gas outlet of the flash tank 313 to be combined with output of the evaporator 318. In some embodiments, the flow of gas from the flash tank 313 flows along the flash gas bypass flow path to bypass the evaporator 318. In some embodiments, the flash gas flow path is between flash tank 313 and a location downstream of an outlet of the evaporator 318. The gas flowing along the flash gas bypass flow path may be combined with output of the evaporator 318. The flash gas valve 320 may cause gas collected in the flash tank 313 to expand (e.g., decrease in pressure) as the gas flows toward the compressor 322. The flash gas valve 320 may, in some embodiments, be an adjustable valve. In some embodiments, the flash gas valve 320 is caused to actuate by controller 380 based on sensor data.

In some embodiments, such as illustrated in FIG. 3B, LP booster 314 receives a flow of fluid from flash tank 313. In some embodiments, LP booster 314 receives a flow of gas from flash tank 313. In some examples, LP booster 314 receives a portion of the gas flowing along the flash gas bypass flow path between flash tank 313 and the flash gas valve 320. In some embodiments, the LP booster 314 receives the fluid and increases pressure of the fluid to form the second fluid (e.g., at the second pressure). The fluid is provided at the increased pressure (e.g., second pressure) to the second inlet of the PX 310 as the second fluid. In some embodiments, LP booster 314 is a compressor or pump that operates over a low pressure differential to "boost" the pressure of the gas received from flash tank 313. In some embodiments, the HP booster 324 is a compressor or pump that operates over a low pressure differential to "boost" the pressure of the fluid (e.g., second fluid) received from the second outlet of the PX. In some embodiments, a compressor is configured to increase pressure of a fluid substantially made up of gas, while a pump is configured to increase pressure of a fluid substantially made up of liquid.

FIG. 3C is a schematic diagram of a refrigeration system 300C that includes a pressure exchanger (PX) according to certain embodiments. In some embodiments, refrigeration system 300C is a thermal energy transport system and/or a fluid handling system. In some embodiments, features that have reference numbers that are similar to reference numbers in other figures include similar properties, structures, and/or functionality as those described in other figures. In some examples, features of fluid handling system 300C have similar properties, structures, and/or functionality as one or more of fluid handling systems 300A-B of FIGS. 3A-B.

Fluid handling system 300C may include a parallel compressor 350. In some embodiments, parallel compressor 350 receives gas from the flash tank 313. The parallel compressor 350 may receive gas from the flash tank 313. Parallel compressor 350 may operate in parallel with the PX 310. Parallel compressor 350 may increase pressure of the gas received from flash tank 313 to a pressure substantially similar to the pressure of fluid output by the compressor 322. The parallel compressor 350 may compress an excess amount of flash gas from the flash tank 313 that exceeds the flow capacity of the PX 310 which avoids dropping the pressure of the flash gas through the flash gas valve 320 shown in FIG. 3B. Including parallel compressor 350 in conjunction with PX 310 increases the energy efficiency of the system. The parallel compressor 350 may provide compressed gas to be combined with output of the compressor 322. Parallel compressor 350 may be a rotary compressor or a reciprocating compressor. In some embodiments, work performed by the parallel compressor 350 reduces work performed by compressor 322, thereby increasing efficiency of the system because the parallel compressor 350 operates over a pressure differential small than the pressure differential of the compressor 322.

FIG. 3D is a schematic diagram of a refrigeration system 300D that includes a pressure exchanger (PX) according to certain embodiments. In some embodiments, refrigeration system 300D is a thermal energy transport system and/or a fluid handling system. In some embodiments, features that have reference numbers that are similar to reference numbers in other figures include similar properties, structures, and/or functionality as those described in other figures. In some examples, features of fluid handling system 300D have similar properties, structures, and/or functionality as one or more of fluid handling systems 300A-C of FIGS. 3A-C.

The LP booster 314 of fluid handling system 300D may receive fluid via one or more of LP suction line 353 or LP suction line 354. LP suction line 353 may route fluid from the flash gas bypass flow path (e.g., between the flash tank 313 and the flash gas valve 320) to the LP booster 314. LP suction line 354 may route fluid output by the evaporator and/or the flash gas bypass (e.g., downstream of the outlet of the evaporator 318) to the LP booster 314. In some embodiments, fluid received via LP suction line 354 (e.g., by the LP booster 314) is at a pressure lower than gas received via LP suction line 353 (e.g., because the gas is received downstream of flash gas valve 320 which lowers pressure of the flash gas). A three way selector valve (not illustrated) may be used to fluidly couple either the suction line 354 or the suction line 353 with the inlet of the LP booster 314. Processing logic (e.g., a control algorithm, processing device, controller 380) can determine which of the suction lines is to be fluidly coupled to inlet of LP booster 314 based on sensor data (e.g., pressure sensor data, temperature sensor data, flowrate sensor data, etc.). For example, responsive to gas in the flash tank 313 meeting a threshold amount (e.g., there is little gas in the flash tank 313) (e.g., when the ambient temperature is cooler the expansion through the PX 310 may produce much more liquid than the gas), then the LP booster 314 receives more gas via suction line 354. The controller 380 may cause the three way selector valve to fluidly couple the inlet of the LP booster 314 to the LP suction line 353 (e.g., provide flow between the LP booster 314 and the LP suction line 353). This may allow the PX 310 to operate nearer its flow capacity, thereby saving more energy.

FIG. 3E is a schematic diagram of a refrigeration system 300E that includes a pressure exchanger (PX) according to certain embodiments. In some embodiments, refrigeration system 300E is a thermal energy transport system and/or a fluid handling system. In some embodiments, features that have reference numbers that are similar to reference numbers in other figures include similar properties, structures, and/or functionality as those described in other figures. In some examples, features of fluid handling system 300E have similar properties, structures, and/or functionality as one or more of fluid handling systems 300A-D of FIGS. 3A-D.

Fluid handling system 300E may include a flash gas heat exchanger 361. Flash gas heat exchanger 361 may receive first fluid from the condenser 329 and provide the first fluid to the PX 310. Flash gas heat exchanger 361 may receive flash gas from flash gas valve 320 and provide the flash to be mixed with fluid output by the evaporator 318. Flash gas heat exchanger 361 may transfer thermal energy (e.g., heat) between the first fluid and the flash gas. Flash gas heat exchanger 361 may provide corresponding thermal energy (e.g., heat) to the flash gas (e.g., gas flowing along the flash gas flow path from the flash tank 313) output from the flash gas valve 320 from the first fluid output from the condenser 329 (e.g., upstream of the high pressure inlet of the PX 310). The thermal energy exchange facilitated by the flash gas heat exchanger 361 may cause liquid flowing through the flash gas bypass flow path to vaporize. Further, in some embodiments, flash gas heat exchanger 361 further cools the first fluid exiting the condenser 329 upstream of the high pressure inlet of the PX 310. Further cooling the first fluid may increase the liquid content of the first fluid at the low pressure outlet of the PX 310, reducing the total mass flow per unit heat absorbed (e.g., by the system) and increasing the coefficient of performance (COP) (e.g., ratio of useful heating or cooling provided to work (energy) used) of the system. The COP of the system may be an indicator of the system's efficiency (e.g., increased COP of a system is indicative of an increased efficiency of the system).

FIG. 3F is a schematic diagram of a refrigeration system 300F that includes a pressure exchanger (PX) according to certain embodiments. In some embodiments, refrigeration system 300F is a thermal energy transport system and/or a fluid handling system. In some embodiments, features that have reference numbers that are similar to reference numbers in other figures include similar properties, structures, and/or functionality as those described in other figures. In some examples, features of fluid handling system 300F have similar properties, structures, and/or functionality as one or more of fluid handling systems 300A-E of FIGS. 3A-E.

Fluid handling system 300F may include flash gas heat exchanger 361, similar to fluid handling system 300E. However, in fluid handling system 300F, the flash gas heat exchanger 361 may exchange corresponding thermal energy between the gas flowing along the flash gas bypass flow path output by the flash gas valve 320 and the second fluid output from the LP booster 314 (e.g., upstream of the low pressure inlet of the PX 310). The thermal energy exchange facilitated by the flash gas heat exchanger 361 may cause the vaporization of liquid flowing along the flash gas bypass flow path. Additionally, in some embodiments, flash gas heat exchanger 361 may cool the second fluid output from the LP booster 314, thus increasing the density of the second fluid, leading to a higher mass flow intake of the PX 310 and corresponding reduction in the mass flow of the main compressor 322. This may produce a higher COP of the system.

FIG. 3G is a schematic diagram of a refrigeration system 300G that includes a pressure exchanger (PX) according to certain embodiments. In some embodiments, refrigeration system 300G is a thermal energy transport system and/or a fluid handling system. In some embodiments, features that have reference numbers that are similar to reference numbers in other figures include similar properties, structures, and/or functionality as those described in other figures. In some examples, features of fluid handling system 300G have similar properties, structures, and/or functionality as one or more of fluid handling systems 300A-F of FIGS. 3A-F.

The evaporator 318 of fluid handling system 300G may operate in a flooded state. In some examples, both liquid and gas may flow through evaporator 318 in some embodiments. Operating the evaporator 318 in a flooded state may allow for an increase in pressure of the suction side of the compressor 322 (e.g., the upstream side of the compressor 322), thereby reducing the pressure differential overcome by the compressor 322 and thus reducing the energy required by the compressor 322 and increasing system efficiency. In some embodiments, fluid leaving the evaporator 318 (e.g., through the outlet of the evaporator 318) may be in the two-phase state (e.g., liquid and gas). Liquid may accumulate in accumulator 338. In some embodiments, accumulator 338 is a receiver to receive fluid from the evaporator 318 and the flash gas bypass. In some embodiments, accumulator 338 forms a chamber similar to flash tank 313. The chamber of accumulator 338 may be maintained at a substantially constant (e.g., semi-constant) pressure. In some embodiments, the accumulator 338 includes one or more pressure sensors. Liquid collected in the accumulator 338 may be pumped by LP booster 314 (e.g., a pump configured to pump liquid, in some embodiments) to the low pressure inlet of the PX 310. Gas from the accumulator 338 may flow to the compressor 322.

In some embodiments, the second fluid provided to the low pressure inlet of the PX 310 by LP booster 314 is in the liquid state. The second fluid may also be in the liquid state at the high pressure outlet of the PX 310. In some embodiments, the second fluid may be in the sub-cooled liquid state at the high pressure outlet of the PX 310. HP booster 324 may pump the second fluid from the high pressure outlet of the PX 310 to the high pressure inlet of the PX 310. Output from the condenser 329 may combine with fluid pumped by the HP booster 324 (e.g., output by the HP booster 324) to be received by the PX 310 via the high pressure inlet of the PX 310.

FIG. 3H is a schematic diagram of a refrigeration system 300H that includes a pressure exchanger (PX) according to certain embodiments. In some embodiments, refrigeration system 300H is a thermal energy transport system and/or a fluid handling system. In some embodiments, features that have reference numbers that are similar to reference numbers in other figures include similar properties, structures, and/or functionality as those described in other figures. In some examples, features of fluid handling system 300H have similar properties, structures, and/or functionality as one or more of fluid handling systems 300A-G of FIGS. 3A-G.

Fluid handling system 300H may include a secondary evaporator 319 and a secondary expansion valve 358. In some embodiments, the secondary evaporator 319 receives a portion of flow of fluid from the flash tank 313 via the secondary expansion valve 358. The secondary expansion valve 358 may control the flow of fluid to the secondary evaporator 319. In some embodiments, the controller 380 can control the secondary expansion valve 358. In some embodiments, the controller 380 causes the secondary expansion valve 358 to actuate (e.g., open and/or close) based on sensor data received by the controller 380. The sensor data may include pressure sensor data, flow sensor data, and/or temperature sensor data, specifically temperature data associated with the secondary evaporator 319. In some embodiments, the secondary expansion valve 358 has substantially similar characteristics and/or performs substantially similar to expansion valve 316 described herein. In some embodiments, fluid flowing through the secondary expansion valve 358 expands as the fluid flows through the secondary expansion valve 358.

In some embodiments, the secondary evaporator 319 is a heat exchanger that provides corresponding thermal energy (e.g., heat) from an environment to the fluid flowing through the secondary evaporator 319. In some embodiments, the secondary evaporator 319 provides thermal energy from an environment different from the environment from which the evaporator 318 provides thermal energy. In some embodiments, the environment from which the secondary evaporator 319 provides thermal energy with is at a temperature different than the environment from which the evaporator 318 provides thermal energy. In some examples, evaporator 318 may exchange thermal energy with a refrigeration section of a supermarket, while the secondary evaporator 319 may exchange thermal energy with a freezer section of the supermarket, the freezer section being colder than the refrigeration section. In some embodiments, the secondary evaporator 319 is a low-temperature (LT) evaporator (e.g., freezer) operating at a temperature lower than evaporator 318 (e.g., MT evaporator, refrigerator). In some embodiments, fluid output from the secondary evaporator 319 is compressed by secondary compressor 356 before being combined with fluid output from the evaporator 318 and/or fluid output from the flash gas valve 320. In some embodiments, any of systems 300A-300M may include secondary evaporator 319 and secondary compressor 356 as described herein.

FIG. 3I is a schematic diagram of a refrigeration system 300I that includes a pressure exchanger (PX) according to certain embodiments. In some embodiments, refrigeration system 300I is a thermal energy transport system and/or a fluid handling system. In some embodiments, features that have reference numbers that are similar to reference numbers in other figures include similar properties, structures, and/or functionality as those described in other figures. In some examples, features of fluid handling system 300I have similar properties, structures, and/or functionality as one or more of fluid handling systems 300A-H of FIGS. 3A-H.

Fluid handling system 300I may include a liquid pump 340. In some embodiments, liquid pump 340 may pump liquid from accumulator 338 to the inlet of evaporator 318. The liquid pumped by liquid pump 340 may combine with fluid output from the expansion valve 316 (e.g., upstream of the inlet of the evaporator 318). Liquid pump 340 may be controlled by controller 380. In some embodiments, fluid exiting the condenser 329 is in a liquid state. Thus, in some embodiments, HP booster 324 pumps liquid from the outlet of condenser 329 to the high pressure inlet of the PX 310. The HP booster 324 may increase the pressure of the liquid output from the condenser 329 to the high pressure inlet of the PX 310.

FIG. 3J is a schematic diagram of a refrigeration system 300J that includes a pressure exchanger (PX) according to certain embodiments. In some embodiments, refrigeration system 300J is a thermal energy transport system and/or a fluid handling system. In some embodiments, features that have reference numbers that are similar to reference numbers in other figures include similar properties, structures, and/or functionality as those described in other figures. In some examples, features of fluid handling system 300J have similar properties, structures, and/or functionality as one or more of fluid handling systems 300A-I of FIGS. 3A-I.

Fluid handling system 300J may include a parallel valve 348. Parallel valve 348 may be an expansion valve or a flow control valve. In some embodiments, parallel valve 348 selectively regulates a flow of fluid from the outlet of condenser 329 to the flash tank 313 in parallel with the PX 310. In some embodiments parallel valve 348 controls the pressure of the condenser 329 (e.g., gas cooler) by selectively opening or closing its orifice (e.g., of the parallel valve 348). In some embodiments, parallel valve 348 can be actuated to selectively regulate the flow of fluid or to selectively regulate the pressure of the fluid within the condenser 329. Parallel valve 348 may selectively provide a portion of fluid output by the condenser 329 to the expansion tank 313. In some examples, parallel valve 348 can be actuated to be further opened to flow more fluid from the condenser 329 to the flash tank 313, or parallel valve 348 can be actuated to be further closed to flow less fluid from the condenser 329 to the flash tank 313 The fluid may expand as the fluid flows through the parallel valve 348, causing a decrease in pressure and/or temperature of the fluid. In some embodiments, the controller 380 may cause the parallel valve 348 to actuate (e.g., open or close) based on sensor data received from one or more sensors of fluid handling system 300I.

FIG. 3K is a schematic diagram of a refrigeration system 300K that includes a pressure exchanger (PX) according to certain embodiments. In some embodiments, refrigeration system 300K is a thermal energy transport system and/or a fluid handling system. In some embodiments, features that have reference numbers that are similar to reference numbers in other figures include similar properties, structures, and/or functionality as those described in other figures. In some examples, features of fluid handling system 300K have similar properties, structures, and/or functionality as fluid handling systems 300A-J of FIGS. 3A-J.

Fluid handling system 300K may include PX HP valve 362 and PX on/off valve 364. PX HP valve 362 may control a flow of the second fluid output from the high pressure outlet of the PX 310. In some embodiments, the second fluid expands as the second fluid flows through the PX HP valve 362. The second fluid output from the PX HP valve 362 may flow into the flash tank 313. The second fluid may expand to the pressure of the flash tank 313 (e.g., the internal pressure of the flash tank 313) as the second fluid flows through the PX HP valve 362. Expanding the second fluid through the PX HP valve 362 may increase the quality (e.g., increase the ratio of gas to liquid) of the fluid in the flash tank 313. PX on/off valve 364 may control a flow of first fluid (e.g., high pressure fluid) to the high pressure inlet of the PX 310. In some embodiments, PX HP valve 362 and/or PX on/off valve 364 are controlled by controller 380. Controller 380 may cause PX HP valve 362 and/or PX on/off valve 364 to actuate (e.g., open and/or close) based on sensor data received from one or more sensors of fluid handling system 300J.

FIG. 3L is a schematic diagram of a refrigeration system 300L that includes a pressure exchanger (PX) according to certain embodiments. In some embodiments, refrigeration system 300L is a thermal energy transport system and/or a fluid handling system. In some embodiments, features that have reference numbers that are similar to reference numbers in other figures include similar properties, structures, and/or functionality as those described in other figures. In some examples, features of fluid handling system 300L have similar properties, structures, and/or functionality as fluid handling systems 300A-K of FIGS. 3A-K.

Fluid handling system 300L may include a flash gas heat exchanger 361. In some embodiments, a portion of gas flowing along the flash gas bypass flow path output from the flash gas valve 320 is routed to the flash gas heat exchanger 361. Additionally, in some embodiments, the second fluid output from the high pressure outlet of the PX 310 is routed to the flash gas heat exchanger 361. The flash gas heat exchanger 361 may provide corresponding thermal energy (e.g., heat) from the second fluid to the portion of flash gas. Thus, the temperature of the second fluid from the high pressure outlet of the PX 310 may be reduced. The second fluid may be output from the flash gas heat exchanger 361 (e.g., at a reduced temperature) and routed to the flash tank 313. In some embodiments, the second fluid expands as the second fluid flows through the PX HP valve 362 toward the flash tank 313, similar to explained with reference to fluid handling system 300J of FIG. 3K.

FIG. 3M is a schematic diagram of a refrigeration system 300M that includes a pressure exchanger (PX) according to certain embodiments. In some embodiments, refrigeration system 300M is a thermal energy transport system and/or a fluid handling system. In some embodiments, features that have reference numbers that are similar to reference numbers in other figures include similar properties, structures, and/or functionality as those described in other figures. In some examples, features of fluid handling system 300M have similar properties, structures, and/or functionality as fluid handling systems 300A-L of FIGS. 3A-L.

Fluid handling system 300M may include an auxiliary flash tank 352. Auxiliary flash tank 352 may be a receiver to receive the second fluid output from the flash gas heat exchanger 361. In some embodiments, the auxiliary flash tank 352 is constructed of welded sheet metal, similar to the construction of flash tank 313. In some embodiments, auxiliary flash tank 352 is made of steel. The auxiliary flash tank 352 may form a chamber to receive a fluid (e.g., second fluid). The interior of the auxiliary flash tank 352 (e.g., the chamber of the auxiliary flash tank 352) may be maintained at a predetermined constant (e.g., substantially constant) pressure. The pressure of the auxiliary flash tank 352 may be higher than the pressure of flash tank 313. In some examples, the pressure of the auxiliary flash tank 352 may be maintained at least approximately 30 psi higher than the pressure of flash tank 313. In some embodiments, the auxiliary flash tank 352 includes at least one pressure sensor. Fluid flowing from auxiliary flash tank 352 toward the junction valve 355 may expand through valve 353. In some embodiments, valve 353 regulates the pressure of the auxiliary flash tank 352. Valve 353 may be controllable (e.g., via controller 380).

In some embodiments, the auxiliary flash tank 352 may receive the second fluid output from the flash gas heat exchanger 361 (e.g., downstream of the PX HP valve 362). Liquid and gas of the second fluid may separate in the auxiliary flash tank 352. The liquid may collect at the bottom of the auxiliary flash tank 352 and be directed towards expansion valve 316 via a junction valve 355. In junction valve 355, the liquid output from the auxiliary flash tank 352 may combine with liquid output from the flash tank 313. In some embodiments, junction valve 355 combines the flows of liquid from the auxiliary flash tank 352 and the flash tank 313 and directs the combined flow of liquid toward expansion valve 316. In some embodiments, junction valve 355 is controlled (e.g., caused to actuate) by controller 380 (e.g., based on sensor data). The gas collected in the auxiliary flash tank 352 may be directed toward the low pressure inlet of the PX 310. Because in some embodiments the pressure maintained in the auxiliary flash tank 352 is higher than the pressure maintained in the flash tank 313, no LP booster is required to boost the pressure of the second fluid upstream of the low pressure inlet of the PX 310, thus reducing energy consumption and hardware cost of the system.

FIG. 3N is a schematic diagram of a refrigeration system 300N that includes a pressure exchanger (PX) according to certain embodiments In some embodiments, refrigeration system 300N is a thermal energy transport system and/or a fluid handling system. In some embodiments, features that have reference numbers that are similar to reference numbers in other figures include similar properties, structures, and/or functionality as those described in other figures. In some examples, features of fluid handling system 300N have similar properties, structures, and/or functionality as fluid handling systems 300A-M of FIGS. 3A-M.

Fluid handling system 300N may include a secondary compressor 356, an auxiliary condenser 365, an auxiliary parallel valve 368, and/or an LP selector valve 366. In some embodiments, the secondary compressor 356 receives a fluid portion output from the secondary evaporator 319 (e.g., the portion of fluid that flows through the secondary evaporator 319 from the flash tank 313). The secondary evaporator 319 may be a low temperature (LT) evaporator and the evaporator 318 may be a medium temperature (MT) evaporator. In some embodiments, the secondary compressor 356 is a LT compressor and the compressor 322 is a MT compressor. The secondary compressor 356 may increase pressure of the fluid output from the secondary evaporator 319 to the pressure of the fluid output from the evaporator 318. A person of ordinary skill in the art should recognize that any of the systems 300A through 300M may be modified to include the secondary evaporator 319 and the secondary compressor 356. The secondary evaporator 319 may be maintained at a lower pressure than the evaporator 318 and the secondary compressor 356 may increase the pressure of the output from the secondary evaporator 319 to substantially the same pressure as the fluid output from the evaporator 318. The fluid output from the evaporator 318 may be combined with the fluid output from the secondary compressor 356. In some embodiments, the secondary compressor 356 is controlled by controller 380. In some examples, controller 380 may cause the secondary compressor 356 to increase pressure of the fluid based on sensor data received (e.g., pressure sensor data, etc.). In some embodiments, the secondary compressor 356 is driven by a motor. The motor may be controlled by controller 380.

In some embodiments, the auxiliary condenser 365 receives the second fluid from the high pressure outlet of the PX310. The auxiliary condenser 365 may be a condenser and/or a gas cooler as described herein. In some embodiments, the auxiliary condenser 365 is a heat exchanger that exchanges thermal energy (e.g., heat) between the second fluid and a medium of an environment. In some embodiments, the auxiliary condenser 365 exchanges thermal energy between the second fluid and the same environment with which the condenser 329 exchanges thermal energy. In other embodiments, the auxiliary condenser 365 exchanges thermal energy between the second fluid and a different environment with which the condenser 329 exchanges thermal energy. In some embodiments, the auxiliary condenser 365 operates at a pressure different (e.g. lower) than condenser 329 The auxiliary condenser 365 operating at a lower pressure than the condenser 329 may eliminate the need for a booster (e.g., HP booster 324) to make up this differential pressure because the second fluid output from the PX 310

(e.g., at a high pressure) may be at a lower pressure than the pressure of the condenser 329.

In some embodiments, the second fluid flows from the auxiliary condenser 365 to the auxiliary parallel valve 368. In some embodiments, the auxiliary parallel valve 368 is substantially similar to the parallel valve 348. In some examples, the auxiliary parallel valve 368 may be a flow control valve to control the flow of the second fluid from the auxiliary condenser 365 towards the flash tank 313. In some embodiments, the auxiliary parallel valve 368 is an expansion valve. The second fluid may expand as the second fluid flows through the auxiliary parallel valve 368. In some embodiments, the auxiliary parallel valve 368 can be controlled (e.g., by controller 380). In some examples, the controller 380 may cause the auxiliary parallel valve 368 to be actuated (e.g., opened and/or closed) based on sensor data received from one or more sensors of fluid handling system 300M. The second fluid output from the auxiliary parallel valve 368 may be combined with fluid output from the parallel valve 348, in some embodiments.

Fluid handling system 300N may include LP selector valve 366 in some embodiments. The LP selector valve 366 may receive gas output from the flash tank 313 via a first port and/or fluid output from the flash gas valve 320, the evaporator 318, and/or the secondary compressor 356 (e.g., upstream of the compressor 322) via a second port. The LP selector valve 366 may direct the gas flow and/or the fluid flow toward the LP booster 314 via a third port. In some embodiments, the LP selector valve 366 is controllable. In some examples, a user (e.g., an engineer, an operator, a technician, etc.) may cause the LP selector valve 366 to actuate (e.g., may cause the first, second, and/or third ports to open or close), and/or the controller 380 may cause the LP selector valve 366 to actuate. In some embodiments, the controller 380 causes the LP selector valve 366 to actuate based on sensor data received. In some embodiments, the LP selector valve 366 receives the gas flow from the flash tank 313 via the first port and directs the gas flow toward the LP booster 314 via the third port while the second port is closed. In some embodiments, the LP selector valve 366 receives the flow of fluid from upstream of the compressor 322 via the second port and directs the fluid flow toward the LP booster via the third port while the first port is closed.

FIG. 3O is a schematic diagram of a refrigeration system 300O that includes a pressure exchanger (PX) according to certain embodiments. In some embodiments, refrigeration system 300O is a thermal energy transport system and/or a fluid handling system. In some embodiments, features that have reference numbers that are similar to reference numbers in other figures include similar properties, structures, and/or functionality as those described in other figures. In some examples, features of fluid handling system 300O have similar properties, structures, and/or functionality as fluid handling systems 300A-N of FIGS. 3A-N.

Fluid handling system 300O may include multiple heat exchangers to provide corresponding thermal energy from the first fluid (e.g., upstream of the high pressure inlet of the PX 310) and fluid output from the flash tank 313. In some embodiments, the first fluid flows from condenser 329 to one of HX 370, HX 372, or HX 374 and then to the high pressure inlet of the PX 310. In some embodiments, heat exchanger (HX) 370 provides corresponding thermal energy from fluid output from the condenser 329 to fluid output from evaporator 318. Fluid may flow from the outlet of the evaporator 318 to HX 370 and then to the compressor 322. In some embodiments, HX 372 provides corresponding thermal energy from fluid output from the condenser 329 to fluid output from the flash gas valve 320. In some embodiments, HX 372 forms a part of the flash gas flow path between the flash tank 313 and the compressor 322. Fluid may flow from flash gas valve 320 to HX 372 and then to the compressor 322. In some embodiments, HX 374 provides corresponding thermal energy from fluid output from the condenser 329 to fluid output from the secondary evaporator 319. Fluid may flow from the secondary evaporator 319 to HX 374 and then to the secondary compressor 356. The fluid may then flow from the secondary compressor 356 to the compressor 322. The multiple heat exchangers may cool the flow of first fluid flowing into the high pressure inlet of the PX 310 while also warming fluid output from the evaporator 318, the secondary evaporator 319, and/or the flash gas valve 320. The multiple heat exchangers may superheat the fluid outputs. This warming of the fluid may raise the fluid pressures while providing sufficient superheat for stable and reliable operation of the compressor 322 and the secondary compressor 356. The raising of the pressures (e.g., of the fluid output from the evaporator 318 and the fluid output from the secondary evaporator 319) may reduce the work of the compressor 322 and the secondary compressor 356, thereby reducing the energy consumed by the compressor 322 and the secondary compressor 356 to increase the efficiency of the system.

FIG. 3P is a schematic diagram of a refrigeration system 300P that includes a pressure exchanger (PX) according to certain embodiments. In some embodiments, refrigeration system 300P is a thermal energy transport system and/or a fluid handling system. In some embodiments, features that have reference numbers that are similar to reference numbers in other figures include similar properties, structures, and/or functionality as those described in other figures. In some examples, features of fluid handling system 300P have similar properties, structures, and/or functionality as fluid handling systems 300A-O of FIGS. 3A-O.

Fluid handling system 300P may include HX 370 and/or HX 374. In some embodiments, fluid handling system 300P is substantially similar to fluid handling system 300O, with the exclusion of HX 372. In some embodiments, the fluid output from the flash gas valve 320 is combined with fluid output from the evaporator 318 before the combined fluid it provided to heat exchanger 370.

Figure 4A:
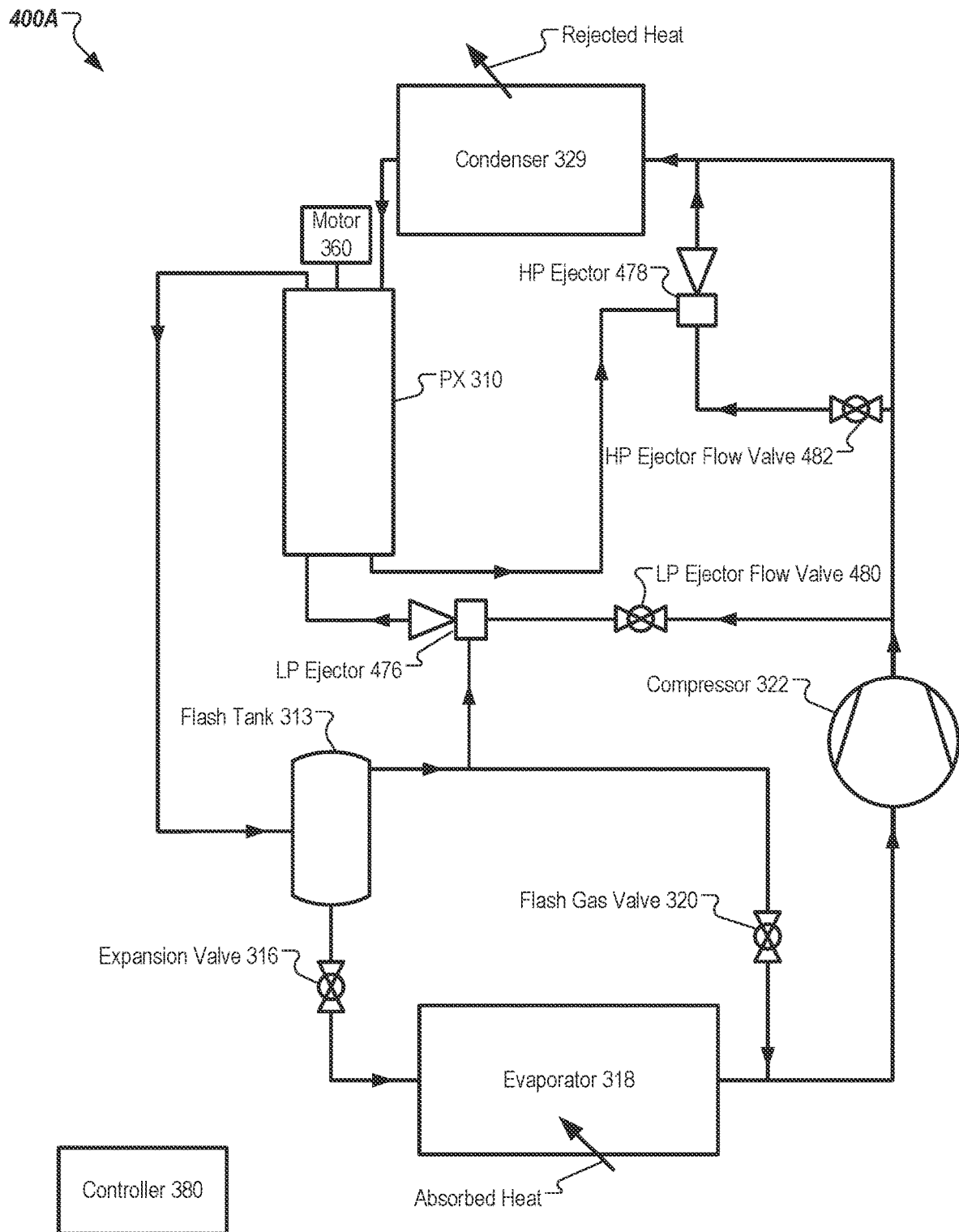
FIGS. 4A-B are schematic diagrams of refrigeration systems including PXs and ejectors, according to certain embodiments.

FIG. 4A is a schematic diagram of a refrigeration system 400A that includes a pressure exchanger (PX) and one or more ejectors according to certain embodiments. In some embodiments, refrigeration system 400A is a thermal energy transport system and/or a fluid handling system. In some embodiments, features that have reference numbers that are similar to reference numbers in other figures include similar properties, structures, and/or functionality as those described in other figures. In some examples, features of fluid handling system 400A have similar properties, structures, and/or functionality as fluid handling systems 300A-P of FIGS. 3A-P.

Fluid handling system 400A may include one or more ejectors. An ejector may be a device that is configured to increase pressure of a low pressure stream by using a high pressure stream. An ejector may use a converging nozzle to increase fluid velocity to transform high static pressure into velocity pressure. Including ejectors in fluid handling system 400A may allow for the utilization of high pressure fluid to increase pressure of low pressure fluid without pumps or compressors, thus reducing energy consumption and increasing efficiency of the system.

In some embodiments, fluid handling system 400A includes LP ejector 476 and/or HP ejector 478. LP ejector 476 may increase pressure of the second fluid provided to the low pressure inlet of the PX 310. In some embodiments, LP ejector 476 receives a flow of gas output from the flash tank 313 via a gas outlet of the flash tank. The flow of gas received by the LP ejector 476 may be diverted from the flash gas bypass flow path. The LP ejector 476 may receive a portion of fluid output from the compressor 322 via LP ejector flow valve 480 to increase (e.g., boost) the pressure of the second fluid. In some examples, the LP ejector 476 may increase the pressure of the second fluid approximately 30 to 50 psi. In some embodiments, the LP ejector flow valve 480 controls a flow of high pressure fluid to the LP ejector 476. The high pressure fluid may combine with low pressure fluid (e.g., the low pressure second fluid) in the LP ejector 476 to increase pressure of the low pressure fluid. The LP ejector flow valve 480 may be controlled by controller 380. In some embodiments, the controller 380 causes the LP ejector flow valve 480 to actuate based on sensor data received by the controller 380. In some embodiments, the LP ejector 476 performs a substantially similar function as LP booster 314.

HP ejector 478 may increase pressure of the second fluid output from the high pressure outlet of the PX 310. The HP ejector 478 may receive a portion of the fluid output from the compressor 322 via HP ejector flow valve 482 to increase (e.g., boost) the pressure of the second fluid. In some examples, the HP ejector 478 may increase the pressure of the second fluid approximately 30 to 50 psi. The HP ejector 478 may increase the pressure of the second fluid to the pressure of the condenser 329 (e.g., the internal pressure of the condenser 329, the pressure of the inlet of the condenser 329). In some embodiments, the HP ejector flow valve 482 controls a flow of high pressure fluid to the HP ejector 478. The high pressure fluid output from HP ejector flow valve 482 may combine with the second fluid in the HP ejector 478 to increase pressure of the second fluid. The HP ejector flow valve 482 may be controlled by controller 380. In some embodiments, the controller 380 causes the HP ejector flow valve 482 to actuate based on sensor data received by the controller 380. In some embodiments, the HP ejector 478 performs a substantially similar function as HP booster 324.

Figure 4B:
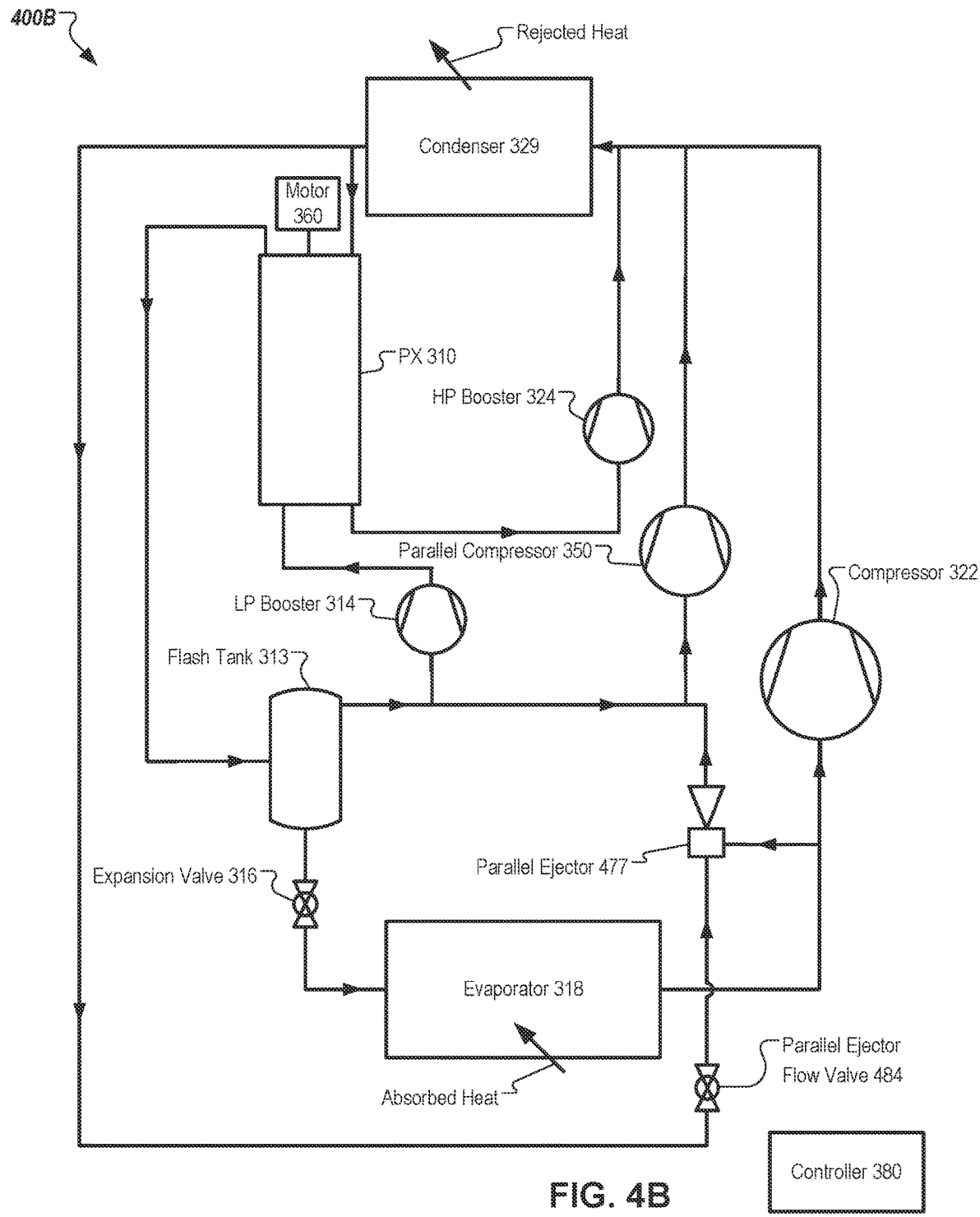

FIG. 4B is a schematic diagram of a refrigeration system 400B that includes a pressure exchanger (PX) and one or more ejectors according to certain embodiments. In some embodiments, refrigeration system 400B is a thermal energy transport system and/or a fluid handling system. In some embodiments, features that have reference numbers that are similar to reference numbers in other figures include similar properties, structures, and/or functionality as those described in other figures. In some examples, features of fluid handling system 400B have similar properties, structures, and/or functionality as fluid handling systems 300A-P of FIGS. 3A-P.

Fluid handling system 400B may include parallel compressor 350 and/or parallel ejector 477. In some embodiments, parallel ejector 477 increases pressure of a portion of fluid output from the evaporator 318 (e.g., upstream of the inlet of the compressor 322). The parallel ejector 477 may increase the pressure of the portion of fluid output from the condenser 329 to the pressure of flash tank 313. The parallel compressor 350 may receive the fluid output from the parallel ejector 477. Additionally, in some embodiments, the parallel compressor 350 may receive gas output from the flash tank 313 as described herein. In some embodiments, gas output from the flash tank 313 is combined with fluid output from the parallel ejector 477. The PX 310 increases the pressure of a portion of this combined flow from pressure of the flash tank 313 (e.g., flash tank pressure) to pressure of condenser 329 (e.g., condenser pressure, gas cooler pressure) after the fluid goes through LP booster 314. Flow of fluid from the flash tank 313 that exceeds the capacity of the PX 310 may be received by the parallel compressor 350. The parallel compressor 350 may increase the pressure of the flow to the pressure of the condenser 329. The combination of the parallel ejector 477, the PX 310 and the parallel compressor 350 increasing pressure of fluid may reduce the amount of work that the compressor 322 performs, thus reducing energy consumed by the compressor 322 and increasing efficiency of the system.

In some embodiments, the parallel ejector receives high pressure fluid output from the condenser 329 via parallel ejector flow valve 484. The high pressure fluid may be combined with the portion of the fluid output from the evaporator 318 (e.g., at a comparatively lower pressure) in the parallel ejector 477 to increase the pressure of the portion of the fluid output from the evaporator 318. In some embodiments, the parallel ejector 477 increases the pressure of the portion of the fluid from the evaporator 318 approximately 200 psi. In some embodiments, the parallel ejector flow valve 484 is a valve to control the flow of the high pressure fluid to the parallel ejector 477. In some embodiments, the parallel ejector flow valve 484 is controlled by controller 380. In some examples, controller 380 may cause the parallel ejector flow valve 484 to actuate based on sensor data received by the controller 380.

Figure 5A:
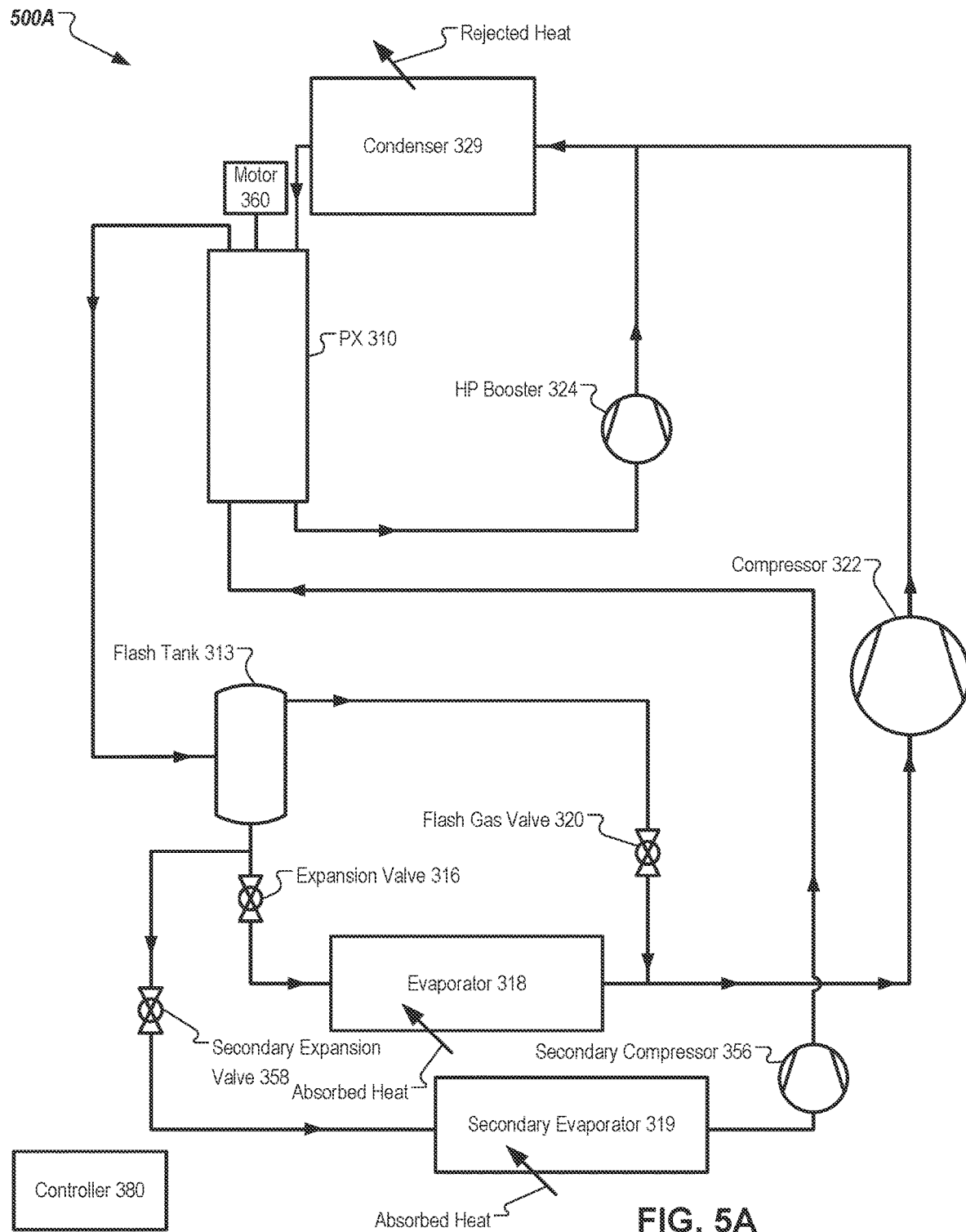
FIGS. 5A-B are schematic diagrams of refrigeration systems including PXs and secondary evaporators, according to certain embodiments.

FIG. 5A is a schematic diagram of a refrigeration system 500A that includes a pressure exchanger (PX) and a secondary evaporator according to certain embodiments. In some embodiments, refrigeration system 500A is a thermal energy transport system and/or a fluid handling system. In some embodiments, features that have reference numbers that are similar to reference numbers in other figures include similar properties, structures, and/or functionality as those described in other figures. In some examples, features of fluid handling system 500A have similar properties, structures, and/or functionality as fluid handling systems 300A-P of FIGS. 3A-P.

Fluid handling system 500A may include a secondary evaporator 319, a secondary expansion valve 358, and/or a secondary compressor 356. Explanation of the secondary evaporator 319, the secondary expansion valve 358, and/or the secondary compressor 356 may be included herein with respect to FIG. 3M. In some embodiments, fluid output from the secondary compressor 356 is provided to the low pressure inlet of the PX 310. The secondary compressor 356 may reduce work performed by the compressor 322, reducing energy consumed by the compressor 322 and thus increasing the efficiency of the system.

Figure 5B:
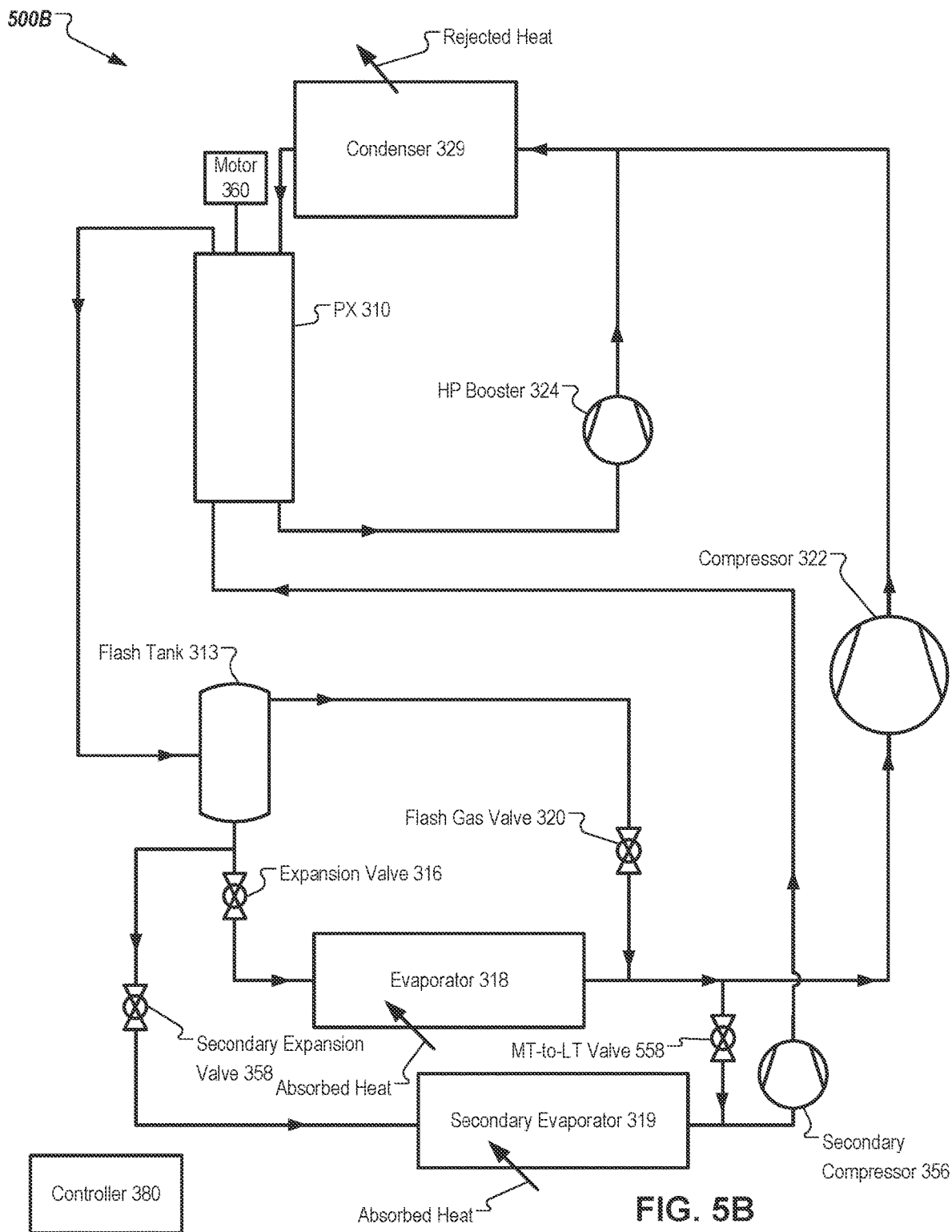

FIG. 5B is a schematic diagram of a refrigeration system 500B that includes a pressure exchanger (PX) and a secondary evaporator according to certain embodiments. In some embodiments, refrigeration system 500B is a thermal energy transport system and/or a fluid handling system. In some embodiments, features that have reference numbers that are similar to reference numbers in other figures include similar properties, structures, and/or functionality as those described in other figures. In some examples, features of fluid handling system 500B have similar properties, structures, and/or functionality as fluid handling systems 300A-P of FIGS. 3A-P.

Fluid handling system 500B may include medium-temperature-to-low-temperature valve 558 (e.g., MT-to-LT valve 558). MT-to-LT valve 558 may control a flow of fluid output from the evaporator 318 and/or output from the flash gas valve 320. The output of the MT-to-LT valve 558 may be provided to the secondary compressor 356. In some embodiments, the output of the MT-to-LT valve 558 may be combined with output from the secondary evaporator 319. In some examples, the MT-to-LT valve 558 may regulate flow of a sub-portion of the portion output (e.g., fluid output) from the evaporator 318 to be combined with output from the secondary evaporator 319. The fluid from the MT-to-LT valve 558 may be combined with fluid from the secondary evaporator 319 upstream of the secondary compressor 356. As fluid flows through the MT-to-LT valve 558, pressure of the fluid may drop as the fluid expands. In some embodiments, the flow through the MT-to-LT valve 558 provides fluid flow to the secondary compressor 356 in addition to the fluid flow from the secondary evaporator 319 so as not to limit the flow through the PX 310 and to utilize the full flow capacity and pressure boosting capacity of the PX 310. In some embodiments, the MT-to-LT valve 558 can be controlled (e.g., caused to actuate) by controller 380 based on sensor data.

Figure 6A:
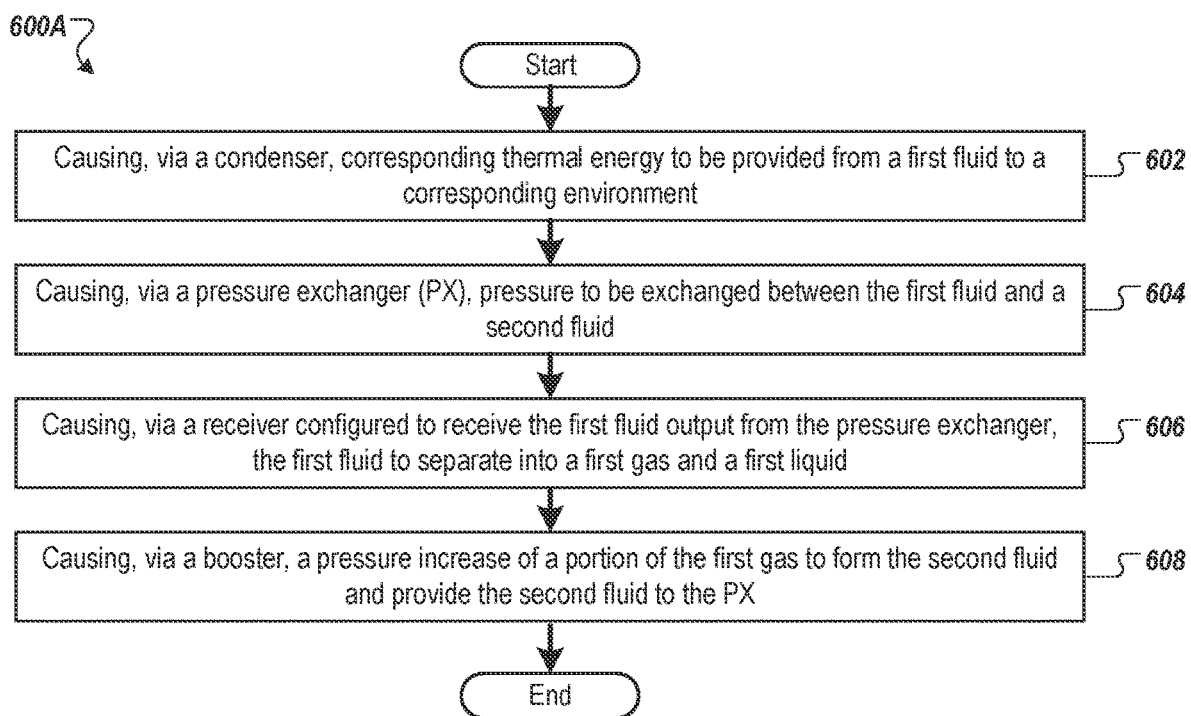
FIGS. 6A-C are flow diagrams illustrating example methods for controlling refrigeration systems, according to certain embodiments.

FIG. 6A is a flow diagram illustrating a method 600A for controlling a fluid handling system (e.g., one or more of fluid handling systems 300A-P of FIGS. 3A-P), according to certain embodiments. In some embodiments, method 600A is performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 600A is performed, at least in part, by a controller (e.g., controller 180 of FIGS. 1A-D, controller 380 of FIGS. 3A-P). In some embodiments, a non-transitory storage medium stores instructions that when executed by a processing device (e.g., of controller 180 of FIGS. 1A-D, controller 380 of FIGS. 3A-P), cause the processing device to perform method 600A.

For simplicity of explanation, method 600A is depicted and described as a series of operations. However, operations in accordance with this disclosure can occur in various orders and/or concurrently and with other operations not presented and described herein. Furthermore, in some embodiments, not all illustrated operations are performed to implement method 600A in accordance with the disclosed subject matter. In addition, those skilled in the art will understand and appreciate that method 600A could alternatively be represented as a series of interrelated states via a state diagram or events.

At block 602, processing logic may cause corresponding thermal energy to be provided, via a condenser, from a first fluid to a corresponding environment. In some examples, processing logic (e.g., of controller 380) may cause one of systems 300A-P to operate to reject heat from fluid via condenser 329 and/or via auxiliary condenser 365. The processing logic may actuate one or more valves, cause one or more pumps or compressors to operate, and/or cause a pressure exchanger to operate. Specifically, the first fluid may be caused to flow through a condenser. Processing logic may cause a compressor (e.g., compressor 322) to flow fluid toward a condenser (e.g., condenser 329) based on sensor data (e.g., temperature sensor data, pressure sensor data, flowrate sensor data, etc.). The first fluid may be at a first temperature upon entering the condenser and may be at a second (e.g., lower) temperature upon exiting the condenser. The condenser may facilitate heat transfer from the first fluid to a corresponding environment (e.g., the environment to which the exterior of the condenser is exposed) to reduce the temperature of the first fluid.

At block 604, processing logic may cause pressure to be exchanged between the first fluid and a second fluid via a pressure exchanger (e.g., PX 310). In some examples, processing logic (e.g., of controller 380) may cause a pressure exchanger to operate to exchange pressure between the first fluid and the second fluid. Specifically, processing logic may cause one or more valves to open and one or more pumps and/or compressors to provide the first fluid and the second fluid to inlets of the pressure exchanger. Processing logic may cause a compressor and/or a booster (e.g., LP booster 314) to flow the first fluid and the second fluid (respectively) to the pressure exchanger based on sensor data (e.g., temperature sensor data, pressure sensor data, flowrate sensor data, etc.). The first fluid may be provided to a first inlet of the pressure exchanger at a first pressure and the second fluid may be provided to a second inlet of the pressure exchanger at a second pressure. The first pressure may be higher than the second pressure. In some embodiments (e.g., in embodiments where the pressure exchanger is a rotary pressure exchanger), processing logic may cause a motor to turn a rotor of the pressure exchanger. Providing the first and second fluids to the inlets of the pressure exchanger via the compressor and/or booster, and/or turning the rotor of the pressure exchanger via a motor may cause pressure to be exchanged between the first and second fluids. The first fluid may exit the pressure exchanger via a first outlet at a third pressure and the second fluid may exit the pressure exchanger via a second outlet at a fourth pressure. The third pressure may be lower than the fourth pressure.

At block 606, processing logic may cause the first fluid to separate into a first gas and a first liquid. The separation of the first fluid into its liquid and gas components may take place in a receiver (e.g., flash tank 313) configured to receive the first fluid output from the pressure exchanger. In some embodiments, processing logic (e.g., of controller 380) may regulate inflows, outflows, and/or an internal pressure of the receiver to facilitate separation of the first fluid into the first gas and the first liquid based on sensor data (e.g., temperature sensor data, pressure sensor data, flowrate sensor data, etc.). Processing logic may cause the first fluid to flow from the pressure exchanger to the receiver. In some embodiments, the first fluid exits the pressure exchanger via the first outlet of the pressure exchanger and flows into a chamber formed by the receiver. In the chamber, liquid (e.g., the first liquid) collects in the bottom of the chamber and gas (e.g., the first gas) collects toward the top of the chamber. The liquid may flow out of the chamber (e.g., toward an expansion valve and/or an evaporator). The gas may flow out of the chamber (e.g., via a gas outlet of the receiver) and may flow towards and/or along a flash gas bypass flow path (e.g., to bypass the evaporator).

At block 608, processing logic may cause the pressure of a portion of the first gas to be increased via a booster (e.g., LP booster 314) to form the second fluid and provide the second fluid to the pressure exchanger. In some embodiments, processing logic (e.g., of controller 380) may cause the booster (e.g., a pump or a compressor) to increase pressure of gas (e.g., a portion of the first gas). The gas may be diverted from the flash gas bypass flow path. In some embodiments, processing logic causes the booster to be driven by a motor (e.g., the processing logic causes the motor to turn on) based on sensor data (e.g., temperature sensor data, pressure sensor data, flowrate sensor data, etc.). The booster may cause a small pressure increase to the fluid (e.g., "boost" the pressure). The booster may increase the pressure of the fluid to the second pressure. The booster may be a positive displacement booster or a centrifugal booster (e.g., a positive displacement pump or compressor, or a centrifugal pump or compressor). In some embodiments, the booster provides the second fluid to the second inlet of the pressure exchanger at the second pressure.

Figure 6B:
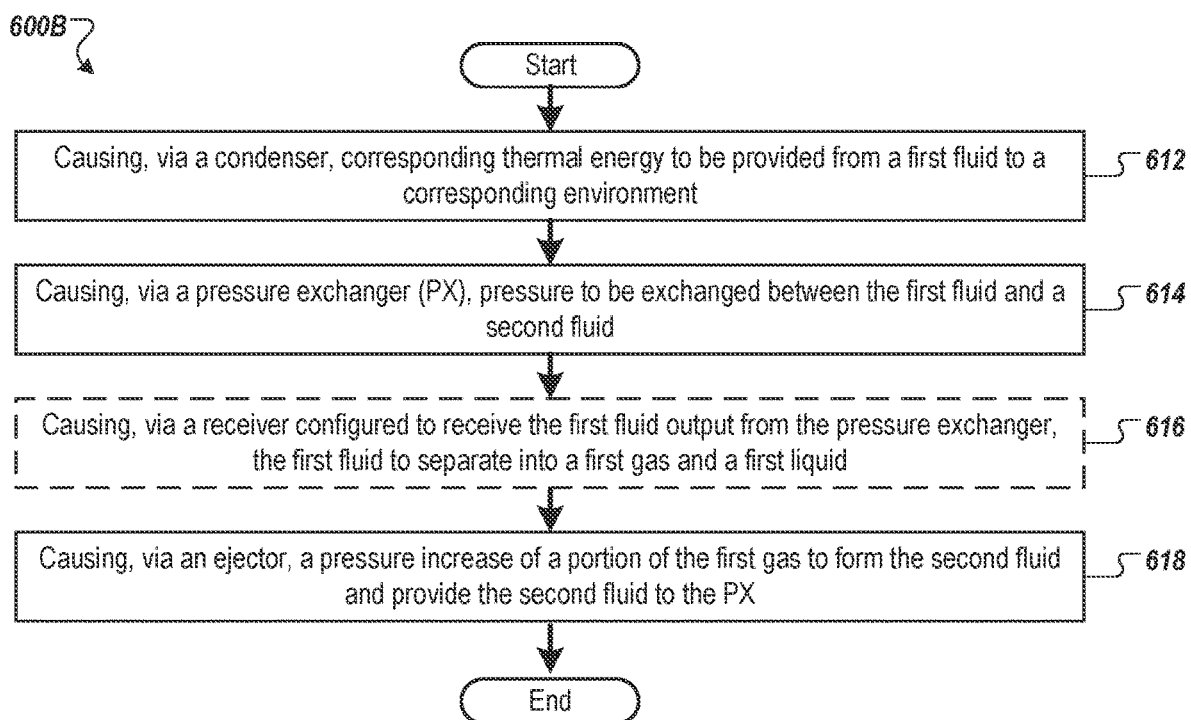

FIG. 6B is a flow diagram illustrating a method 600B for controlling a fluid handling system (e.g., one or more of fluid handling systems 400A, 400B of FIGS. 4A and 4B), according to certain embodiments. In some embodiments, method 600B is performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 600B is performed, at least in part, by a controller (e.g., controller 180 of FIGS. 1A-D, controller 380 of FIGS. 4A and 4B). In some embodiments, a non-transitory storage medium stores instructions that when executed by a processing device (e.g., of controller 180 of FIGS. 1A-D, controller 380 of FIGS. 4A and 4B, etc.), cause the processing device to perform method 600B. In some examples, method 600B has similar operations, etc. as method 600A of FIG. 6A.

For simplicity of explanation, method 600B is depicted and described as a series of operations. However, operations in accordance with this disclosure can occur in various orders and/or concurrently and with other operations not presented and described herein. Furthermore, in some embodiments, not all illustrated operations are performed to implement method 600B in accordance with the disclosed subject matter. In addition, those skilled in the art will understand and appreciate that method 600B could alternatively be represented as a series of interrelated states via a state diagram or events.

At block 612, processing logic may cause corresponding thermal energy to be provided, via a condenser, from a first fluid to a corresponding environment. Block 612 may be similar to block 602 of FIG. 6A.

At block 614, processing logic may cause pressure to be exchanged between the first fluid and a second fluid via a pressure exchanger (e.g., PX 310). Block 614 may be similar to block 604 of FIG. 6A.

In some embodiments, at block 616, processing logic may cause the first fluid to separate into a first gas and a first liquid. Block 616 may be similar to block 606 of FIG. 6A.

At block 618, processing logic may cause the pressure of a portion of the first gas to be increased via an ejector (e.g., LP ejector 476) to form the second fluid and provide the second fluid to the pressure exchanger. In some embodiments, processing logic (e.g., of controller 380) may cause the ejector to increase pressure of gas (e.g., a portion of the first gas) based on sensor data (e.g., temperature sensor data, pressure sensor data, flowrate sensor data, etc.). The gas (e.g., the portion of the first gas) may be diverted from the flash gas bypass flow path. In some embodiments, processing logic causes an ejector flow valve (e.g., LP ejector flow valve 480) to actuate to an open position to provide the ejector a supply of high pressure fluid to increase pressure of the gas to the second pressure. The high pressure fluid may combine with the gas to form the second fluid at the second pressure. In some embodiments, the ejector provides the second fluid to the second inlet of the pressure exchanger at the second pressure.

Figure 6C:
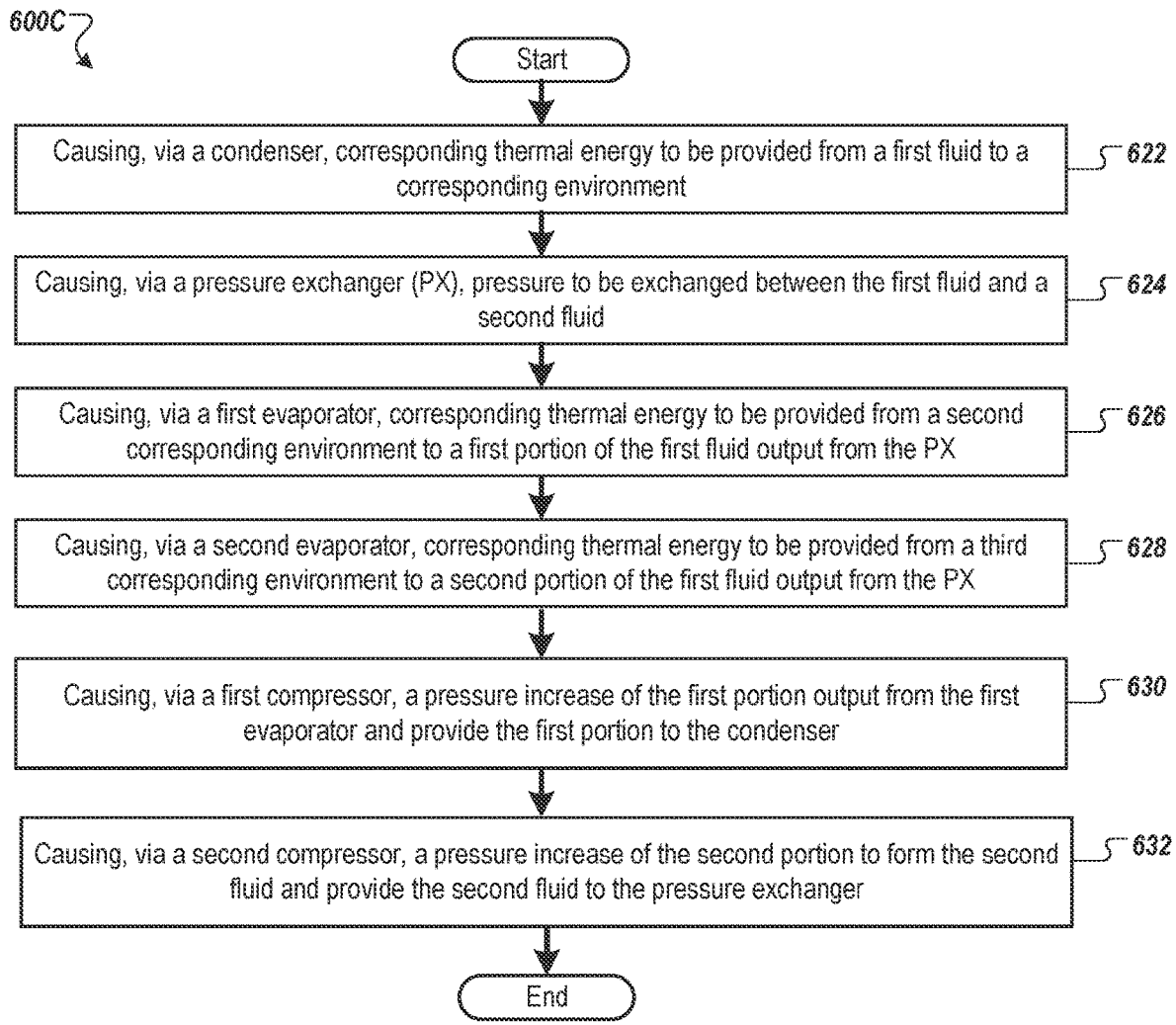

FIG. 6C is a flow diagram illustrating a method 600C for controlling a fluid handling system (e.g., one or more of fluid handling systems 500A, 500B of FIGS. 5A and 5B), according to certain embodiments. In some embodiments, method 600C is performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 600C is performed, at least in part, by a controller (e.g., controller 180 of FIGS. 1A-D, controller 380 of FIGS. 5A and 5B). In some embodiments, a non-transitory storage medium stores instructions that when executed by a processing device (e.g., of controller 180 of FIGS. 1A-D, controller 380 of FIGS. 5A and 5B, etc.), cause the processing device to perform method 600C. In some examples, method 600C has similar operations, etc. as method 600A of FIG. 6A.

For simplicity of explanation, method 600C is depicted and described as a series of operations. However, operations in accordance with this disclosure can occur in various orders and/or concurrently and with other operations not presented and described herein. Furthermore, in some embodiments, not all illustrated operations are performed to implement method 600C in accordance with the disclosed subject matter. In addition, those skilled in the art will understand and appreciate that method 600C could alternatively be represented as a series of interrelated states via a state diagram or events.

At block 622, processing logic may cause corresponding thermal energy to be provided, via a condenser, from a first fluid to a corresponding environment. Block 622 may be similar to block 602 of FIG. 6A.

At block 604, processing logic may cause pressure to be exchanged between the first fluid and a second fluid via a pressure exchanger (e.g., PX 310). Block 624 may be similar to block 604 of FIG. 6A.

At block 626, processing logic may cause corresponding thermal energy to be provided, via a first evaporator, from a second corresponding environment to a first portion of the first fluid output from the PX. In some examples, processing logic (e.g., of controller 380) may cause one of systems 500A-B to operate to absorb heat from the second environment via evaporator 318. The processing logic may actuate one or more valves, cause one or more pumps or compressors to operate, and/or cause a pressure exchanger to operate. Specifically, a first portion of the first fluid may be caused to flow through a first evaporator. Processing logic may cause one or more compressors (e.g., compressor 322, secondary compressor 356), and/or one or more boosters (e.g., HP booster 324) to flow refrigerant through a pressure exchanger to cause refrigerant to flow through the first evaporator (e.g., by way of an expansion valve such as expansion valve 316) based on sensor data (e.g., temperature sensor data, pressure sensor data, flowrate sensor data, etc.). The first portion of the first fluid may be at a third temperature upon entering the first evaporator and may be at a fourth (e.g., higher) temperature upon exiting the first evaporator. The first evaporator may facilitate heat transfer from the second corresponding environment to the first portion of the first fluid.

At block 628, processing logic may cause corresponding thermal energy to be provided, via a second evaporator, from a third corresponding environment to a second portion of the first fluid output from the PX. In some examples, processing logic (e.g., of controller 380) may cause one of systems 500A-B to operate to absorb heat from the third environment via secondary evaporator 319. The processing logic may actuate one or more valves, cause one or more pumps or compressors to operate, and/or cause a pressure exchanger to operate. Specifically, a second portion of the first fluid may be caused to flow through a second evaporator (e.g., a secondary evaporator, an evaporator in parallel with the first evaporator). Processing logic may cause one or more compressors (e.g., compressor 322, secondary compressor 356), and/or one or more boosters (e.g., HP booster 324) to flow refrigerant through a pressure exchanger to cause refrigerant to flow through the second evaporator (e.g., by way of an expansion valve such as secondary expansion valve 358) based on sensor data (e.g., temperature sensor data, pressure sensor data, flowrate sensor data, etc.). The second portion of the first fluid may be at a fifth temperature upon entering the second evaporator and may be at a sixth (e.g., higher) temperature upon exiting the second evaporator. The second evaporator may facilitate heat transfer from the third corresponding to the second portion of the first fluid. In some embodiments, the temperature of the third environment is lower than the temperature of the second environment. In some embodiments, the second and third environments have the same (e.g., substantially the same) temperature. In some embodiments, the second and third environments are the same environment.

At block 630, processing logic may cause pressure of the first portion output from the first evaporator to be increased via a first compressor. The processing logic may cause the first portion to be provided to the condenser. In some examples, processing logic (e.g., of controller 380) may cause a first compressor (e.g., compressor 322) to operate to increase pressure of fluid output from the evaporator (e.g., evaporator 318). Processing logic may cause a motor to drive the first compressor (e.g., processing logic may cause a motor coupled to the first compressor to turn on) based on sensor data (e.g., temperature sensor data, pressure sensor data, flowrate sensor data, etc.). The compressor may be one of a positive displacement compressor or a centrifugal compressor. The processing logic may cause a motor to drive the compressor. In some embodiments, the compressor provides the first portion (of the first fluid) to the condenser (e.g., condenser 329) at a heightened pressure.

At block 632, processing logic may cause pressure of the second portion output from the second evaporator to be increased via a second compressor to form the second fluid and provide the second fluid to the pressure exchanger. In some embodiments, processing logic (e.g., of controller 380) may cause the second compressor (e.g., secondary compressor 356) to increase pressure of fluid output by the second evaporator (e.g., secondary evaporator 319). The processing logic may cause a motor to drive the second compressor (e.g., processing logic may cause a motor coupled to the second compressor to turn on). In some embodiments, processing logic causes the second compressor to increase pressure of the second portion of the first fluid (e.g., output by the second evaporator) to the second pressure to form the second fluid (e.g., to be provided to the pressure exchanger) based on sensor data (e.g., temperature sensor data, pressure sensor data, flowrate sensor data, etc.). In some embodiments, the compressor provides the second fluid to the second inlet of the pressure exchanger at the second pressure.

Figure 7:
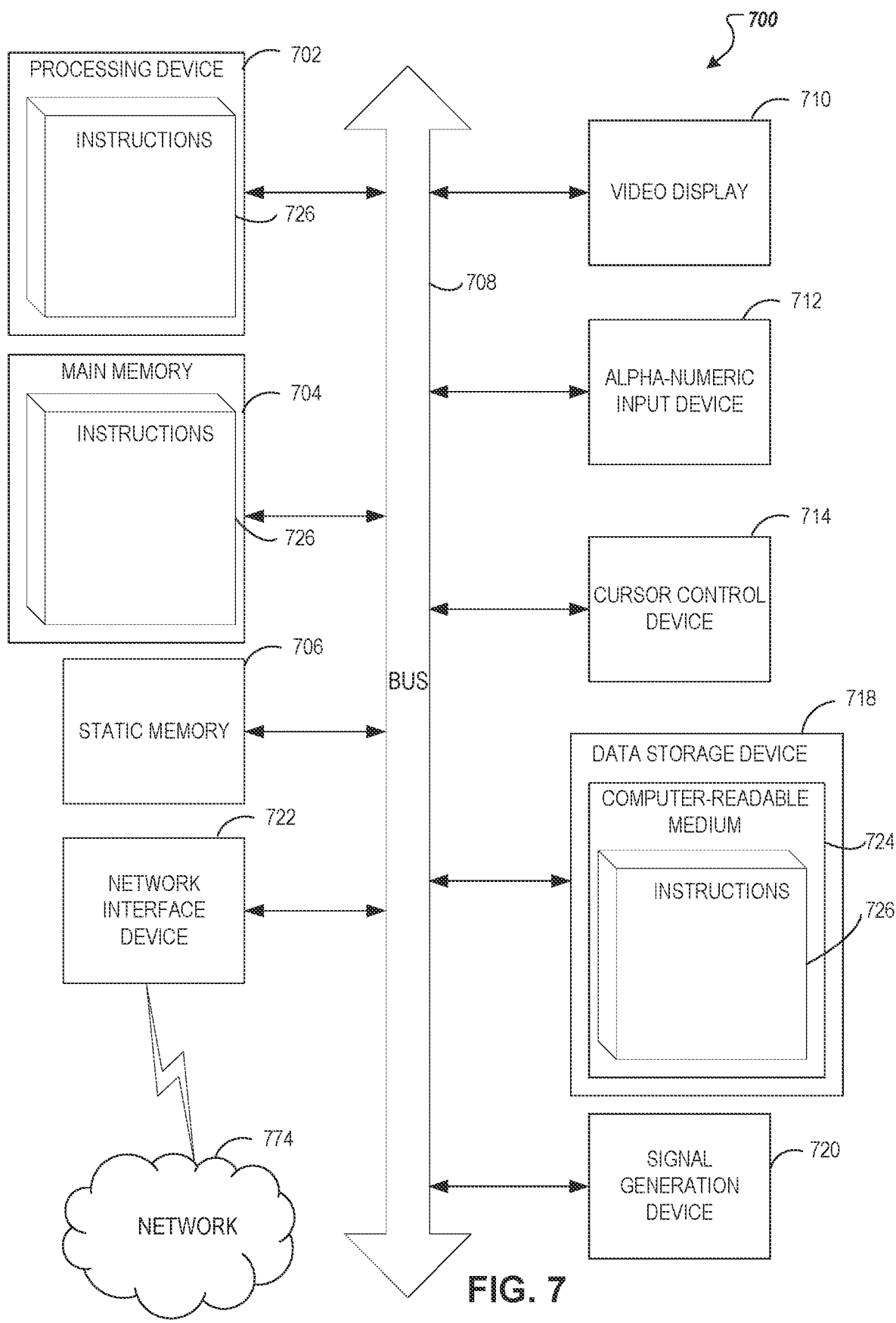
FIG. 7 is a block diagram illustrating a computer system, according to certain embodiments.

FIG. 7 is a block diagram illustrating a computer system 700, according to certain embodiments. In some embodiments, the computer system 700 is a client device. In some embodiments, the computer system 700 is a controller device (e.g., server, controller 180 of FIGS. 1A-D, controller 380 of FIGS. 3A-P, 4A, 4B, 5A, and 5B).

In some embodiments, computer system 700 is connected (e.g., via a network, such as a Local Area Network (LAN), an intranet, an extranet, or the Internet) to other computer systems. Computer system 700 operates in the capacity of a server or a client computer in a client-server environment, or as a peer computer in a peer-to-peer or distributed network environment. In some embodiments, computer system 700 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In some embodiments, the computer system 700 includes a processing device 702, a volatile memory 704 (e.g., Random Access Memory (RAM)), a non-volatile memory 706 (e.g., Read-Only Memory (ROM) or Electrically-Erasable Programmable ROM (EEPROM)), and/or a data storage device 716, which communicates with each other via a bus 708.

In some embodiments, processing device 702 is provided by one or more processors such as a general purpose processor (such as, in some examples, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, in some examples, an Application Specific Integrated Circuit (ASIC), a Field Programmable Gate Array (FPGA), a Digital Signal Processor (DSP), or a network processor). In some embodiments, processing device 702 is provided by one or more of a single processor, multiple processors, a single processor having multiple processing cores, and/or the like.

In some embodiments, computer system 700 further includes a network interface device 722 (e.g., coupled to network 774). In some embodiments, the computer system 700 includes one or more input/output (I/O) devices. In some embodiments, computer system 700 also includes a video display unit 710 (e.g., a liquid crystal display (LCD)), an alphanumeric input device 712 (e.g., a keyboard), a cursor control device 714 (e.g., a mouse), and/or a signal generation device 720.

In some implementations, data storage device 718 (e.g., disk drive storage, fixed and/or removable storage devices, fixed disk drive, removable memory card, optical storage, network attached storage (NAS), and/or storage area-network (SAN)) includes a non-transitory computer-readable storage medium 724 on which stores instructions 726 encoding any one or more of the methods or functions described herein, and for implementing methods described herein.

In some embodiments, instructions 726 also reside, completely or partially, within volatile memory 704 and/or within processing device 702 during execution thereof by computer system 700, hence, volatile memory 704 and processing device 702 also constitute machine-readable storage media, in some embodiments.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "actuating," "adjusting," "causing," "controlling," "determining," "identifying," "providing," "receiving," "regulating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The preceding description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about," "substantially," or "approximately" is used herein, this is intended to mean that the nominal value presented is precise within ±10%. Also, the terms "first," "second," "third," "fourth," etc. as used herein are meant as labels to distinguish among different elements and can not necessarily have an ordinal meaning according to their numerical designation.

The terms "over," "under," "between," "disposed on," and "on" as used herein refer to a relative position of one material layer or component with respect to other layers or components. In some examples, one layer disposed on, over, or under another layer may be directly in contact with the other layer or may have one or more intervening layers. Moreover, one layer disposed between two layers may be directly in contact with the two layers or may have one or more intervening layers. Similarly, unless explicitly stated otherwise, one feature disposed between two features may be in direct contact with the adjacent features or may have one or more intervening layers.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. In one embodiment, multiple metal bonding operations are performed as a single step.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which each claim is entitled.

What is claimed is:

1. A system comprising:
 a pressure exchanger (PX) configured to receive a first fluid at a first pressure via a first inlet of the PX, receive a second fluid at a second pressure via a second inlet of the PX, and exchange pressure between the first fluid and the second fluid, wherein the first fluid is to exit the PX at a third pressure via a first outlet of the PX, and wherein the second fluid is to exit the PX at a fourth pressure via a second outlet of the PX;
 a condenser configured to provide the first fluid to the PX via the first inlet of the PX and provide corresponding thermal energy from the first fluid to a first corresponding environment; and
 a first ejector configured to:
  receive a first gas of at least a portion of the first fluid output from the PX;
  increase pressure of the first gas to form the second fluid at the second pressure; and
  provide the second fluid at the second pressure to the PX via the second inlet.

2. The system of claim 1, wherein the system is one or more of a refrigeration system or a heat pump system, and wherein the first fluid and the second fluid comprise carbon dioxide ($CO_2$).

3. The system of claim 1, wherein the first pressure is higher than the second pressure, and wherein the third pressure is lower than the fourth pressure.

4. The system of claim 1, further comprising:
a second ejector configured to:
receive the second fluid from the second outlet of the PX and increase pressure of the second fluid; and
provide the second fluid upstream of an inlet of the condenser.

5. The system of claim 4, wherein the second ejector comprises a converging nozzle to increase fluid velocity of the second fluid by combining the second fluid in the converging nozzle with at least a first portion of high pressure gas output from a compressor.

6. The system of claim 5, further comprising:
a first ejector flow valve configured to regulate flow of a second portion of high pressure gas output from the compressor provided to the first ejector; and
a second ejector flow valve configured to regulate flow of the first portion of high pressure gas output from the compressor provided to the second ejector.

7. The system of claim 1, further comprising:
a receiver configured to receive the first fluid from the first outlet of the PX, wherein the receiver forms a first chamber configured to separate the first fluid into the first gas and a first liquid, and wherein the first ejector is to receive the first gas via a gas outlet of the receiver.

8. The system of claim 7, further comprising:
a flash gas valve configured to receive a portion of the first gas and regulate flow of the portion of the first gas along a flash gas bypass flow path.

9. The system of claim 1, further comprising:
an evaporator configured to provide corresponding thermal energy from a second corresponding environment to at least a portion of the first fluid output via the first outlet of the PX; and
a first compressor configured to receive the at least a portion of the first fluid output from the evaporator, increase a corresponding pressure of the at least a portion of the first fluid, and provide the at least a portion of the first fluid to the condenser.

10. The system of claim 9, further comprising:
an expansion valve configured to regulate flow of the at least a portion of the first fluid output via the first outlet of the PX and provide the at least a portion of the first fluid to the evaporator.

11. A method comprising:
causing, via a condenser, corresponding thermal energy to be provided from a first fluid to a first corresponding environment;
causing, via a pressure exchanger (PX), pressure to be exchanged between the first fluid and a second fluid; and
causing, via a first ejector, a pressure increase of a first gas of at least a portion of the first fluid output from the PX to form the second fluid and provide the second fluid to the PX.

12. The method of claim 11, wherein the PX is to receive the first fluid at a first pressure via a first inlet of the PX and the PX is to receive the second fluid at a second pressure via a second inlet of the PX, wherein the PX is to exchange pressure between the first fluid and the second fluid, wherein the first fluid is to exit the PX at a third pressure via a first outlet of the PX, and wherein the second fluid is to exit the PX at a fourth pressure via a second outlet of the PX.

13. The method of claim 12, wherein the first pressure is higher than the second pressure, and wherein the third pressure is lower than the fourth pressure.

14. The method of claim 11, further comprising:
causing, via a receiver configured to receive the first fluid output from the pressure exchanger, the first fluid to separate into the first gas and a first liquid.

15. The method of claim 11, further comprising:
causing, via an evaporator, corresponding thermal energy to be provided from a second corresponding environment to at least a portion of the first fluid output via a first outlet of the PX; and
causing, via a compressor, an increase in corresponding pressure of the at least a portion of the first fluid and provide the at least a portion of the first fluid to the condenser.

16. The method of claim 11, wherein the first fluid and the second fluid comprise carbon dioxide ($CO_2$).

17. A non-transitory computer-readable storage medium comprising instructions that, when executed by a processing device, cause the processing device to perform operations comprising:
causing, via a condenser, corresponding thermal energy to be provided from a first fluid to a first corresponding environment;
causing, via a pressure exchanger (PX), pressure to be exchanged between the first fluid and a second fluid; and
causing, via a first ejector, a pressure increase of a first gas of at least a portion of the first fluid output from the PX to form the second fluid and provide the second fluid to the PX.

18. The non-transitory computer-readable storage medium of claim 17, wherein the PX is to receive the first fluid at a first pressure via a first inlet of the PX and the PX is to receive the second fluid at a second pressure via a second inlet of the PX, wherein the PX is to exchange pressure between the first fluid and the second fluid, wherein the first fluid is to exit the PX at a third pressure via a first outlet of the PX, and wherein the second fluid is to exit the PX at a fourth pressure via a second outlet of the PX.

19. The non-transitory computer-readable storage medium of claim 17, wherein the processing device is to perform operations further comprising:
causing, via an evaporator, corresponding thermal energy to be provided from a second corresponding environment to at least a portion of the first fluid output via a first outlet of the PX; and
causing, via a compressor, an increase in corresponding pressure of the at least a portion of the first fluid and provide the at least a portion of the first fluid to the condenser.

20. The non-transitory computer-readable storage medium of claim 19, wherein the processing device is to perform operations further comprising:
cause an expansion valve to regulate flow of the at least a portion of the first fluid output via the first outlet of the PX and provide the at least a portion of the first fluid to the condenser.

* * * * *